US012737334B1

(12) United States Patent
Rahamim et al.

(10) Patent No.: US 12,737,334 B1
(45) Date of Patent: Sep. 15, 2026

(54) DATA DEDUPLICATION TECHNIQUES FOR UNALIGNED DATA PAGES

(71) Applicant: Dell Products L.P., Hopkinton, MA (US)

(72) Inventors: Maor Rahamim, Ramla (IL); Michael P. Wahl, Bulverde, TX (US); Vamsi K. Vankamamidi, Hopkinton, MA (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 19/193,004

(22) Filed: Apr. 29, 2025

(51) Int. Cl.
*G06F 16/215* (2019.01)
*G06F 16/23* (2019.01)

(52) U.S. Cl.
CPC ........ *G06F 16/215* (2019.01); *G06F 16/2365* (2019.01)

(58) Field of Classification Search
None
See application file for complete search history.

(56) References Cited

U.S. PATENT DOCUMENTS

| | | | | |
|---|---|---|---|---|
| 9,575,681 | B1 * | 2/2017 | Fisher | G06F 3/0688 |
| 12,461,675 | B1 * | 11/2025 | Sutton | G06F 3/0608 |
| 2017/0160978 | A1 * | 6/2017 | Erez | G06F 3/0679 |
| 2020/0341669 | A1 * | 10/2020 | Shabi | G06F 3/0673 |
| 2022/0358103 | A1 * | 11/2022 | Wu | G06F 16/2255 |
| 2024/0061819 | A1 * | 2/2024 | Shabi | G06F 3/0641 |
| 2025/0068607 | A1 * | 2/2025 | Kondiles | G06F 16/215 |

OTHER PUBLICATIONS

R. Owens and W. Wang, "Non-interactive OS fingerprinting through memory de-duplication technique in virtual machines," 30th IEEE International Performance Computing and Communications Conference, Orlando, FL, USA, 2011, pp. 1-8. (Year: 2011).*

E. Bosman, K. Razavi, H. Bos and C. Giuffrida, "Dedup Est Machina: Memory Deduplication as an Advanced Exploitation Vector," 2016 IEEE Symposium on Security and Privacy (SP), San Jose, CA, USA, 2016, pp. 987-1004. (Year: 2016).*

U.S. Appl. No. 19/037,781, filed Jan. 27, 2025, "System and Method for Mapping Unaligned Virtual Layer Pages for Sector Aligned Deduplication".

* cited by examiner

*Primary Examiner* — Kris E Mackes
(74) *Attorney, Agent, or Firm* — BainwoodHuang

(57) ABSTRACT

Techniques can include performing sector aligned data deduplication for a sequence of pages including: performing a search phase and identifying a target set of one or more target pages, wherein a first target page of the target set is included in a second sequence of previously written pages; and performing an expansion phase including: based on the first target page, determining matches between i) pages of the first sequence, and ii) corresponding generated sector aligned pages each constructed from two logically consecutive pages of the second sequence given an offset; and determining, based on the expansion phase and the first target page, a set of sector aligned duplicates within the sequence of pages, wherein each sector aligned duplicate identifies a respective page of the sequence having its content from two stored pages which are aligned on the page boundary and are logically consecutive pages of the second sequence.

20 Claims, 20 Drawing Sheets

1200

1400

1410

| | Current ingested/flushed page 1410a | Aligned target page ( e.g., current target page) 1410b | Previous aligned target page 1410c | Generated unaligned page based on 4K offset 1410d |
|---|---|---|---|---|
| 1412 | SEQ2(2) = DE | SEQ1(2) = EF | SEQ1(1) = CD | DE |
| 1414 | SEQ2(1) = BC | SEQ1(1) = CD | SEQ1(0) = AB | BC |

1420

| | Current ingested/flushed page 1420a | Aligned target page ( e.g., current target page) 1420b | Next aligned target page 1420c | Generated unaligned page based on 4K offset 1420d |
|---|---|---|---|---|
| 1422 | SEQ2(3) = FG | SEQ1(2) = EF | SEQ1(3) = GH | FG |

1430

| | Ingested/flushed page 1430a | Stored aligned pages 1430b | Offset 1430c |
|---|---|---|---|
| 1432 | SEQ2(1) BC | Vab, Vcd, | 4K |
| 1434 | SEQ2(2) DE | Vcd , Vef, | 4K |
| 1436 | SEQ2(3) FG | Vef, Vgh, | 4K |

FIG. 13A

DATA DEDUPLICATION TECHNIQUES FOR UNALIGNED DATA PAGES

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O (input/output) operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY OF THE PRESENT DISCLOSURE

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: receiving a first sequence of ingested pages; and performing sector aligned data deduplication for the first sequence of ingested pages including: performing a search phase and identifying a target set of one or more target pages, wherein a first target page of the target set is included in a second sequence of previously written pages, wherein each target page of the target set is: i) a stored page aligned on a page boundary of a physical address space, and ii) identified as a potential sector aligned match for a corresponding one of the ingested pages of the first sequence given a corresponding offset, wherein the corresponding offset denotes a page-alignment offset relative to the page boundary; and performing an expansion phase based, at least in part, on the target set of one or more target pages, wherein the first target page is identified by the search phase as a potential sector aligned match for a first ingested page of the first sequence given a first corresponding offset, the expansion phase including: based on the first target page of the second sequence, determining matches between i) ingested pages of the first sequence, and ii) corresponding generated sector aligned pages each constructed from two logically consecutive pages of the second sequence given the first corresponding offset; and determining, based on the expansion phase and the first target page, a set of one or more sector aligned duplicates within the first sequence of ingested pages, wherein each sector aligned duplicate of the set identifies a respective ingested page of the first sequence having its content from two stored pages aligned on the page boundary, where the two stored pages are logically consecutive pages of the second sequence.

In at least one embodiment, the second sequence can write second pages each of which is a stored page aligned on a page boundary of the physical space. For the first target page of the second sequence, the expansion phase can include performing expand left processing to determine matches between i) a first set of ingested pages of the first sequence, and ii) first corresponding generated sector aligned pages each constructed from two logically consecutive pages of the second sequence given the first corresponding offset, wherein the first set of ingested pages of the first sequence includes: i) the first ingested page, and ii) other ingested pages of the first sequence which are logically sequentially prior to the first ingested page in the first sequence. The pages of the second sequence, used to construct the first corresponding generated sector aligned pages, can include: i) the first target page, and ii) first one or more other pages of the second sequence, wherein the first one or more other pages are logically sequentially prior to the first target page in the second sequence. For the first target page of the second sequence, the expansion phase can include performing expand right processing to determine matches between i) a second set of ingested pages of the first sequence, and ii) second corresponding generated sector aligned pages each constructed from two logically consecutive pages of the second sequence given the first corresponding offset, wherein the second set of ingested pages of the first sequence includes other ingested pages of the first sequence which are logically sequentially after the first ingested page in the first sequence. The pages of the second sequence, used to construct the second corresponding generated sector aligned pages, can include: i) the first target page, and ii) second one or more other pages of the second sequence, wherein the second one or more other pages are logically sequentially after the first target page in the second sequence.

In at least one embodiment, the ingested pages of the first sequence can be respectively written to consecutive first logical addresses, and wherein the previously written pages of the second sequence are respectively written to consecutive second logical addresses. The first logical addresses can be included in a first logical address space associated with a first storage object, and wherein the second logical addresses can be included in a second logical address space associated with a second storage object. The first storage object can be a first volume, the second storage object can be a second volume, and wherein the first volume and the second volume can be two different volumes. The first storage object be a first volume, the second storage object can be a second volume, and wherein the first volume and the second volume can denote a same storage volume.

In at least one embodiment, the search phase can include performing a plurality of rounds each corresponding to one of a plurality of sector offsets denoting a page-alignment offset relative to the page boundary. Each of the plurality of rounds of the search phase can correspond to one of the plurality of sector offsets and can include: generating first sector aligned pages, based on the one sector offset corresponding to said each round, from pairs of logically adjacent ingested pages of the first sequence; for each of the first sector aligned pages generated, determining a calculated hash value; determining whether a data deduplication index has a first hash value matching the calculated hash value, wherein if the data deduplication index has the first hash value matching the calculated hash value, then the data deduplication index has a first existing entry which is i) associated with the first hash value, and ii) includes first location information of a first stored page having the first hash value; and if it is determined that the data deduplication index has a first hash value matching the calculated hash value, adding the first stored page as a target page of the target set.

In at least one embodiment, a first adaptive sector offsets array can specify a first ordering in which the plurality of sector offsets are evaluated in the search phase, wherein the first adaptive sector offsets array can be associated with the first storage object, and wherein the first ordering of the sector offsets can be based, at least in part, on observed frequencies at which matching hash values are found between i) a hash value of a generated sector aligned page for a particular sector offset, and ii) a hash value of the data deduplication index corresponding to a stored page aligned on the page boundary of the physical address space. The search phase can include: determining that a first hash value for said each target page matches a calculated hash value for said corresponding one ingested page; and responsive to determining that the first hash value matches the calculated hash value, determining that said each target page is a potential sector aligned match for said corresponding one ingested page of the first sequence given the corresponding offset.

In at least one embodiment, the second sequence of previously written pages can be maintained as a linked list of virtual layer entries, wherein each of the virtual layer entries can be used to access one of the previously written pages, and wherein each of the previously written pages of the second sequence can be a stored page aligned on the page boundary of the physical address space. Each of the virtual layer entries can correspond to a logical address in a logical address space of a storage object, and wherein the second sequence can be formed from second consecutive logical addresses of the logical address space of the storage object. Processing can include performing page aligned data deduplication for the first sequence prior to performing the sector aligned data deduplication for the first sequence. Processing can include: receiving one or more write requests to write the first sequence of ingested pages; storing one or more log entries in a log to record the one or more write requests to write the first sequence of ingested pages; and flushing the one or more entries from the log, wherein said flushing includes performing data deduplication for the first sequence, wherein said data deduplication includes performing said page aligned data deduplication for the first sequence and performing said sector aligned deduplication for the first sequence.

BRIEF DESCRIPTION OF THE DRAWINGS

Features and advantages of the present disclosure will become more apparent from the following detailed description of exemplary embodiments thereof taken in conjunction with the accompanying drawings in which:

FIGS. 8, 9, 10, 11, 12, 13A and 13B are examples illustrating structures and data flows in at least one embodiment in accordance with the techniques of the present disclosure.

DETAILED DESCRIPTION OF EMBODIMENT(S)

Figure 1:
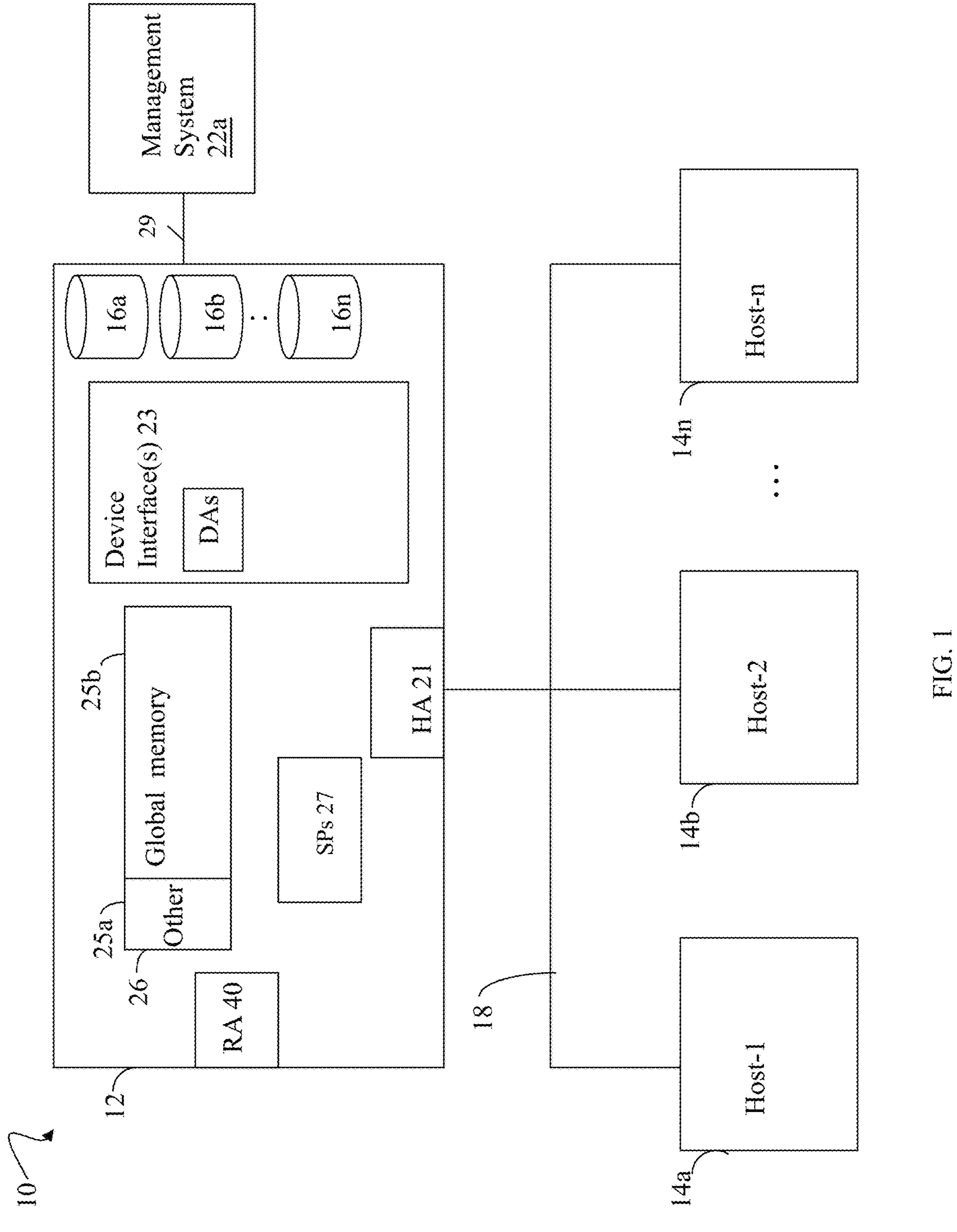
FIG. 1 is an example of components that may be included in a system in accordance with the techniques of the present disclosure.

Storage systems can persist data related to I/O write requests. These requests may contain data associated with the applications running on one or more hosts, or more generally storage clients. There are applications which store identical data sequences at different locations. However, those locations may not be aligned on the storage system's internal page boundary. To further illustrate, the storage system can, for example, have an internal or native page size of 8K. A storage client such as, for example, an application APP1 executing on a host, can write a sequence of 4K aligned data pages based on the host's or application's native page size of 4K. As such, these I/O patterns writing a sequence of unaligned pages of data (e.g., such as the foregoing sequence written by APP1) can be missed by typical page aligned deduplication (sometimes referred to as data dedupe or simply dedupe) operations performed based on persisted user data pages maintained by the storage system.

The identical data sequences may, however, be aligned on a sector-level boundary, or more generally a boundary characterized as non-page aligned or unaligned with respect to the page size and associated page alignment used in connection with persisted user data pages and page aligned deduplication.

As such in at least one embodiment, sector aligned deduplication can be performed to thereby increase the storage system's overall deduplication ratio. More generally, deduplication can be extended beyond sector alignment to any arbitrary page offset. An ingested user data page U1 whose data D1 is an identical copy of the user's data D1 stored elsewhere in the storage system, where that stored data D1 is not aligned with the storage system's internal page size, thus corresponds to portions of the data D1 from two of the storage system's internal user data pages P1 and P2 (where P1 and P2 are page aligned). Put another way in at least one embodiment, a user data page U1 having content or data D1 detected as an unaligned match with respect to some offset can be duplicated across two logically sequential pages P1 and P2 of a first sequence of user data pages written to corresponding logical addresses, such that the duplicate page U1 of the data D1 is formed from content of both user data pages P1 and P2 given the offset. In at least one embodiment, P1 and P2 can be aligned data pages (e.g., page aligned) written consecutively or sequentially in the first sequence to corresponding logical addresses of a logical address space of the storage system storing the user data D1, where a first portion D1a of D1 is stored in user data page P1, and a second remaining portion D1b of D1 is stored in user data page P2, and where D1 can be the content of the ingested page U1. In at least one embodiment, the logical addresses of P1 and P2 can be consecutive logical addresses included in a logical address space of the same data storage object such as, for example, a volume or LUN of host data stored on the storage system.

In at least one embodiment, the techniques of the present disclosure provide for an efficient search of sector-aligned deduplication which avoids maintaining additional hashes and minimizes impact on the performance of hosts and the data storage system. In at least one embodiment, the techniques of the present disclosure can be implemented using a deterministic algorithm for sector-aligned deduplication described herein. More generally, the techniques of the present disclosure can be used in connection with performing non-page aligned deduplication with respect to any suitable page offset corresponding to an ingested data page having its content stored in two existing data pages of the storage system, where the two existing data pages can be aligned on an internal page boundary of the storage system.

In at least one embodiment, the techniques of the present disclosure can be used in a storage system to perform sector-aligned deduplication, where the storage system also performs page aligned deduplication. More generally, the techniques of the present disclosure can be used in a storage system to perform unaligned or non-page aligned deduplication with respect to any non-zero page offset.

In at least one embodiment, the techniques of the present disclosure can be utilized in a log structured system or LSS. However, the techniques of the present disclosure are not limited to use with an LSS and can, more generally, be used in connection with performing sector-aligned, unaligned or non-page aligned deduplication using any suitable storage system methodology for storing and maintaining content.

The foregoing and other aspects of the techniques of the present disclosure are described in more detail in the following paragraphs.

Referring to the FIG. 1, shown is an example of an embodiment of a SAN 10 that is used in connection with performing the techniques described herein. The SAN 10 includes a data storage system 12 connected to the host systems (also sometimes referred to as hosts) 14_a_-14_n_ through the communication medium 18. In this embodiment of the SAN 10, the n hosts 14_a_-14_n_ access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, a network, or other wireless or other hardwired connection(s) by which the host systems 14_a_-14_n_ access and communicate with the data storage system 12, and also communicate with other components included in the SAN 10.

Each of the host systems 14_a_-14_n_ and the data storage system 12 included in the SAN 10 are connected to the communication medium 18 by any one of a variety of connections as provided and supported in accordance with the type of communication medium 18. The processors included in the host systems 14_a_-14_n_ and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14_a_-14_n_ and the data storage system 12 can all be located at the same physical site, or, alternatively, be located in different physical locations. The communication medium 18 used for communication between the host systems 14_a_-14_n_ and the data storage system 12 of the SAN 10 can use a variety of different communication protocols such as block-based protocols (e.g., SCSI, FC, ISCSI), file system-based protocols (e.g., NFS or network file server), and the like. Some or all of the connections by which the hosts 14_a_-14_n_ and the data storage system 12 are connected to the communication medium 18 can pass through other communication devices, such as switching equipment, a phone line, a repeater, a multiplexer or even a satellite.

Each of the host systems 14_a_-14_n_ can perform data operations. In the embodiment of the FIG. 1, any one of the host computers 14_a_-14_n_ issues a data request to the data storage system 12 to perform a data operation. For example, an application executing on one of the host computers 14_a_-14_n_ performs a read or write operation resulting in one or more data requests to the data storage system 12.

It should be noted that although the element 12 is illustrated as a single data storage system, such as a single data storage array, the element 12 also represents, for example, multiple data storage arrays alone, or in combination with, other data storage devices, systems, appliances, and/or components having suitable connectivity to the SAN 10 in an embodiment using the techniques herein. It should also be noted that an embodiment can include data storage arrays or other components from one or more vendors. In subsequent examples illustrating the techniques herein, reference is made to a single data storage array by a vendor. However, as will be appreciated by those skilled in the art, the techniques herein are applicable for use with other data storage arrays by other vendors and with other components than as described herein for purposes of example.

In at least one embodiment, the data storage system 12 is a data storage appliance or a data storage array including a plurality of data storage devices (PDs) 16_a_-16_n_. The data storage devices 16_a_-16_n_ include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. In at least one embodiment, the flash devices can be constructed using nonvolatile semiconductor NAND flash memory. The flash devices include, for example, one or more SLC (single level cell) devices and/or MLC (multi level cell) devices.

In at least one embodiment, the data storage system or array includes different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs are used to manage communications and data operations between one or more host systems and the global memory (GM). In an embodiment, the HA is a Fibre Channel Adapter (FA) or other adapter which facilitates host communication. The HA 21 can be characterized as a front end component of the data storage system which receives a request from one of the hosts 14*a*-*n*. In at least one embodiment, the data storage array or system includes one or more RAs used, for example, to facilitate communications between data storage arrays. The data storage array also includes one or more device interfaces 23 for facilitating data transfers to/from the data storage devices 16*a*-16*n*. The data storage device interfaces 23 include device interface modules, for example, one or more disk adapters (DAs) (e.g., disk controllers) for interfacing with the flash drives or other physical storage devices (e.g., PDS 16*a*-*n*). The DAs can also be characterized as back end components of the data storage system which interface with the physical data storage devices.

One or more internal logical communication paths exist between the device interfaces 23, the RAs 40, the HAs 21, and the memory 26. An embodiment, for example, uses one or more internal busses and/or communication modules. In at least one embodiment, the global memory portion 25*b* is used to facilitate data transfers and other communications between the device interfaces, the HAs and/or the RAs in a data storage array. In one embodiment, the device interfaces 23 performs data operations using a system cache included in the global memory 25*b*, for example, when communicating with other device interfaces and other components of the data storage array. The other portion 25*a* is that portion of the memory used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14*a*-14*n* provide data and access control information through channels to the storage systems 12, and the storage systems 12 also provide data to the host systems 14*a*-*n* also through the channels. The host systems 14*a*-*n* do not address the drives or devices 16*a*-16*n* of the storage systems directly, but rather access to data is provided to one or more host systems from what the host systems view as a plurality of logical devices, logical volumes (LVs) also referred to herein as logical units (e.g., LUNs). A logical unit (LUN) can be characterized as a disk array or data storage system reference to an amount of storage space that has been formatted and allocated for use to one or more hosts. A logical unit has a logical unit number that is an I/O address for the logical unit. As used herein, a LUN or LUNs refers to the different logical units of storage referenced by such logical unit numbers. The LUNs have storage provisioned from portions of one or more physical disk drives or more generally physical storage devices. For example, one or more LUNs can reside on a single physical disk drive, data of a single LUN can reside on multiple different physical devices, and the like. Data in a single data storage system, such as a single data storage array, can be accessible to multiple hosts allowing the hosts to share the data residing therein. The HAs are used in connection with communications between a data storage array and a host system. The RAs are used in facilitating communications between two data storage arrays. The DAs include one or more types of device interfaced used in connection with facilitating data transfers to/from the associated disk drive(s) and LUN(s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein are made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22*a* used to manage and monitor the data storage system 12. In one embodiment, the management system 22*a* is a computer system which includes data storage system management software or application that executes in a web browser. A data storage system manager can, for example, view information about a current data storage configuration such as LUNs, storage pools, and the like, on a user interface (UI) in a display device of the management system 22*a*. Alternatively, and more generally, the management software can execute on any suitable processor in any suitable system. For example, the data storage system management software can execute on a processor of the data storage system 12.

Information regarding the data storage system configuration is stored in any suitable data container, such as a database. The data storage system configuration information stored in the database generally describes the various physical and logical entities in the current data storage system configuration. The data storage system configuration information describes, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, data storage system performance information such as regarding various storage objects and other entities in the system, and the like.

Consistent with other discussion herein, management commands issued over the control or management path include commands that query or read selected portions of the data storage system configuration, such as information regarding the properties or attributes of one or more LUNs. The management commands also include commands that write, update, or modify the data storage system configuration, such as, for example, to create or provision a new LUN (e.g., which result in modifying one or more database tables such as to add information for the new LUN), and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16*a*-16*n*. In the following description, data residing on a LUN is accessed by the device interface following a data request in connection with I/O operations. For example, a host issues an I/O operation that is received by the HA 21. The I/O operation identifies a target location from which data is read from, or written to, depending on whether the I/O operation is, respectively, a read or a write operation request. In at least one embodiment using block storage services, the target location of the received I/O operation is expressed in terms of a LUN and logical address or offset location (e.g., LBA or logical block address) on the LUN. Processing is performed on the data storage system to further map the target location of the received I/O operation, expressed in terms of a LUN and logical address or offset location on the LUN, to its corresponding physical storage device (PD) and location on the PD. The DA which services the particular PD performs processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique described herein for exemplary purposes. For example, the element 12 of the FIG. 1 in one embodiment is a data storage system, such as a data storage array, that includes multiple storage processors (SPs). Each of the SPs 27 is a CPU including one or more "cores" or processors and each have their own memory used for communication between the different front end and back end components rather than utilize a global memory accessible to all storage processors. In such embodiments, the memory 26 represents memory of each such storage processor.

Generally, the techniques herein can be used in connection with any suitable storage system, appliance, device, and the like, in which data is stored. For example, an embodiment can implement the techniques herein using a midrange data storage system as well as a higher end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands are issued from data storage management software executing on the management system 22*a* to the data storage system 12. Such commands, for example, establish or modify data services, provision storage, perform user account management, and the like. Consistent with other discussion herein, management commands result in processing that can include reading and/or modifying information in the database storing data storage system configuration information.

The data path and control path define two sets of different logical flow paths. In at least some of the data storage system configurations, at least part of the hardware and network connections used for each of the data path and control path differ. For example, although both control path and data path generally use a network for communications, some of the hardware and software used can differ. For example, with reference to the FIG. 1, a data storage system has a separate physical connection 29 from a management system 22*a* to the data storage system 12 being managed whereby control commands are issued over such a physical connection 29. However, user I/O commands are never issued over such a physical connection 29 provided solely for purposes of connecting the management system to the data storage system. In any case, the data path and control path each define two separate logical flow paths.

Figure 2A:
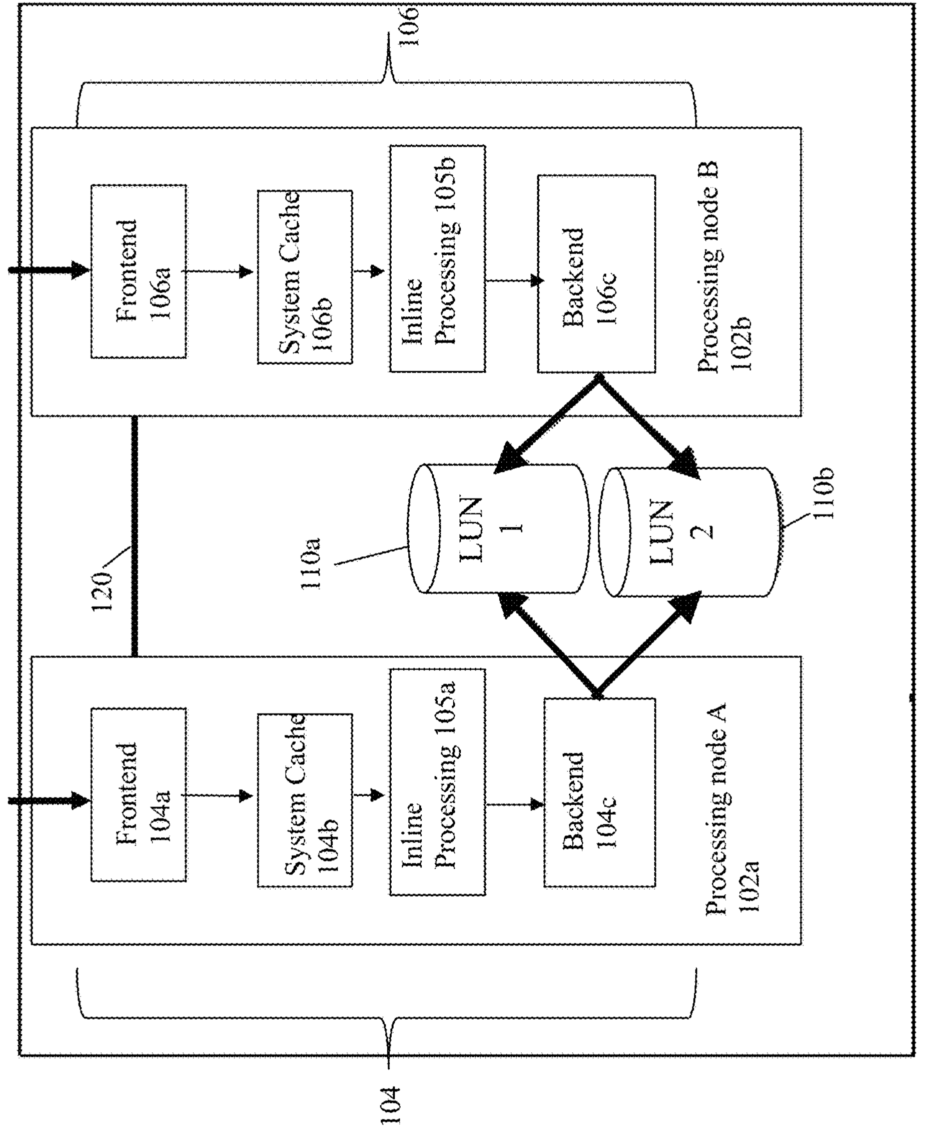
FIG. 2A is an example illustrating the I/O path or data path in connection with processing data in at least one embodiment in accordance with the techniques of the present disclosure.

With reference to the FIG. 2A, shown is an example 100 illustrating components that can be included in the data path in at least one existing data storage system in accordance with the techniques of the present disclosure. The example 100 includes two processing nodes A 102*a* and B 102*b* and the associated software stacks 104, 106 of the data path, where I/O requests can be received by either processing node 102*a* or 102*b*. In the example 200, the data path 104 of processing node A 102*a* includes: the frontend (FE) component 104*a* (e.g., an FA or front end adapter) that translates the protocol-specific request into a storage system-specific request; a system cache layer 104*b* where data is temporarily stored; an inline processing layer 105*a*; and a backend (BE) component 104*c* that facilitates movement of the data between the system cache and non-volatile physical storage (e.g., back end physical non-volatile storage devices or PDs accessed by BE components such as DAs as described herein). During movement of data in and out of the system cache layer 104*b* (e.g., such as in connection with read data from, and writing data to, physical storage 110*a*, 110*b*), inline processing can be performed by layer 105*a*. Such inline processing operations of 105*a* can be optionally performed and can include any one of more data processing operations in connection with data that is flushed from system cache layer 104*b* to the back-end non-volatile physical storage 110*a*, 110*b*, as well as when retrieving data from the back-end non-volatile physical storage 110*a*, 110*b* to be stored in the system cache layer 104*b*. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102*b* has its own FE component 106*a*, system cache layer 106*b*, inline processing layer 105*b*, and BE component 106*c* that are respectively similar to the components 104*a*, 104*b*, 105*a* and 104*c*. The elements 110*a*, 110*b* denote the non-volatile BE physical storage provisioned from PDs for the LUNs, whereby an I/O can be directed to a location or logical address of a LUN and where data can be read from, or written to, the logical address. The LUNs 110*a*, 110*b* are examples of storage objects representing logical storage entities included in an existing data storage system configuration. Since, in this example, writes, or more generally I/Os, directed to the LUNs 110*a*, 110*b* can be received for processing by either of the nodes 102*a* and 102*b*, the example 100 illustrates what can also be referred to as an active-active configuration.

In connection with a write operation received from a host and processed by the processing node A 102*a*, the write data can be written to the system cache 104*b*, marked as write pending (WP) denoting it needs to be written to the physical storage 110*a*, 110*b* and, at a later point in time, the write data can be destaged or flushed from the system cache to the physical storage 110*a*, 110*b* by the BE component 104*c*. The write request can be considered complete once the write data has been stored in the system cache whereby an acknowledgement regarding the completion can be returned to the host (e.g., by component the 104*a*). At various points in time, the WP data stored in the system cache is flushed or written out to the physical storage 110*a*, 110*b*.

In connection with the inline processing layer 105*a*, prior to storing the original data on the physical storage 110*a*, 110*b*, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110*a*, 110*b*.

In connection with a read operation to read a block of data, a determination is made as to whether the requested read data block is stored in its original form (in system cache 104*b* or on physical storage 110*a*, 110*b*), or whether the requested read data block is stored in a different modified form or representation. If the requested read data block (which is stored in its original form) is in the system cache, the read data block is retrieved from the system cache 104*b* and returned to the host. Otherwise, if the requested read data block is not in the system cache 104*b* but is stored on the physical storage 110*a*, 110*b* in its original form, the requested data block is read by the BE component 104*c* from the backend storage 110*a*, 110*b*, stored in the system cache and then returned to the host.

If the requested read data block is not stored in its original form, the original form of the read data block is recreated and stored in the system cache in its original form so that it can be returned to the host. Thus, requested read data stored on physical storage 110*a*, 110*b* can be stored in a modified form where processing is performed by 105*a* to restore or convert the modified form of the data to its original data form prior to returning the requested read data to the host.

Also illustrated in FIG. 2A is an internal network interconnect 120 between the nodes 102*a*, 102*b*. In at least one embodiment, the interconnect 120 can be used for internode communication between the nodes 102*a*, 102*b*.

In connection with at least one embodiment in accordance with the techniques of the present disclosure, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM used as main memory. The processor cache can be substantially faster than the system RAM used as main memory. The processor cache can contain information that the processor will be immediately and repeatedly accessing. The faster memory of the CPU cache can for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105*a*, 105*b* as noted above, data can be loaded from the main memory and/or other lower cache levels into its CPU cache.

In at least one embodiment, the data storage system can be configured to include one or more pairs of nodes, where each pair of nodes can be generally as described and represented as the nodes 102*a-b* in the FIG. 2A. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102*a* is the peer node of the node B 102*b*, and the node B 102*b* is the peer node of the node A 102*a*.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2A, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes are not shared with other pairs of nodes. A host can access data stored on a BE PD through the node pair associated with or attached to the PD.

In at least one embodiment, each pair of nodes provides a dual node architecture where both nodes of the pair can be generally identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a cache can be used for caching write I/O data and other cached information. In one system, the cache used for caching logged writes can be implemented using multiple caching devices or PDs, such as non-volatile (NV) SSDs such as NVRAM devices that are external with respect to both of the nodes or storage controllers. The caching devices or PDs used to implement the cache can be configured in a RAID group of any suitable RAID level for data protection. In at least one embodiment, the caching PDs form a shared non-volatile cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs as discussed elsewhere herein. In at least one embodiment, a portion of each node's local volatile memory can also be used for caching information, such as blocks or pages of user data and metadata. For example, such node-local cached pages of user data and metadata can be used in connection with servicing reads for such user data and metadata.

In the following paragraphs, the one or more caching devices or PDs may be referred to as a data journal or log used in the data storage system. In such a system, the caching devices or PDs are non-volatile log devices or PDs upon which the log is persistently stored. It should be noted that as discussed elsewhere herein, both nodes can also each have local volatile memory used as a node local cache for storing data, structures and other information. In at least one embodiment, the local volatile memory local to one of the nodes is used exclusively by that one node.

In a data storage system, minimizing the latency of I/O requests is a critical performance metric. In at least one data storage system using the dual node architecture such as described in connection with FIG. 2A, for write operations, latency can be affected by the amount of time taken to store the write data in the log where the write data is visible to both nodes or controllers of the system.

Consistent with other discussion herein, the log file used to log user operations, such as write I/Os, can be used to optimize write operation latency. Generally, a write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse.

It should be noted that the flushing of the log can be performed in response to an occurrence of any one or more defined conditions. For example, the log can be flushed in response to determining that the amount of reclaimed log space available for use and allocation is less than a specified threshold amount or size.

In at least one embodiment, a metadata (MD) structure of mapping information can be used in accordance with the techniques herein. The mapping information can be used, for example, to map a logical address, such as a LUN and an LBA or offset, to its corresponding storage location, such as a physical storage location on BE non-volatile PDs of the system. Consistent with discussion elsewhere herein, write requests or operations stored in the log can be flushed to the BE PDs (non-volatile) providing storage locations for the written data. For example, a logged write operation that writes first data to a logical address can be flushed whereby the logged first data is written out to a physical storage location on a BE PD. The mapping information can be used to map the logical address to the physical storage location containing the content or data stored at the logical address. In at least one embodiment, the mapping information includes a MD structure that is hierarchical structure of multiple layers of MD pages or blocks.

Figure 3:
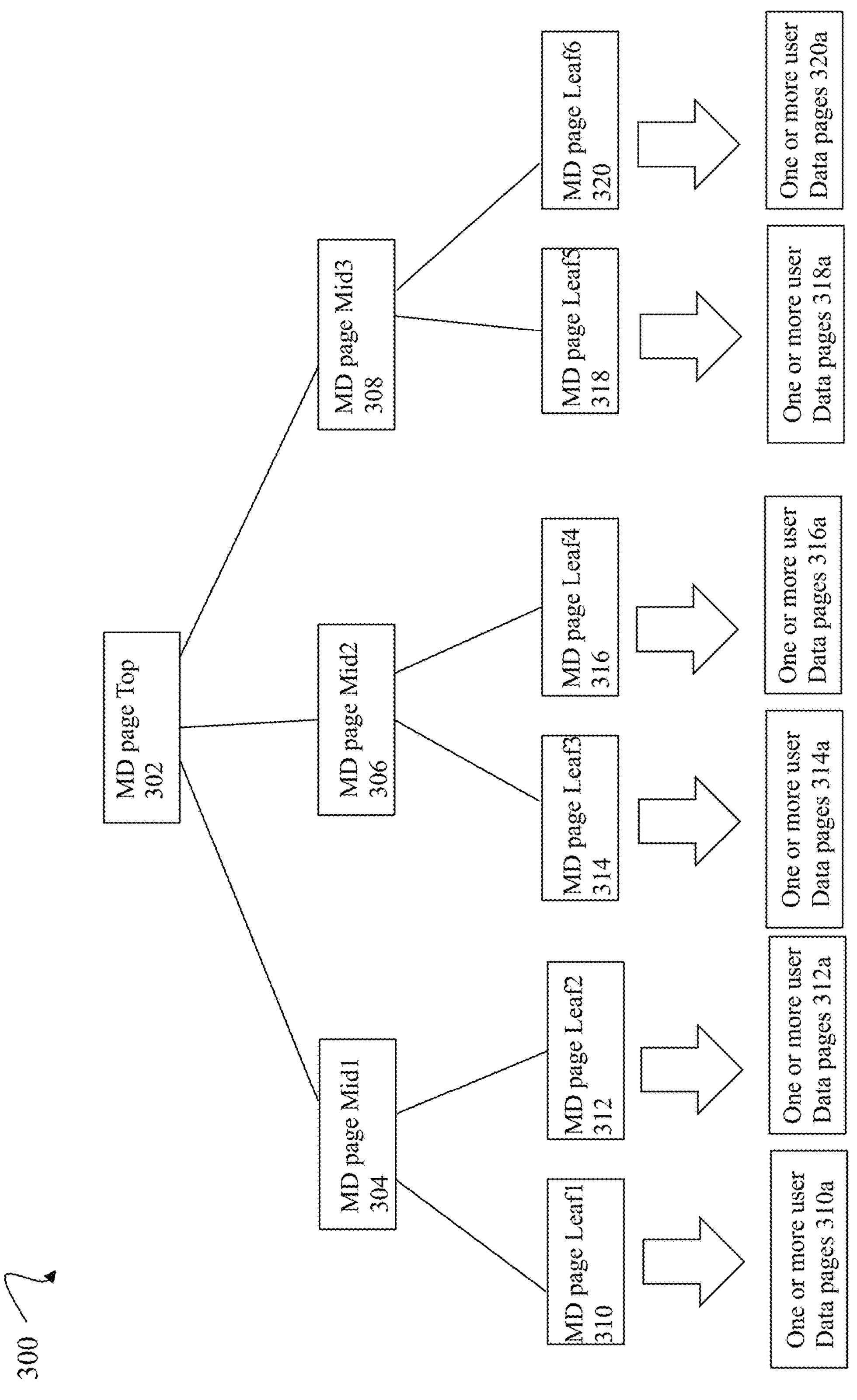
FIGS. 3, 4, 5 and 6 are examples of mapping information in the form of a metadata structure that can be used in connection with mapping logical addresses to physical addresses or storage locations in at least one embodiment in accordance with the techniques of the present disclosure.

In at least one embodiment, the mapping information or MD structure for a LUN, such as a LUN A, can be in the form of a tree having a plurality of levels of MD pages. More generally, the mapping structure can be in the form of any ordered list or hierarchical structure. In at least one embodiment, the mapping structure for the LUN A can include LUN MD in the form of a tree having 3 levels including a single top or root node (TOP node), a single mid-level (MID node) and a bottom level of leaf nodes (LEAF nodes), where each of the MD page leaf nodes can point to, or reference (directly or indirectly) one or more pages of stored data, such as user data stored on the LUN A. Each node in the tree corresponds to a MD page including MD for the LUN A. More generally, the tree or other hierarchical structure of various MD pages of the mapping structure for the LUN A can include any suitable number of levels, such as more than 3 levels where there are multiple mid-levels. In at least one embodiment the tree of MD pages for the LUN can be a B+ tree, also sometimes referred to as an "N-ary" tree, where "N" indicates that each node in the tree structure can have up to a maximum of N child nodes. For example, in at least one embodiment, the tree of MD pages for the LUN can specify N=512 whereby each node in the tree structure can have up to a maximum of N child nodes. For simplicity of illustration, the tree structure of MD pages, corresponding to the mapping structure in at least one embodiment, is represented in FIG. 3 as including only 3 levels where each node in the tree can have at most 3 child nodes. Generally, the techniques herein can be used with any layered or hierarchical structure of MD pages.

Before describing in more detail the mapping information of MD pages that can be used in an at least one embodiment to map a logical address to a corresponding physical storage location or address, further details are described in connection with using a log for logging user or client operations, such as write I/Os.

Consistent with other discussion herein, the log can be used to optimize write operation latency. Generally, the write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse. The write operation can be recorded in the log in any suitable manner and can include, for example, recording a target logical address to which the write operation is directed and recording the data written to the target logical address by the write operation.

In the log, each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques of the present disclosure is provided below.

Figure 2B:
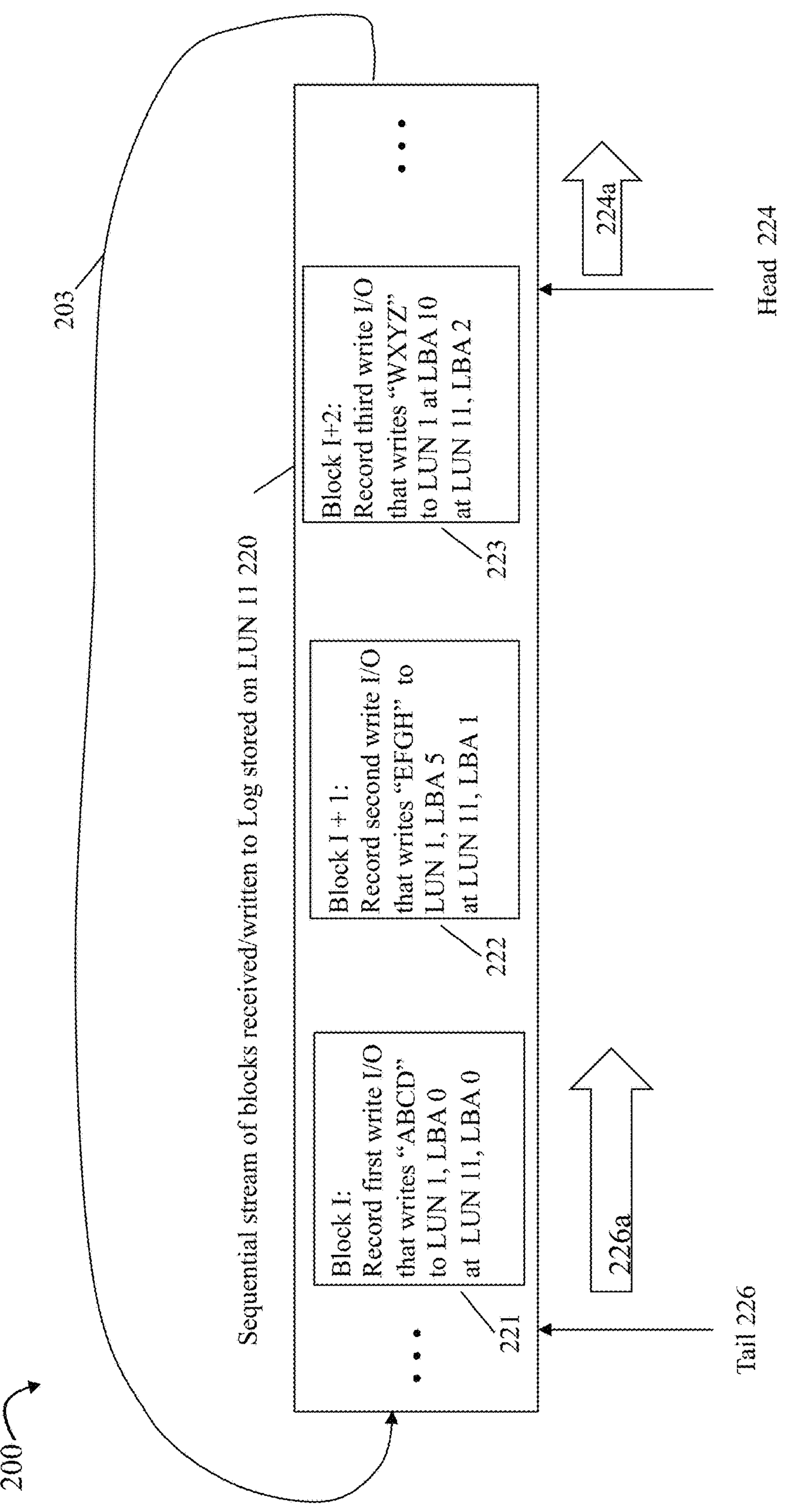
FIGS. 2B and 2C are examples illustrating use of a log or journal recording client operations in at least one embodiment in accordance with the techniques of the present disclosure.

Referring to FIG. 2B, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 can be written sequentially in the foregoing order for processing in the data storage system. The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation. The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 2B, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224*a* to the next record in the log as each next write I/O operation is recorded. When the head pointer 224 reaches the end of the log by writing to the last sequential block or record of the log, the head pointer can advance 203 to the first sequential block or record of the log in a circular manner and continue processing. The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226*a* sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer advances 203 to the first sequential block or record of the log in a circular manner and continue processing. Thus, the circular logical manner in which the records or blocks of the log are processed form a ring buffer in which the write I/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information as described elsewhere herein. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

The log 200 can be an examples of information that can be included, for example, in a log of user or client write operations, in an embodiment in accordance with the techniques of the present disclosure. In at least one embodiment, the log records such as 221-223 can also each record or denote the write data or data changed (e.g., write I/O operation payload).

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. In some embodiments, portions of the log can be flushed in parallel in accordance with any necessary constraints needed in order to maintain data consistency. Such constraints can consider any possible data dependencies between logged writes (e.g., two logged writes that write to the same logical address) and other logged operations in order to ensure write order consistency.

Figure 2C:
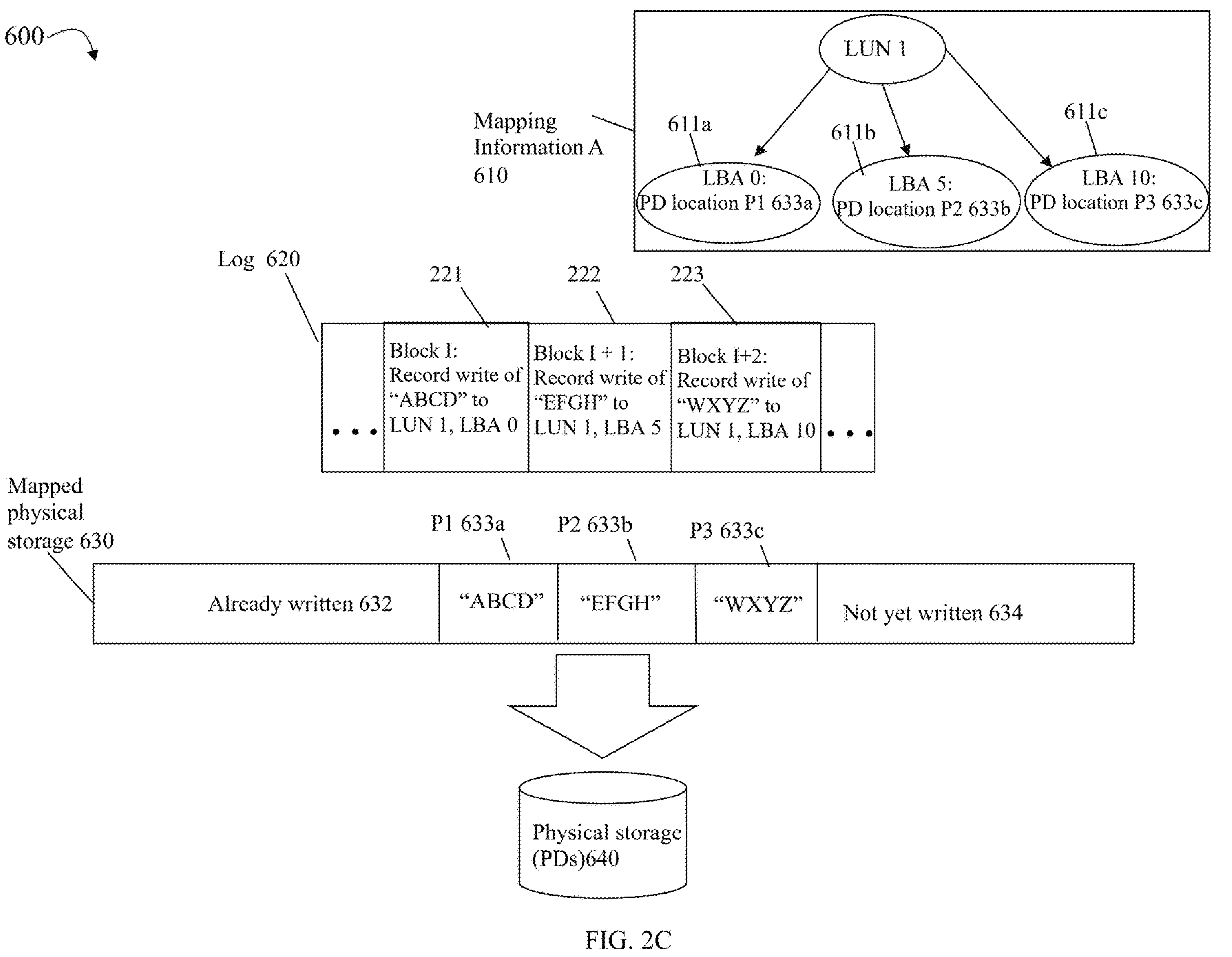

Referring to FIG. 2C, shown is an example 600 illustrating the flushing of logged writes and the physical data layout of user data on BE PDs in at least one embodiment in accordance with the techniques of the present disclosure. FIG. 2C includes the log 620, the mapping information A 610, and the physical storage (i.e., BE PDs) 640. The element 630 represents the physical layout of the user data as stored on the physical storage 640. The element 610 can represent the logical to physical storage mapping information A 610 created for 3 write I/O operations recorded in the log records or blocks 221, 222 and 223.

The mapping information A 610 includes the elements 611*a*-*c* denoting the mapping information, respectively, for the 3 target logical address of the 3 recorded write I/O operations in the log records 221, 222, and 223. The element 611*a* of the mapping information denotes the mapping information for the target logical address LUN1, LBA 0 of the block 221 of the log 620. In particular, the block 221 and mapping information 611*a* indicate that the user data "ABCD" written to LUN 1, LBA 0 is stored at the physical location (PD location) P1 633*a* on the physical storage 640. The element 611*b* of the mapping information denotes the mapping information for the target logical address LUN1, LBA 5 of the block 222 of the log 620. In particular, the block 222 and mapping information 611*b* indicate that the user data "EFGH" written to LUN 1, LBA 5 is stored at the physical location (PD location) P2 633*b* on the physical storage 640. The element 611*c* of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633*c* on the physical storage 640.

The mapped physical storage 630 illustrates the sequential contiguous manner in which user data can be stored and written to the physical storage 640 as the log records or blocks are flushed. In this example, the records of the log 620 can be flushed and processing sequentially (e.g., such as described in connection with FIG. 2B) and the user data of the logged writes can be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses can be updated. The user data of the logged writes can be written to mapped physical storage sequentially as follows: 632, 633*a*, 633*b*, 633*c* and 634. The element 632 denotes the physical locations of the user data written and stored on the BE PDs for the log records processed prior to the block or record 221. The element 633*a* denotes the PD location P1 of the user data "ABCD" stored at LUN 1, LBA 1. The element 633*b* denotes the PD location P2 of the user data "EFGH" stored at LUN 1, LBA 5. The element 633*c* denotes the PD location P3 of the user data "WXYZ" stored at LUN 1, LBA 10. The element 634 denotes the physical locations of the user data written and stored on the BE PDs for the log records processed after the block or record 223.

In one aspect, the data layout (e.g., format or structure) of the log-based data of the log 620 as stored on non-volatile storage can also be physically sequential and contiguous where the non-volatile storage used for the log can be viewed logically as one large log having data that is laid out sequentially in the order it is written to the log.

The data layout of the user data as stored on the BE PDs can also be physically sequential and contiguous. As log records of the log 620 are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage 630.

Consistent with other discussion herein, the mapped physical storage 630 can correspond to the BE PDs providing BE non-volatile storage used for persistently storing user data as well as metadata, such as the mapping information. With a log-structured system as discussed herein, as recorded writes in the log are processed, the data written by the writes can be written to new physical storage locations on the BE PDs.

Referring to FIG. 3, shown is an example 300 of a tree of MD pages that can be used in an embodiment in accordance with the techniques herein. The example 300 includes a tree of MD pages denoting the mapping structure as discussed above with 3 levels-a top or root level, level 1, including a single MD TOP page; a single mid or middle level, level 2, of MD MID pages; and a bottom level, level 3, of leaf nodes of MD LEAF pages. In the example 300, the top or root level, level 1, includes MD page 302; the mid or middle level, level 2, includes MD pages 304, 306 and 308; and the bottom level, level 3, includes MD pages 310, 312, 314, 316, 318 and 320, which can also be referred to as leaf nodes. As also illustrated in the example 300, each of the leaf MD pages in level 3 of the tree points to, or references (e.g., directly or otherwise indirectly using one more additional levels of indirection of pointers not illustrated) one or more user data pages or blocks including data stored at various LBAs of a LUN such as the LUN A. For example, MD pages 310, 312, 314, 316, 318 and 320 point or reference, respectively, one or more UD pages 310*a*, 312*a*, 314*a*, 316*a*, 318*a* and 320*a*.

The links or connections between a parent node (at level M) and its one or more child nodes (at level M+1) in the tree 300 generally represent mappings between the parent node and the one or more child nodes. In at least one embodiment, the parent node can include a reference used to access (directly or indirectly) each of its one or more child nodes. For example, the root node MD page top 302 can include addresses or pointers used to access each of its child nodes 304, 306 and 308. The mid-level node MD page mid1 304 can include addresses or pointers used to access each of its child leaf nodes 310, 312. The mid-level node MD page mid 306 can include addresses or pointers used to access each of its child leaf nodes 314, 316. The mid-level node MD page mid 308 can include addresses or pointers used to access each of its child leaf nodes 318, 320.

In at least one embodiment, each of the addresses or pointers included in a MD page that references a location in another MD page or references a location in a UD page can be a physical storage location on the back-end PDs. Thus, the traversal between connected nodes of the structure 300 can correspond to traversing physical address or storage locations included in pages or nodes that are parent nodes.

In connection with accessing a particular UD page in at least one embodiment, all MD pages in a path from the root or top level of the tree to the UD page can be traversed in a consecutive serialized order in which such pages appear in the path traversal down the path from the top or root level to the UD page accessed using a particular one of the MD page leaf nodes. For example, assume UD page or block X is included in the set of UD pages 312*a*. In order to access UD page X of 312*a*, the following denotes the consecutive serialized order in which the MD pages forming a sequence are accessed: MD page top 302, MD page mid1 304, and MD page leaf2 312. Generally, in at least one embodiment, each of the MD pages can include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 302, MD page mid1 304, and MD page leaf2 312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 300 can generally include multiple pointers or references to locations of its child nodes or pages. For example, MD page top 302 includes pointers to locations of its child nodes, MD pages 304, 306 and 308. MD page mid2 306 includes pointers to locations of its child nodes, MD pages 314 and 316.

The data pages 310*a*, 312*a*, 314*a*, 316*a*, 318*a* and 320*a* include UD stored on particular logical addresses of a LUN's address space, such as the LUN A's logical address space. In at least one embodiment each MD leaf can hold MD for a specified number of LBAs of a LUN. For example, in one embodiment each MD leaf can hold MD for 512 LBAs. For example, with reference to FIG. 3, the data pages 310*a*, 312*a*, 314*a*, 316*a*, 318*a* and 320 each include user data stored on particular logical addresses of the LUN A's logical address space. It may be, for example, that element 310*a* includes user data stored at a first set of LBAs 0-511; and that element 312*a* includes user data stored at a second set of LBAs 512-1023. Generally, the particular LBAs of the LUN mapped to each MD page can vary with embodiment. For example, in at least one embodiment, consecutive sequential subranges of the LUN's logical address space can be mapped to the MD page leaves. Additionally, when the tree is traversed in a depth first manner, the MD page leaves can correspond to consecutive sequential subranges. For example, the element 310*a* denotes data pages for LBAs 0-511; the element 312*a* denotes data pages for the LBAs 512-1023; the element 314*a* denotes data pages for LBAs 1024-1535; the element 316*a* denotes data pages for LBAs 1536-2047, and so on.

As generally known in the art, a depth-first traversal is an algorithm for traversing or tree or graph data structures. The algorithm starts at the root node (selecting some arbitrary node as the root node in the case of a graph) and explores as far as possible along each path extending from the root to a leaf node before backtracking up the path to find a yet another unexplored path. In at least one embodiment, traversal of the tree 300 of MD pages in a depth-first manner explores all paths, in sequential order, from the left-most path to the right most path as arranged in the tree.

In at least one embodiment, when the structure 300 is traversed in a depth first manner (i.e., from the left-most path to the right most path as arranged in the tree), the MD page leaf nodes that occur in the depth first traversal correspond to consecutive sequential LBA subranges of a LUN. In at least one embodiment, when the overall tree including MD page top node 302 and all its descendant nodes are traversed in this depth first manner, the MD page leaf nodes that occur in the depth first traversal correspond to consecutive sequential LBA subranges of a LUN.

In at least one embodiment as described herein, each of the MD pages and data blocks in the example 300 can be of a predetermined size and each of the MD pages can hold a known number of entries containing pointer or address values. In such a case and in combination with the correspondence of sequential consecutive LBA ranges of each MD leaf page, an embodiment can perform a calculation to determine the MD page at a particular level that is accessed in the tree MD mapping structure 300 to determine the data block for a particular LUN and LBA. Similarly, it is a straightforward mathematical calculation to determine the index, offset of entry in a particular page or node to be accessed in connection with obtaining data blocks stored at the particular LUN and LBAs of the LUN. Each MD page in 300 can be known to include MD relevant for accessing data on a particular LUN and one or more LBAs of that LUN. For example, consistent with discussion above, the element 310*a* denotes the data blocks for LBAs 0-511 of a LUN. In order to access the data block for an LBA of the LUN in the LBA subrange 0-511, MD pages 302, 304 and 310 can be traversed in sequential order. In particular, the first entry or offset of the MD page top 302 can contain the address of the MD page mid 1 304; the first entry or offset of the MD page mid 1 304 can contain the address of the MD page leaf 1 310; and the first entry or offset of the MD page leaf 1 310 can contain the address of one of the data blocks of 310*a*.

In a similar manner, a mapping can be made regarding what MD pages of the structure 300 and entries thereof are used in connection with obtaining data blocks containing data for any particular LUN and LBA. In at least one embodiment, the particular MD pages used to access a data block including data for a particular LUN and LBA can be known based on such mappings and correspondence of LBA subranges to particular MD leaf pages.

Figure 4:
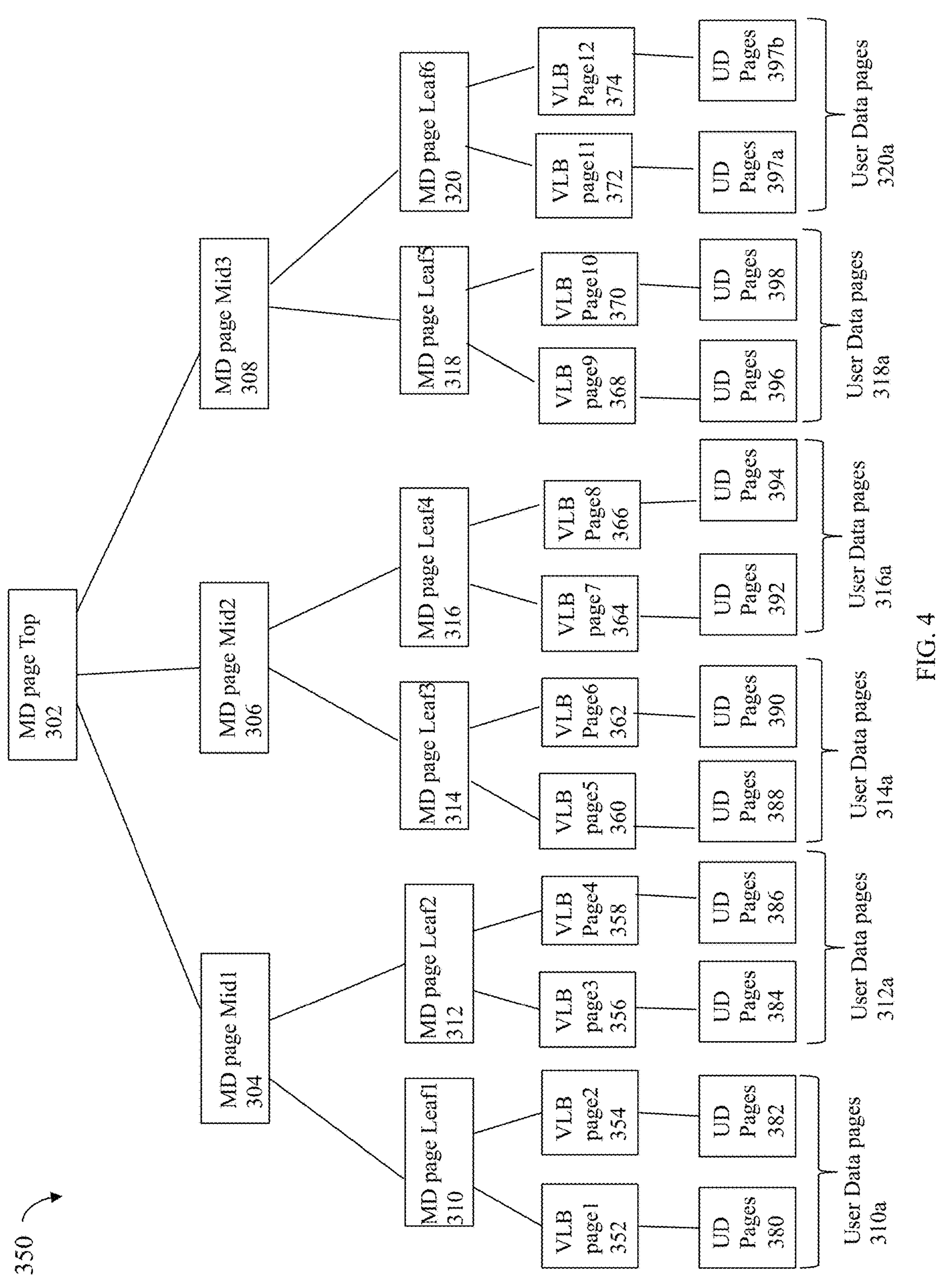

Referring to FIG. 4, shown is a more detailed version of a hierarchical structure used as the mapping structure 108 that can be used in an embodiment in accordance with the techniques of the present disclosure. The structure 350 is similar to the structure 300 as described and illustrated in FIG. 3 with the added difference that more detail is provided regarding the intervening layer of a VLB (virtualization layer block) MD pages between the MD page leaves and the UD pages. Thus, in such an embodiment, the structure 350 includes 4 levels of MD pages as opposed to the possible 3 levels as allowed in the more generalized structure 300 represented in FIG. 3. In this case, each sequence of MD pages traversed in a path from the MD page top or root to access a particular UD page includes 4 MD pages-MD page top 302, one of the MD page Mid nodes (e.g., one of 304, 306 or 308), one of the MD page leaf nodes (e.g., one of 310, 312, 314, 316, 318 and 320), and one of the VLB pages (e.g., one of 352, 354, 356, 358, 360, 362, 364, 366, 368, 370, 372 and 374).

In at least one embodiment, the use of VLBs as a layer in the hierarchy between the MD leaf nodes and the UD pages can be used to facilitate different data storage services, such as relocating UD between different physical storage location, data deduplication, and the like. An entry of the VLB associated with a particular physical storage location can be remapped without requiring remapping of a MD leaf to the UD page.

The UD pages 380 and 382 denote two portions of UD pages corresponding to UD pages 310*a* of FIG. 3 including data for LBAs 0-511. The UD pages 384 and 386 denote two portions of UD pages corresponding to UD pages 312*a* of FIG. 3 including data for LBAs 512-1023. The UD pages 388 and 390 denote two portions of UD pages corresponding to UD pages 314*a* of FIG. 3 including data for LBAs 1024-1535. The UD pages 392 and 394 denote two portions of UD pages corresponding to UD pages 316*a* of FIG. 3 including data for LBAs 1536-2047. The UD pages 396 and 398 denote two portions of UD pages corresponding to UD pages 318*a* of FIG. 3 including data for LBAs 2048-2559. The UD pages 397*a* and 397*b* denote two portions of UD pages corresponding to UD pages 320*a* of FIG. 3 including data for LBAs 2560-3072.

In furtherance of the example above regarding UD page X and now with reference to FIG. 4, assume more specifically that UD page X is located in the set of UD pages denoted by 384. In this case, the MD page sequence including the MD pages traversed in order to access UD page X 384 includes MD page 302, MD page 304, MD page 312, and VLB page3 356.

Figure 5:
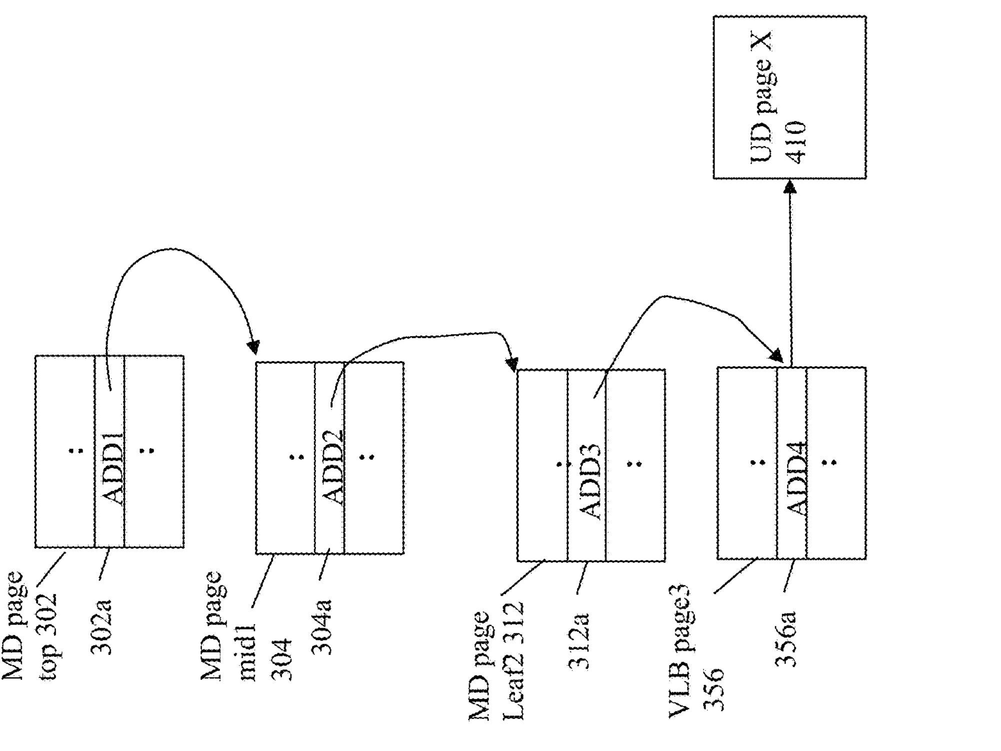

Referring to FIG. 5, shown is a more detailed representation 400 of the MD pages of the sequence traversed to access the UD page X 384 included in the set of UD pages 312*a*. As noted above, the MD page sequence includes MD page 302, MD page 304, MD page 312, and VLB page3 356. In the example 400, MD page top 302 includes an entry or address 302*a* that points to or references the MD page mid1 304. In at least one embodiment, the starting entry 302*a* in the first MD page 302 of the sequence can be determined based on the logical address including the desired UD stored in a page or block of storage (e.g., physical non-volatile storage location on the BE PDs of the system). For example, assume processing is performed to read the UD for LUN A, LBA 514 located in UD page X. In at least one embodiment, the logical address LUN A, LBA 514 can be used to determine the particular structure instance and thus the particular MD page top 302 to access. The LBA 514 of the logical address of the UD can also be used to determine an index or offset into the MD page 302 to determine the relevant entry, location or address 302*a* having a pointer, address or reference to the next MD page in the sequence to access the desired page including the UD for LUN A, LBA 514. An embodiment can generally use any suitable technique to map a corresponding logical address, such as an LBA of a particular LUN, to an entry in the top level MD page 302.

The MD page top 302 can be accessed and read from a PD to obtain the address or pointer ADD1 from location 302*a*. If the MD page 302 is already in cache, the cached copy can be used to obtain the address or pointer ADD1 from the location 302*a*. The address or pointer ADD1 of location 302*a* can then be used to identify the particular mid level MD page, such as MD page mid1 304, that is accessed next in the sequence.

Continuing with the example 400, the MD page mid1 304 can be accessed where the location 304*a* is read to obtain the address or pointer ADD2 from location 304*a*. In at least one embodiment, the particular entry or offset 304*a* of the MD mid1 page can be determined based on the logical address being mapped. The address or pointer ADD2 can then be used to identify the particular leaf level MD page, such as MD page leaf2 312, that is next accessed in the sequence. If the MD page mid1 304 is not in cache, the on-disk copy of the MD page 304 on a PD can be accessed to read the address or pointer ADD2 from the location 304*a*. The address or pointer ADD2 identifies the MD page leaf 2 312. If the MD page 312 is not already in cache, the on-disk copy of the MD page 312 on a PD can be read to obtain the content of location 312*a*. In at least one embodiment, the particular desired entry or offset 312*a* of the MD leaf2 page 312 can be determined based on the logical address being mapped. The location 312*a* of the MD page leaf2 312 can be accessed and read to obtain the address or pointer ADD3 from location 312*a*. The address or pointer ADD3 can then be used to identify a particular entry of a VLB page, such as the entry 356*a* of the VLB page3 356, that is next accessed in the sequence. Thus, ADD3 can denote the location or address of the entry 356*a* in the VLB page 3 356.

If the VLB page 356 is not already in cache, the on-disk copy of the VLB page 356 on a PD can be read to obtain the content of location 356*a*. The location 356*a* of the VLB page 3 356 can be accessed and read to obtain the address or pointer ADD4 from the location 356*a*. The address or pointer ADD4 can then be used to identify the particular UD page X 410 where the UD page X can next be read. If the UD page X is not in cache, the on-disk copy of the UD page X can be read in from a PD.

The example 400 of FIG. 5 includes the path or traversal of MD pages in the structure 350 from the MD page root or top 302 to the UD page X of 384 including the desired UD for the logical address LUN A, LBA 514. The path or traversal of MD pages 302, 304, 312, 356 and 384 denotes the sequence of MD pages read and accessed in order to obtain the UD page X of 384.

For a read I/O operation received at a node of a dual node system or appliance such as in an active-active configuration, servicing the read operation can include reading one or more data blocks or storage locations as well as reading information from one or more MD pages such as, for example, of the MD or mapping structure as described in connection with FIGS. 3-5.

For a write I/O operation received at a node of a dual node system or appliance such as in an active-active configuration, servicing the write operation can include reading information from one or more MD pages. Servicing the write operation can include updating one or more data blocks or storage locations as well as updating one or more MD pages such as, for example, of the MD or mapping structure as described in connection with FIGS. 3-5.

In at least one embodiment, the MD or mapping information used in connection with stored user data can be stored on non-volatile storage, such as on the BE PDs of the appliance or data storage system. At least some of the MD pages of mapping information for all such user data can be stored in a volatile memory cache of each of the nodes of the appliance or system. Depending on the write operation, one or more logical addresses can be updated with new data or content by a write operation. Additionally, one or more MD pages used to map the one or more logical addresses to one or more physical storage locations storing the new data can also be updated, for example, to reference the one or more physical storage locations including the new data or content.

With a log-structured system (LSS) in at least one embodiment, as recorded writes of the log are processed and flushed or destaged to the BE PDs, the content written by the recorded writes of the log can be stored at new subsequent physical storage locations on the BE PDs. Additionally, the MD or mapping information corresponding to the logged writes being flushed can also be accordingly updated to reference the new subsequent physical storage locations on the BE PDs containing the content. In a dual node appliance or system with an active-active configuration as described herein, both nodes of the system can concurrently receive and service write I/Os, as well as other received requests and commands using shared resources such as, for example, the MD or mapping structure described in connection with the FIGS. 3-5.

In at least one embodiment, each VLB can be a VLB page or node as described herein including multiple entries, such as 512 entries, where each such VLB entry can include one or more fields of information such as the address or pointer to a physical storage location of stored content or data. Additionally in at least one embodiment, each VLB entry pointing to or associated with stored content or data can also include a reference count denoting a number of references or logical addresses that store the content or data. In at least one embodiment, multiple MD leaf entries corresponding to multiple logical addresses of used data or content can all reference or point to the same VLB entry thereby denoting that such multiple logical addresses all store the same content or data associated with the VLB entry.

The reference count of a VLB entry can be updated in connection with deduplication processing and/or as used data or content stored at various logical addresses changes. For example, deduplication processing can be performed on new data written to a target logical address by a write I/O operation. Deduplication processing can determine that the new data is a duplicate of existing data stored in a data block or page. Rather than store another copy of the same data in another data block or page, deduplication processing can include alternatively having the target logical address reference the single existing copy of the data as stored in the data block or page. As part of deduplication processing, the reference count associated with the single existing copy of the data block or page can be incremented as each additional reference to the same data block or page is made. In a similar manner, the reference count can be decremented as content of a particular logical address is modified or deleted to no longer be considered a duplicate of the single existing copy of the data block or page.

Figure 6:
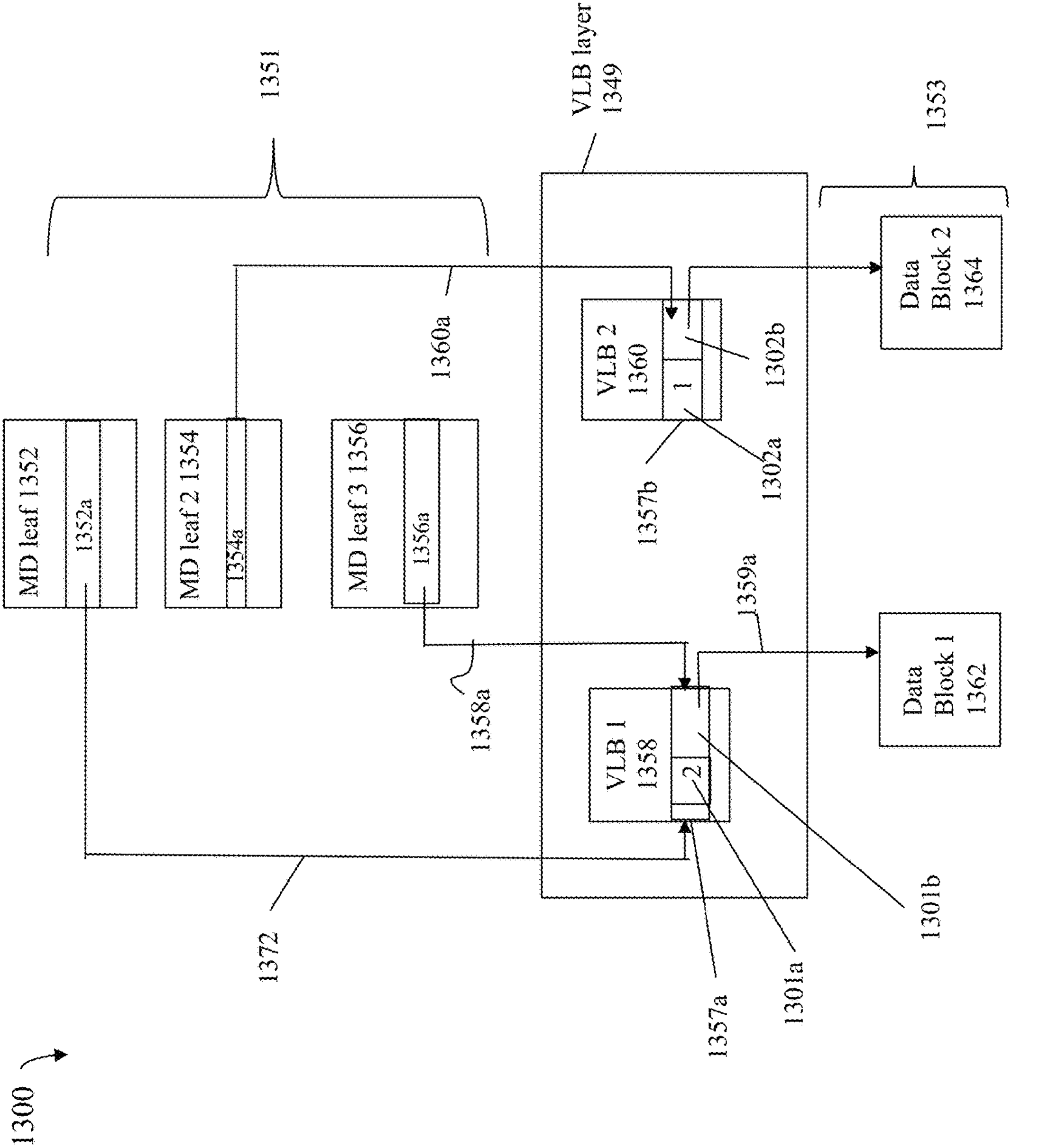

Referring to FIG. 6, shown is an example illustrating in more detail a particular embodiment in which a VLB layer of multiple VLBs is the intervening layer between the MD leaf nodes of the mapping structure 108 and the data blocks or pages. The elements 1352, 1354 and 1356 can denote 3 MD leaf nodes included in a MD leaf layer of a MD mapping structure such as described herein (e.g., in FIGS. 3, 4 and 5). The elements 1358 and 1360 denote 2 VLBs included in the intervening VLB layer 1349 between MD leaf nodes 1351 and data blocks 1353. The elements 1362 and 1364 denote 2 data blocks each storing content such as user data stored at logical addresses. Consistent with other discussion herein, each MD leaf entry of a MD leaf node can correspond uniquely to a particular logical address at which content is stored, where the physical location or address of the content is further mapped to the MD leaf entry through a VLB entry referenced by the MD leaf entry.

In the example 1300, the MD leaf nodes 1352 and 1356 have respective entries 1352*a*, 1356*a* both of which indirectly reference the same data block 1362 through the same entry 1357*a* of the VLB 1358. The two MD leaf node entries 1352*a* and 1356*a* both referencing the same data block 1362 indirectly through use of the same VLB entry 1357*a* can be a mapping resulting from data deduplication processing. Each of the MD leaf nodes 1352*a*, 1356*a*, can correspond to two different logical addresses both referencing the same content of the same data block 1362. In the example 1300, MD leaf node entry 1354*a* points to the entry 1357*b* of the VLB 1360 whereby the entry 1357*b* of the VLB2 1360 then further references or points to the data block 1364. The data blocks 1362, 1364 can denote user data blocks or pages as described herein. The element 1358*a* denotes a pointer to, or address of, the entry 1357*a* in the VLB 1358 used in connection with obtaining the data block 1362 stored on a particular LUN and LBA of the LUN. The pointer 1358*a* can be used as the virtual or indirect pointer in connection with obtaining the data block 1362. In at least one embodiment, the VLB 1358 can be a VLB page or node as described herein. Thus, in such an embodiment, the virtual or indirect pointer 1358*a* can be a pointer to the entry 1357*a* of the VLB structure 1358, where the entry 1357*a* can further include fields 1301*a* and 1301*b*. The field 1301*b* can be a pointer to, or address of, the user data block 1362. The field 1301*a* can be a reference count or counter indicating the number of instances of, or references to, the particular data block 1362 (e.g., data block pointed to by 1301*b*).

The element 1372 denotes a pointer to, or address of, the entry 1357*a* in the VLB 1358 used in connection with obtaining the data block 1362 stored on a particular LUN and LBA of the LUN. The pointer 1372 can be used as the virtual or indirect pointer in connection with obtaining the data block 1362. In at least one embodiment, the VLB 1358 can be a VLB page or node as described herein. Thus, in such an embodiment, the virtual or indirect pointer 1372 can be a pointer to the entry 1357*a* of the VLB structure 1358, where the entry 1357*a* can further include the fields 1301*a* and 1301*b*. The field 1301*b* can be a pointer to, or address of, the user data block 1362. The field 1301*a* can be a reference count or counter indicating the number of instances of, or references to, the particular data block 1362 (e.g., data block pointed to by 1301*b*).

The element 1360*a* denotes a pointer to, or address of, the entry 1357*b* in the VLB 1360 used in connection with obtaining the data block 1364 stored on a particular LUN and LBA of the LUN. The pointer 1360*a* can be used as the virtual or indirect pointer in connection with obtaining the data block 1364. Thus, in such an embodiment, the virtual or indirect pointer 1360*a* can be a pointer to the entry 1357*b* of the VLB structure 1360, where the entry 1357*b* can further include the fields 1302*a* and 1302*b*. The field 1302*b* can be a pointer to, or address of, the user data block 1364. The field 1302*a* can be a reference count or counter indicating the number of instances of, or references to, the particular data block 1362 (e.g., data block pointed to by 1302*b*).

The reference count 1301*a* can be initialized to 1 when a first or initial instance of the associated data block 1362 is stored. In this example, the reference count 1301*a* is 2 indicating that there are 2 instances of the data block 1362 stored in user data, and thus 2 references to the data block 1362. The instances and references denoted by the reference count 1301*a* include all deduplicated instances corresponding to entries 1352*a*, 1356*a* respectively of the MDL leaves 1352, 1356 that respectively point 1372, 1358*a* to the VLB entry 1357*a* associated with the single copy of the data block 1362.

The reference count 1302*a* can be initialized to 1 when a first or initial instance of the associated data block 1364 is stored. In this example, the reference 1302*a* is 1 indicating that there is 1 instance of the data block 1364 and thus 1 reference to the data block 1364. The instances denoted by the reference count 1302*a* generally include any/all deduplicated instances associated with the single copy of the data block 1364. However, in this example, there is only a single reference to, and single instance of, the data block 1364 in stored user data. In particular, the entry 1354*a* of MD leaf 1354 references or points (1360*a*) to the VLB entry 1357*b* associated with the single copy of the data block 1364.

In at least one embodiment, each VLB can be a VLB page or node as described herein including multiple entries, such as 512 entries, where each such VLB entry can include one or more fields of information such as the address or pointer to one of the data blocks or data pages such as 1362 or 1364.

An embodiment of a data storage system in accordance with the techniques of the present disclosure may perform different data processing operations or services on stored user data. For example, the data storage system may perform one or more data reduction operations, such as data deduplication. Such data reduction operations attempt to reduce the amount of storage needed for storing data on non-volatile backend storage devices (e.g., PDs) with the goal of reducing the cost per unit of storage consumed (e.g., dollar cost per GB of storage).

In at least one embodiment, use of the VLB layer of VLB pages or blocks can be characterized as providing an insulating layer allowing for decoupling or isolating the physical storage locations of user data from the logical addresses corresponding to MD leaf entries. In this manner, content or user data can be relocated or moved between physical storage locations whereby corresponding VLB entries can be updated to reflect any change in physical storage locations of user data, and where no changes or updates need to be made to the MD leaf entries since such MD leaf entries can directly reference the corresponding VLB entries rather than directly reference the physical storage locations.

Consistent with discussion herein in at least one embodiment, a data storage system can use a log (sometimes referred to as a user data (UD (log)) for recording user or client writes of user data (UD) pages. The data storage system can maintain the persistently stored user data or client data as a log structured system (LSS) which can be characterized by typically not performing in place updates which overwrite existing content. In the LSS for user data, flushing one or more UD log entries which update a UD page stored at an existing physical storage location (e.g., on BE PDs) can include determining an updated version of the UD page and storing the updated version of the UD page at a new physical storage location that is different from the existing physical storage location. Thus, the physical storage location of the UD page (as stored persistently on the BE PDs) mapped to a particular UD logical address can move or change each time the content or data of the particular UD logical address is updated.

In at least one embodiment, the data storage system can perform data deduplication (sometimes referred to as deduping). In at least one embodiment, data deduplication can include page aligned deduplication where processing can search for matches between ingested aligned data pages and stored aligned data pages.

Mapping information including a chain of metadata (MD) pages can be used in connection with mapping user data (UD) logical addresses to corresponding storage locations including content stored at the UD logical addresses. Thus as the physical storage location of content stored at a UD logical address changes when there is a write to the UD logical address, corresponding mapping information of one or more MD pages may be accordingly updated.

An entry E1 from the UD log can be an update, such as a client or host write I/O, to a logical address (e.g., volume or logical device and LBA or logical block address) LA1 which writes a UD page U1 of content to the corresponding UD logical address LA1.

Flushing the UD log entry E1 that writes the UD page U1 to LA1 can also include performing deduplication processing to determine whether U1 is a duplicate of an existing data page P1 already stored on the data storage system. In at least one embodiment, deduplication processing can include performing page aligned deduplication in connection with written UD pages having corresponding flushed UD log entries. If page aligned deduplication processing determines that U1 is a duplicate of an existing data page P1 already stored at the physical location PA1 on the system, U1 can be stored as a duplicate of the existing data page P1 rather than as another duplicate copy of the same content. If page aligned deduplication processing determines that U1 is not a duplicate of an existing data page, processing can include storing U1 as a new data page at a new physical location PA2 on BE non-volatile storage.

Additionally, flushing the entry E1 from the UD log can include creating and/or updating the corresponding MD pages which map the UD logical address LA1 to its corresponding BE PD location including the current valid content stored at the UD logical address. In at least one embodiment, the MD pages of the mapping information can be characterized as the chain forming an access sequence including a top MD page, a mid MD page, a leaf MD page, and a VLB (virtual layer or virtualized layer) page, where each page in the foregoing sequence can be accessed in the foregoing sequential order of the sequence. Thus, flushing E1 from the UD log can include mapping a corresponding MD leaf entry MDLE1 for LA1 to the corresponding physical address PA1 where U1 is stored. In at least one embodiment, if U1 (as written by the UD log entry E1) is determined to be a page-aligned duplicate of the existing page P1, then the MD leaf entry MDLE1 associated with the logical address LA1 of U1 can point to an already existing VLB entry VLBEx that further points to the storage location or address where the existing data page P1 is stored. In at least one embodiment, if U1 is determined to be an unaligned or sector aligned duplicate of the existing page P1, then the MD leaf entry MDLE1 associated with the logical address LA1 of U1 can i) point to an already existing VLB entry VLBEx that further points to the storage location or address PA1 where the existing data page P1 is stored (as noted above for a page-aligned duplicate), and ii) further include an offset denoting a sector offset within P1. If U1 is determined to be a unique data page (e.g., not a duplicate of an existing page), then MDLE1 can reference another VLB entry VLBEy which can further reference PA2 where U1 is stored as a new data page.

In at least one embodiment, page aligned deduplication processing can use the dedupe index or data store described, for example, in the following paragraphs in connection with FIGS. 7 and 8.

In at least one embodiment, deduplication processing can also include performing sector aligned deduplication, or more generally, unaligned or non-page aligned deduplication processing.

In the following paragraphs below is an initial discussion of data deduplication processing including page aligned deduplication that can be performed in at least one embodiment in accordance with the techniques of the present disclosure. Subsequently, there is a discussion of sector aligned deduplication, or more generally, unaligned or non-page aligned deduplication processing which can be performed in at least one embodiment of the techniques of the present disclosure.

In at least one embodiment in accordance with techniques of the present disclosure, data deduplication processing performed may include hash value computation using any suitable hashing algorithm. Data deduplication generally refers to removing redundant or duplicate data portions. Data deduplication techniques may include looking for duplicate data blocks or pages whereby only a single instance of the data block or page is retained (stored on physical storage). Pointers or references may be used in connection with duplicate or redundant copies, where each pointer or reference can identify a single stored instance of the data block or page.

Figure 7:
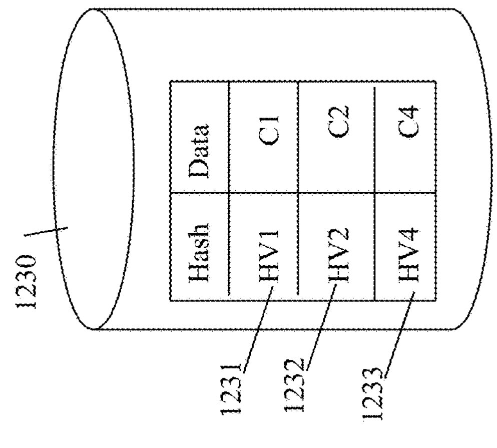
FIG. 7 is an example illustrating use of hashing in at least one embodiment in accordance with the techniques of the present disclosure.
Figure 7:
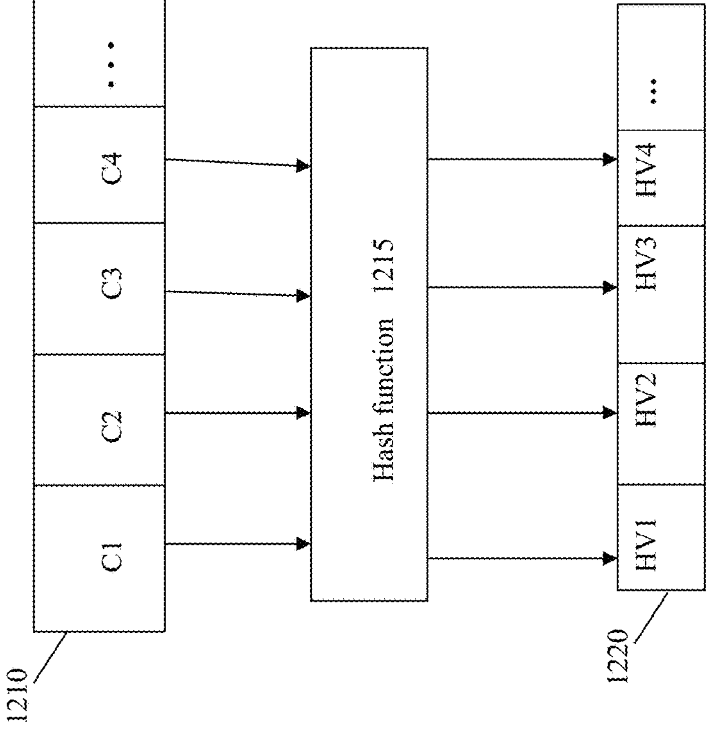

Referring to FIG. 7, shown is an example 1200 illustrating processing that may be performed in connection with data deduplication processing in an embodiment in accordance with techniques of the present disclosure. The element 1210 may denote the original data being written or stored on back-end non-volatile storage. The original data may be partitioned into multiple data pages C1, C2, C3, C4 and the like. In at least one embodiment and for purposes of illustration, the data pages may all be the same size where the size may vary with embodiment. Each page of data can be provided as an input to hash function 1215. For each data page of 1210, the hash function 1215 may perform processing and generate, as an output, a hash value, hash or digest derived from the corresponding data page of 1210. The element 1220 includes hashes HV1, HV2, HV3, HV4, and the like, where a corresponding different one of the hashes DN is generated for each one of the data pages CN (where "N" is an integer denoting the data page and associated hash value generated for that data page). For example, HV1 is the hash generated for C1, HV2 is the hash generated for C2, HV3 is the hash generated for C3, and so on.

Generally, a hash function 1215 can be selected which has an acceptably low probability of a "hash collision" of generating the same digest or hash value for two different input data pages. The strength of the hash function 1215 may be measured by the unlikelihood of a collision occurring where two different input data pages produce the same hash. The strength increases with the bit length of the hash value, hash or digest. Thus, if two data pages, such as C1 and C3, have the same hashes whereby HV1=HV3, then pages C1 and C3 match (e.g., are identical matching data pages). If two data pages, such as C1 and C4, have different hashes whereby HV1 does not equal HV4, then pages C1 and C4 do not match (e.g., are different or non-matching data pages). In cases where two matching or identical pages have the same hash, only a single copy of the data page is stored on backend non-volatile physical storage of the data storage system. In at least one embodiment, the stored instance of the data page may be referenced, directly or indirectly, using a handle, address, or pointer.

The element 1230 of the FIG. 7 may denote the data store used to store data pages. In this example, as noted above, assume pages C1 and C3 are the same with remaining pages C2 and C4 being unique. In at least one embodiment, the data store 1230 may be organized and managed using a data structure, such as a hash table. In at least one embodiment, computed hashes, or portions thereof, may be used as an index into the hash table where the single unique instances of data pages may be stored (along with other metadata as may be needed for maintaining the table and also in accordance with the particular hash table management used in an embodiment). A hash table can use a hash function to compute an index into an array of buckets, slots or entries, from which the desired data can be found. In this example, the data page may be mapped by hash function 1215, and thus by the data page's hash, to a particular entry in the table associated with the stored data page. To further illustrate, the hash function 1215 may be used to generate a hash value, hash or digest for a particular data page. The hash is then further mapped (e.g., such as by another mathematical function, using particular portions of the hash, and the like) to a particular index or entry of the hash table. The particular mapping used to map the hash to a corresponding table entry can vary, for example, with the hash and the size of hash table.

When storing a new data page, such as C1, its hash may be mapped to a particular hash table entry 1231 whereby if the table entry is null/empty, or otherwise does not already include a data page matching C1, then C1 is stored in the table entry along with its associated hash HV1 (this is the first time page C1 is recorded in the data store 230). Otherwise, if there is already an existing entry in the table including a data page matching C1, it indicates that the new data page is a duplicate of an existing data page. In this example as noted above, processing is performed for C1, C2, and C4 respectively, where entries 1231, 1232, and 1233 are added since there are no existing matching entries in the hash table. When processing page C3, as noted above, C3 has a hash HV3 matching HV1 whereby C3 (and thus HV3) maps to entry 1231 of the hash table already including a matching page C1 (so no additional data page is added to 1230 for C3 since C3 is determined as a duplicate of C1). In connection with representing a particular file or other storage entity including multiple duplicate occurrences of a particular page such as C3, the single instance or copy of the data may be stored in 1230. Additionally, a handle or reference, such as identifying the hash table entry 1231, its hash, and the like, may be used to reference the single stored copy of the data page of 1230. When reconstructing or restoring data to its original form, the handle or reference into the hash table for page C3 may be used to obtain the actual data page C3 from 1230.

In at least one embodiment with reference back to FIG. 2A in connection with the inline processing layers 105*a*-*b*, prior to storing the original data on the physical storage 110*a*, 110*b*, data deduplication processing may be performed that converts the original data (as stored in the system cache prior to inline processing) to a resulting form (that may include deduplicated portions) which is then written to physical storage 110*a*, 110*b*. In at least one embodiment, when deduplication processing determines that a portion (such as a page) of the original data is a duplicate of an existing data portion already stored on 110*a*, 110*b*, that particular portion of the original data can be stored in its deduplicated form.

In connection with a read operation to read a page of data, a determination can be made as to whether the requested read data page is stored in its original form (in system cache 104*b* or on physical storage 110*a*, 110*b*), or whether the requested read data page was previously deduplicated. If the requested read data page (which is stored in its original non-deduplicated form) is in the system cache, the read data page can be retrieved from the system cache 104*b* and returned to the host. Otherwise, if the requested read data page is not in the system cache 104*b* but is stored on the physical storage 110*a*, 110*b* in its original form, the requested data page can be read by the BE component 104*c* from the backend storage 110*a*, 110*b*, stored in the system cache and then returned to the host.

If the requested read data page was previously deduplicated, the read data page can be recreated and stored in the system cache in its original form so that it can be returned to the host. Thus, requested read data stored on physical storage 110*a*, 110*b* may be stored in a deduplicated form as noted above where processing is performed by 105*a* to restore or convert the deduplicated form of the data to its original data form prior to returning the requested read data to the host.

When the processor, such as of a processing node 102*a* or 102*b*, performs processing, such as in connection with the inline processing 105*a*, 105*b* as noted above, data may be loaded from the main memory and/or other lower cache levels into its CPU cache. In particular, inline data deduplication (ILD) may be performed as part of the inline processing 105*a*, 105*b*. In at least one embodiment, the size of a data block, page or portion processed by ILD may be 8K bytes in size. More generally, each user data page processed by deduplication can be any suitable size.

In at least one embodiment in connection with deduplication, a deduplication data store (dedupe data store) can be used such as generally described in connection with the element 1230 of the FIG. 7 having a hash table organized by indices which are randomly distributed and can approximate a uniform distribution.

Data deduplication may be performed at the data block, page or portion level of granularity, for example, where each entry of the data store 1230 is mapped to a single unique data page. As sometimes used herein, reference can be made to a dedupe candidate that refers to a data page for which deduplication processing is performed with the goal of eliminating duplicate candidate pages from being stored. A hash may be computed for the candidate data page using a hash function whereby the hash identifies the candidate data page with a high level of uniqueness, even though the hash is typically much smaller than the candidate data page itself. Hashes thus enable data page matching between the candidate and existing data pages in the dedupe data store 1230 to proceed quickly and efficiently. Consistent with discussion above in at least one embodiment, for each hash in an entry of the dedupe data store 1230, the data store 1230 can store a pointer that leads to a stored version, if any, of the respective data page. To perform deduplication on a particular candidate page, a storage system computes a hash of the candidate and searches the dedupe data store 1230, or a cached version thereof, for an entry that matches the computed hash. In at least one embodiment, if a match is found, the storage system may then perform a full data comparison that compares the actual content of the existing stored data page with the content of the candidate page to ensure the existing data page and dedupe candidate have matching content. If the existing and candidate data pages have matching content, processing may arrange metadata of the candidate data page to point to the existing data page that the dedupe data store 1230 has associated with the matching hash. In this manner, storing a duplicate copy of the data page can be avoided. In at least one embodiment, even though two hash values of two data pages can match, the content of the two data pages can be further compared to determine whether the content of the two data pages match. In this manner, matching hash values of the two data pages denotes that the content of the two data pages potentially match, whereby the actual data comparison of the content of the two data pages can be performed to confirm whether the two data pages are identical duplicates or not. In at least one embodiment, if the two hash values of the two data pages do not match, it can be determined that content of the two data pages do not match. Also although hash values of the two data pages can match, it may be that the content of the two data pages does not match thereby indicating that the two pages are not duplicates of one another with respect to the content of such two pages.

Consistent with discussion herein in at least one embodiment, a first hash value can be determined for a candidate data page (dedupe candidate) for which deduplication processing is performed. Existing data pages of the dedupe data store that are potential matches for the dedupe candidate can be found with respect to searching the dedupe data store for a corresponding hash that matches the first hash value. An existing data page of the dedupe data store with a corresponding hash value that matches the first hash value of the can represent a potential match to the dedupe candidate that needs to be further considered in connection with performing an actual data comparison between the dedupe candidate and the existing data page. Consistent with discussion elsewhere herein, for an existing data page of the dedupe data store having a corresponding hash value matching the first hash value, a data comparison can be performed between the dedupe candidate and the existing data page to determine whether the foregoing match. If so, then the dedupe candidate can be determined to be a duplicate of the matching existing data page, and otherwise the dedupe candidate can be determined as not a duplicate of the existing data page.

Figure 8:
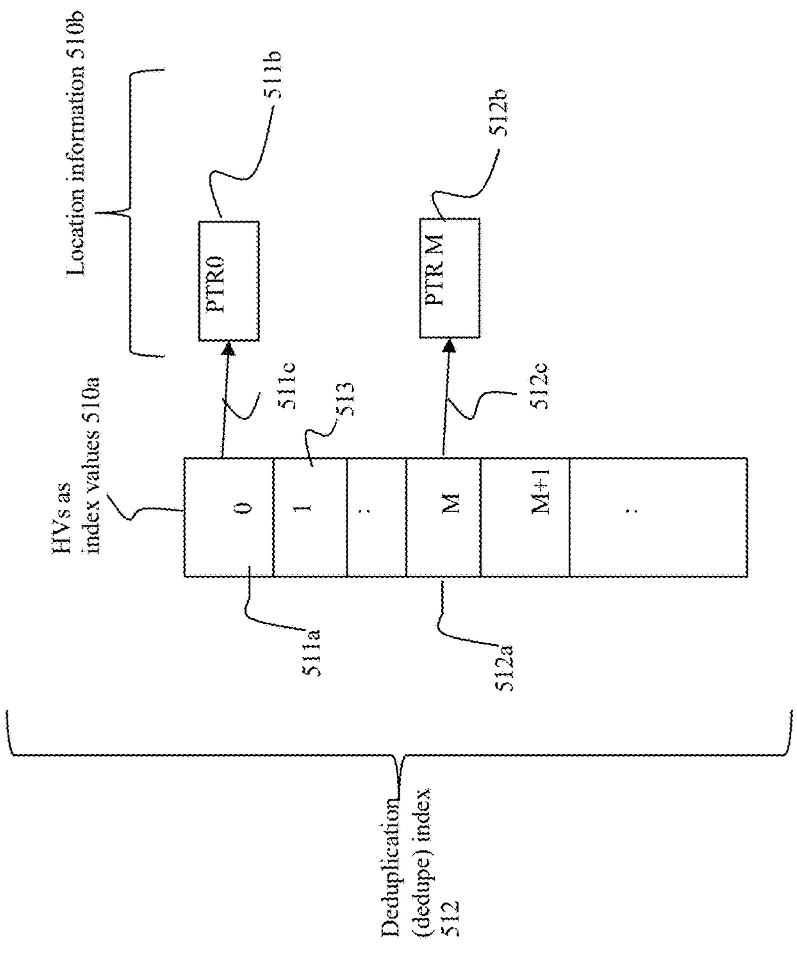

Referring to FIG. 8, shown is an example 500 of the deduplication (dedupe) index 512 that may be used in an embodiment in accordance with the techniques of the present disclosure. The dedupe index 512 can be configured to return location information for a corresponding hash value of an existing data page of the dedupe data store such as stored on non-volatile storage of an LSS. The location information associated with the hash value can be used to access the existing data page used to determine or generate the hash value.

The dedupe index 512 can be indexed using hash values 510*a* of data pages, where each such hash value of a stored data page can be mapped to corresponding location information 510*b* used to access the stored data page. In at least one embodiment, the location information can be a virtual pointer which is an address of a VLB entry used to indirectly access the stored data page. Consistent with other discussion herein, the VLB entry can include a physical storage location or address of where the corresponding data page is stored on non-volatile physical storage.

In at least one embodiment, the dedupe index 512 can be queried to determine, for a particular hash value 510*a* of a data page, the data page's corresponding location information 512*a*. If the dedupe index 512 does not contain any such location information for a specified hash value generated using the data page, then the data page is not already stored in the dedupe data store. Put another way, if the dedupe index 512 does not contain any such location information for a specified hash value generated using the data page, the data page can be determined as unique or new, where the new data page can be stored in the dedupe data store and where a corresponding new entry can be added to the dedupe index 512 for the new data page. The new entry can be associated with the specified hash value of the new data page, where the new entry can identify the location information corresponding to where the new data page is stored such as on non-volatile storage of the dedupe data store.

If the dedupe index 512 does contain location information for a specified hash value generated using the data page (e.g., ingested page or candidate page), then a corresponding data page for the specified hash value is already stored in the dedupe data store. Thus for an ingested data page having a first hash value HV1, the dedupe index 512 can be queried using HV1. If the dedupe index includes an entry for HV1 mapping to corresponding location information, then there is already an existing copy of the data page stored in the dedupe data store. In at least one embodiment, processing can then be performed to further validate and ensure that the candidate page or ingested page content is identical to the existing stored data page of the dedupe data store by performing a byte for byte or actual data comparison of the first content of the candidate page to the second content of the existing stored data page. If the foregoing comparison determines that the existing stored data page and the candidate or ingested page having identical content, then in connection with data deduplication, the ingested data page can be deduplicated to refer to the existing copy of the data page rather than store an additional duplicate copy of the same data page. In the example 500, the location information of the matching entry of the dedupe index 512 can be used to access the existing stored data page. Put another way, HV1 can be mapped to the dedupe index entry corresponding to the location information, or HV1 can be mapped to or matches the index value associated with the dedup index entry corresponding to the location information.

In the example 500, existing data pages, such as user data pages, of the dedupe data store can be organized and accessed using the dedupe index 512. For a user data page UD1, a corresponding hash value HV1 can be determined using a hash function H, where H (UD1)=HV1, where HV1 is used as an index 510*a* to map to corresponding entry of the dedupe index 512. The entry can include corresponding location information for UD1 if UD1 is stored as an existing data page of the dedupe data store. Otherwise if there is no corresponding entry with location information for HV1 in the dedupe index 512, then UD1 can be determined as not currently stored in the dedupe data store. Each entry of the dedupe index can include location information for a different single existing data page of the dedupe data store.

For example, H (UD1) can be mapped to index 0 511*a* which is associated with (511*c*) location information 511*b* including PTR0. PTR0 can be an address of a VLB entry VLB1 used to access the stored UD page UD1. In at least one embodiment, VLB1 can include the physical address or location of where UD1 is stored on non-volatile storage of the dedupe data store.

As another example, for data page UDM, H (UDM) can be mapped to index M 512*a* which is associated with (512*c*) location information 512*b* include PTR M. PTR M can be an address of a VLB entry VLB M used to access the stored UD page UDM. In at least one embodiment, VLB M can include the physical address or location of where UDM is stored on non-volatile storage of the dedupe data store.

An index JJ of 510*a* may not be associated with any location information thus denoting that no existing data page of the dedupe data store has a corresponding HV that maps to JJ. For example, index 1 513 can be null with no associated location information and thus no stored corresponding data page.

In at least one embodiment, the hashes for data pages, where such hashes are mapped to corresponding index values of 510*a*, can be computed using any suitable hash function.

For each existing data page of the dedupe data store having a corresponding entry in the dedupe index 512, the location information such as 511*b*, 512*b*, may take various suitable forms. The location information of an entry of the dedupe index 512 may generally directly or indirectly identify a location where the content of an existing data page is stored. For example, the location 511*b* may point to metadata that is further mapped to the data page, such as to a persistently stored version of the data page on non-volatile physical storage, such as on one of the BE PDs 16*a*-*n* of FIG. 1. In at least one embodiment, the content of the existing stored page may be obtained indirectly using the metadata, such as the virtual pointer, of the location information. In at least one embodiment using mapping information and MD pages as described, for example, consistent with FIGS. 3, 4, 5 and 6, the location information 511*b*, 512*b* can be a virtual pointer which is an address of, or reference to, a VLB entry, where the VLB entry can further include a physical address PA of a storage location on BE non-volatile storage, where PA can denote the physical address or location of the corresponding stored content or UD page. For example the dedupe index entry 511*a*=0 can denote the hash of a stored UD page of content C1, and PTR0 (511*b*) can denote or reference the location of where C1 is stored on BE non-volatile storage. In at least one embodiment, PTR0 can be a virtual pointer which is the address of, or reference to, a VLB entry as noted above. Thus in at least one embodiment, PTR0 can be an indirect pointer or indirect address of where C1 is stored. In at least one embodiment with reference back to FIG. 6, assume that C1 is stored in 1362 where 1362 has a corresponding physical address PA1 on BE non-volatile storage. PTR0 can denote 1372 which is a pointer to, reference to, or address of, the VLB entry 1357*a*, where the VLB entry 1357*a* includes PA1 stored in field 1301*b* of the VLB entry 1357*a*.

When performing page aligned deduplication processing for a dedupe candidate page such as an ingested user data page written by a host or other storage client, at least one embodiment of the techniques herein may include computing the hash HVi for the dedupe candidate, and using HVi to index into the dedupe index 512 to determine whether there is a corresponding matching entry Ef in the dedupe index 512 with existing location information of a stored data page corresponding to HVi. If there is a matching entry Ef in the dedupe index for HVi (e.g., dedupe index hit) where the entry Ef includes existing location information for HVi in the dedupe index, then there is an existing stored data page PG1 having the same matching hash value HVi as the dedupe candidate page. If a matching entry Ef having the same hash value HVi is found in the dedupe index 512 (e.g., if there is a dedupe index hit Ef), processing may then be performed to compare (e.g., byte-by-byte) the content of the dedupe candidate page with the content of the existing data page corresponding to the entry Ef of the dedupe data store to ensure the actual data of the dedupe candidate and existing pages match. If the actual contents of the dedupe candidate and existing pages match, processing can then proceed to store the dedupe candidate page as a full deduplicated page (e.g., duplicate of the existing data page). In at least one embodiment, the location information, such as the stored virtual pointer or address of a VLB entry, of the matching entry Ef can be used to read the existing stored data page which is compared to the dedupe candidate page to determine whether the foregoing two pages are identical in terms of content.

Consistent with discussion elsewhere herein in at least one embodiment, for a dedupe candidate page that is found to be unique (e.g., whereby there is no corresponding entry in the dedupe index or otherwise there is no matching existing block in the dedupe data store) when performing page aligned deduplication, the dedupe candidate can be stored as a new page of the dedupe data store and processing may include persistently storing the content of the new page on at a physical location or address PAi on BE non-volatile storage and additionally storing an entry with corresponding location information for the new page in the dedupe index 512. In at least one embodiment, such processing for the new page having a corresponding hash value HVi that maps to index I may include creating a corresponding entry E1 for the new page in the dedupe index 512, where E1 is associated with index I and where E1 can include PTRi denoting an address of, or pointer to, a corresponding VLB entry VLBE1 which includes PAi for the new page.

In at least one embodiment, page aligned deduplication can include storing unique data pages in the dedupe data store. Thus in at least one embodiment, existing data pages having corresponding entries in the dedupe index 512 can be unique data pages which are persistently stored in the storage system and are aligned on the storage system's internal page boundary. Page aligned deduplication can determine whether an ingested data page, such as written by a host write I/O, matches an existing aligned data page of the dedupe data store having a corresponding index or entry in the dedupe index 512.

In at least one embodiment, the dedupe index 512, having entries corresponding to stored existing aligned data pages and used for aligned page deduplication, can also be used in connection with sector aligned deduplication. More generally, the dedupe index 512 can be used in connection with unaligned or non-page aligned deduplication to determine unaligned matches between i) an ingested UD page having content D1 located at an offset with respect to the page alignment boundary, and ii) content D1 as stored across two data pages P1 and P2, where P1 and P2 have corresponding entries in the dedupe index and where P1 and P2 are two existing pages of the dedupe data store aligned on the storage system internal page boundary. The ingested UD page detected as an unaligned match with respect to some offset can be duplicated across two existing aligned data pages P1 and P2, given the offset. In at least one embodiment, the existing aligned data page P1 and P2 can be logically sequential data pages of a first sequence of pages previously written sequentially or consecutively to the storage system.

In the following examples of non-page aligned deduplication and sector aligned deduplication, a particular page size, and/or a particular page offset can be used for purposes of illustration of the techniques of the present disclosure. More generally, other alignments, other pages sizes and/or other pages offsets can be used in connection with the techniques of the present disclosure. Thus the techniques of the present disclosure can be applied to identical data sequences that align on a non-page boundary such as, for example, a sector level boundary. More generally, the techniques of the present disclosure can be extended to apply to other non-page boundaries denoting generally any offset within a page.

Figure 9:
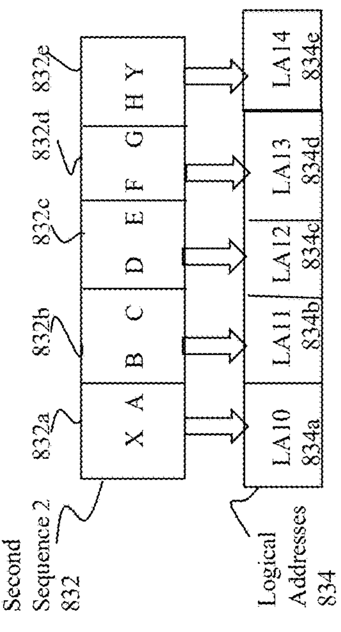
Figure 9:
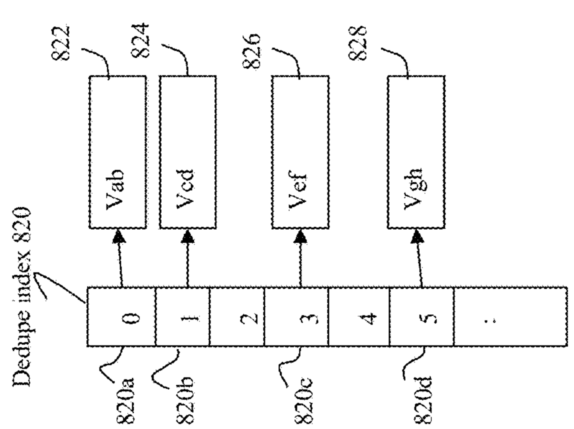
Figure 9:
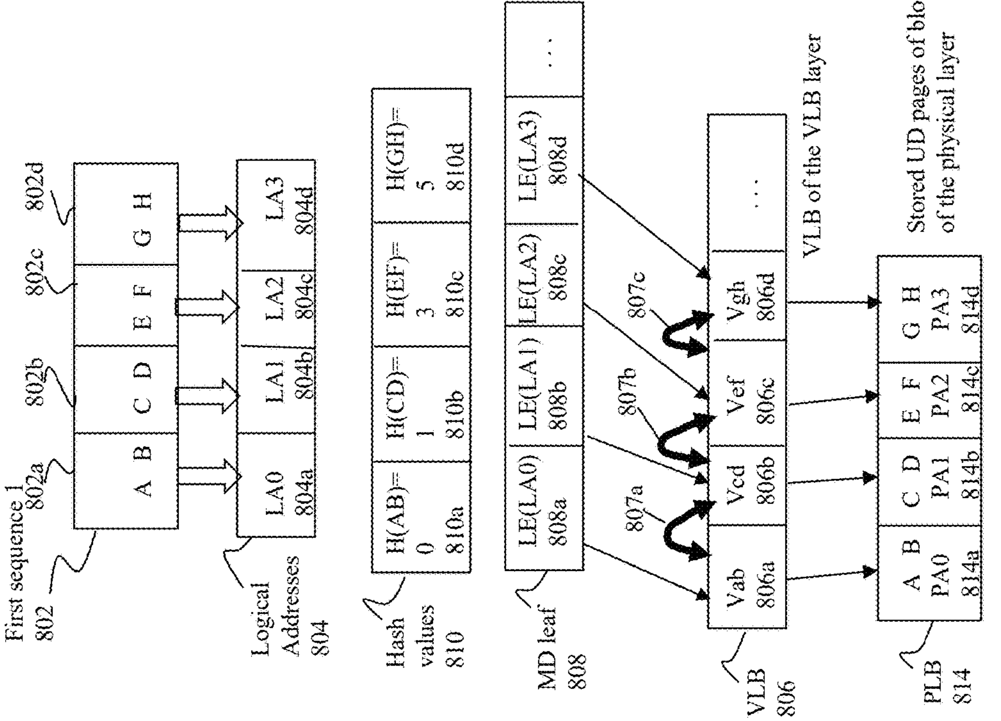

Referring to FIG. 9, shown is an example 800 illustrating use of the techniques of the present disclosure in at least one embodiment.

The example 800 includes a first sequence 1 802 of 4 pages 802*a-d* written respectively to logical addresses 804*a-d* of element 804. In at least one embodiment, the sequence 802 can correspond to a first I/O that writes the 4 pages 802*a-d*. In at least one embodiment, the logical addresses 804*a-d* can be consecutive logical addresses in a logical address space such as of a volume or other storage object. Element 810 can include hash values 810*a-d* calculated respectively for pages 802*a-d*. The MD leaf 808 can include MD leaf entries 808*a*-808*d* corresponding respectively to logical addresses 804*a-d*. The MD leaf 808 can be included in a layer of MD leaf pages or blocks. The VLB 806 can include VLB entries 806*a-d*. The VLB 806 can be a VLB page of the VLB layer or virtual layer. The PLB 814 can denote a physical large block (PLB) of non-volatile storage storing pages or blocks of data of a physical layer. The PLB 814 can include blocks or pages of data determined by page aligned deduplication to be unique data pages of content. The PLB 814 can include stored UD (user data) pages 814*a-d* storing content of written pages 802*a-d* of the sequence 802. Thus the elements 808, 806 and 814 can be a further simplification for illustration of corresponding metadata and stored UD pages described elsewhere herein. In at least one embodiment, the PLB 814 can be included in non-volatile storage used for storing data pages of the dedupe data store discussed elsewhere herein.

Page 802*a* can have content AB with a corresponding hash value determined using the hash function H, where H (AB)=0 810*a*. Page 802*b* can have content CD with a corresponding hash value determined using the hash function H, where H (CD)=1 810*b*. Page 802*c* can have content EF with a corresponding hash value determined using the hash function H, where H (EF)=3 810*c*. Page 802*d* can have content GH with a corresponding hash value determined using the hash function H, where H (GH)=5 810*d*.

Consistent with discussion below in this example, the dedupe index 820 can be empty prior to flushing log entries corresponding to writing the 4 pages 802*a-d* of the first sequence 802. As a result of flushing the foregoing log entries, the 4 pages 802*a-d* can be determined as unique by querying the dedupe index 820 and determining that, for each of the hash values 810*a-d*, the dedupe index 820 does not have any corresponding location information regarding stored corresponding data pages for the hash values 810*a-d*. As a result, the 4 data pages 802*a-d* can be persistently stored as new data pages in the PLB 814, and the dedupe index 820 can be populated with corresponding entries and location information for the stored new pages 814*a-d* of PLB 814.

The MD leaf 808 and VLB 806 can be created as part of the mapping information of MD pages when flushing the 4 log entries which write pages 802*a-d* of the sequence 802.

Vab can be a virtual pointer denoting the address of the VLB entry 806*a*. The VLB entry 806*a* can include the physical address PA0 of the content AB, where PA0 denotes the physical address where the page 802*a* is persisted as stored UD page 814*a*. MD leaf entry LE(LA0) 808*a* can correspond to LA0 804*a* and can include Vab denoting a pointer to or address of VLB entry 806*a*.

Vcd can be a virtual pointer denoting the address of the VLB entry 806*b*. The VLB entry 806*b* can include the physical address PA1 of the content CD, where PA1 denotes the physical address where the page 802*b* is persisted as stored UD page 814*b*. MD leaf entry LE(LA1) 808*b* can correspond to LA1 804*b* and can include Vcd denoting a pointer to or address of VLB entry 806*b*.

Vef can be a virtual pointer and can denote the address of the VLB entry 806*c*. The VLB entry 806*c* can include the physical address PA2 of the content EF, where PA2 denotes the physical address where the page 802*c* is persisted as UD page 814*c*. MD leaf entry LE(LA2) 808*c* can correspond to LA2 804*c* and can include Vef denoting a pointer to or address of VLB entry 806*c*.

Vgh can be a virtual pointer and can denote the address of the VLB entry 806*d*. The VLB entry 806*s* can include the physical address PA3 of the content GH, where PA3 denotes the physical address where the page 802*d* is persisted as UD page 814*d*. MD leaf entry LE(LA3) 808*d* can correspond to LA3 804*d* and can include Vgh denoting a pointer to or address of VLB entry 806*d*.

It should be noted that although the UD pages 814*a-d* as stored in the physical layer in blocks or pages of non-volatile storage are illustrated as contiguous, they can more generally be stored in any physical location and may not be contiguous.

In at least one embodiment, pages of user data as stored in the physical layer that are part of the same sequence, such as sequence 802, written to the storage system can be linked in a linked list for use in connection with non-page aligned deduplication to determine what user data page follows another in a particular sequence. In at least one embodiment, the linked list can be in the virtual layer or VLB layer whereby VLB entries corresponding to the UD pages of the sequence are linked. For example, VLB entries 806*a-d* of the first sequence 802 can be linked such as in a linked list. To further illustrate in connection with the sequence 802, i) VLB entry 806*a* referencing the first page AB of the sequence 802 is linked (807*a*) to the VLB entry 806*b* which references the second page CD of the sequence 802, ii) VLB entry 806*b* is linked (807*b*) to the VLB entry 806*c* which references the third page EF of the sequence 802, and iii) VLB entry 806*c* is linked (807*c*) to the VLB entry 806*d* which references the fourth page GH of the sequence 802. Thus arrows 807*a-c* can denote the linked list corresponding to the UD pages in the physical layer for the sequence 802 of pages 802*a-d*. Thus the linked list formed by 807*a-c* can denote corresponding UD pages 814*a-d* of the physical layer which are consecutive in the logical space. For example, the logical addresses 804*a-d* can be consecutive logical addresses. Although the linked list is illustrated in the example 800 as maintained in the virtual or VLB layer, as a variation in at least one embodiment the linked list of UD pages 814*a-d* corresponding to the sequence 802 can also be maintained in the physical layer.

Thus in this example 800, all data pages 802*a-d* can be stored in aligned UD pages 814*a-d* of the physical layer as unique pages of content. In at least one embodiment, page aligned deduplication can be performed on the pages 802*a-d* of the sequence 802 resulting in the foregoing determination that all pages 802*a-d* are unique in terms of content. As a result, 4 corresponding entries for the content of pages 802*a-d* can be made in the dedupe index 820 which also respectively reference or point to the VLB entries 806*a-d*.

In at least one embodiment where the physical layer of non-volatile storage storing UD pages 814*a-d* is an LSS, 4 UD log entries of the UD log may have been created as a result of writing the 4 pages 802*a-d* of sequence 802 to corresponding logical addresses 804*a-d*. Consistent with discussion above, the 4 UD log entries of the UD can be flushed resulting in creating corresponding MD pages of mapping information consistent with the example 800 to map the logical addresses 804*a-d* to corresponding storage locations 814*a-d*. As a result of flushing the 4 UD log entries in at least one embodiment, page aligned deduplication processing can be performed as noted above which can result in populating the dedupe index 820 and storing UD pages as discussed below. During flushing the 4 UD log entries, the logical sequence or ordering of pages written to by the sequence 802 is determined and used to create the linked list of UD pages 814*a-d* maintained by the virtual layer, where the linked list in the example 800 is denoted by the arrows 807*a-c*.

The element 820 can denote the dedupe index used in connection with the dedupe data store as described elsewhere herein, for example, as in FIG. 8. The dedupe index 820 can denote the state of the dedupe index after writing the sequence 802 and after flushing the corresponding 4 UD log entries noted above. Page aligned deduplication can determine that the 4 pages 802*a-d* of the sequence 802 are unique whereby there are no corresponding entries in the dedupe index 820 for hash values of the pages 802*a-d*. As a result of the pages 802*a-d* being unique and not duplicates of existing stored data pages, i) the content of pages 802*a-d* of the sequence 802 can be persistently stored as UD pages 814*a-d* of PLB 814, and ii) the dedupe index 820 can be updated to the state as illustrated in FIG. 9 to add corresponding entries with location information for the newly stored UD pages 814*a-d*. In at least one embodiment, UD pages 814*a-d* can be stored in non-volatile storage of an LSS.

In this example the H (AB) (where AB is the page 802*a* of the sequence 802) can map to dedupe index 0 820*a* associated with entry 822 created for the stored UD page 814*a* for the page content "AB". The entry 822 can identify location information used to access UD page 814*a*. The location information of entry 822 can include Vab, where Vab is the address of the VLB entry 806*a*, and where the VLB entry 806*a* includes the address PA0 of the UD page 814*a*.

In this example the H (CD) (where CD is the page 802*b* of the sequence 802) can map to dedupe index 1 820*b* associated with entry 824 created for the stored UD page 814*b* for the page content "CD". The entry 824 can identify location information used to access UD page 814*b*. The location information of entry 824 can include Vcd, where Vcd is the address of the VLB entry 806*b*, and where the VLB entry 806*b* includes the address PA1 of the UD page 814*b*.

In this example the H (EF) (where EF is the page 802*c* of the sequence 802) can map to dedupe index 3 820*c* associated with entry 826 created for the stored UD page 814*c* for the page content "EF". The entry 826 can identify location information used to access UD page 814*c*. The location information of entry 826 can include Vef, where Vef is the address of the VLB entry 806*c*, and where the VLB entry 806*c* includes the address PA2 of the UD page 814*c*.

In this example the H (GH) (where GH is the page 802*d* of the sequence 802) can map to dedupe index 5 820*d* associated with entry 828 created for the stored UD page 814*d* for the page content "GH". The entry 828 can identify location information used to access UD page 814*d*. The location information of entry 828 can include Vgh, where Vgh is the address of the VLB entry 806*d*, and where the VLB entry 806*d* includes the address PA3 of the UD page 814*d*.

After writing sequence 802, a second sequence 832 can be written including pages 832*a-e* to corresponding logical addresses 834*a-e*. In at least one embodiment, the sequence 832 can correspond to a second I/O that writes the 4 pages 832*a-e*. In at least one embodiment, the logical addresses 834*a-e* of 834 can be consecutive logical addresses in a logical address space such as for a volume or other storage object. Page 832*a* having content XA can be written to logical address LA10 834*a*. Page 832*b* having content BC can be written to logical address LA11 834*b*. Page 832*c* having content DE can be written to logical address LA12 834*c*. Page 832*d* having content FG can be written to logical address LA13 834*d*. Page 832*e* having content HY can be written to logical address LA14 834*e*.

In this example, it can be seen that pages of content of the sequence 802 are duplicated in the second sequence 832. Put another way, the sequence 802 is a substring of the sequence 832. However, the sequence 832 does not contain page aligned duplicates of the sequence 802. Rather the sequence 832 can be characterized as including unaligned or non-page aligned duplicates of existing pages of the sequence 802. In at least one embodiment with an 8K page size, the sequence 832 can be characterized as having a non-page aligned duplicate of the sequence 802 which begins at the ½ page or 4K page offset within page 832*a* of the sequence 832. In at least one embodiment where a sector has a corresponding sector size of 512 bytes, there can be 16 sectors in each 8K page such that the sequence 832 can be characterized as having a sector aligned duplicate of the sequence 802 which begins at the $8^{th}$ sector offset within page 832*a* of the sequence 832.

Figure 10:
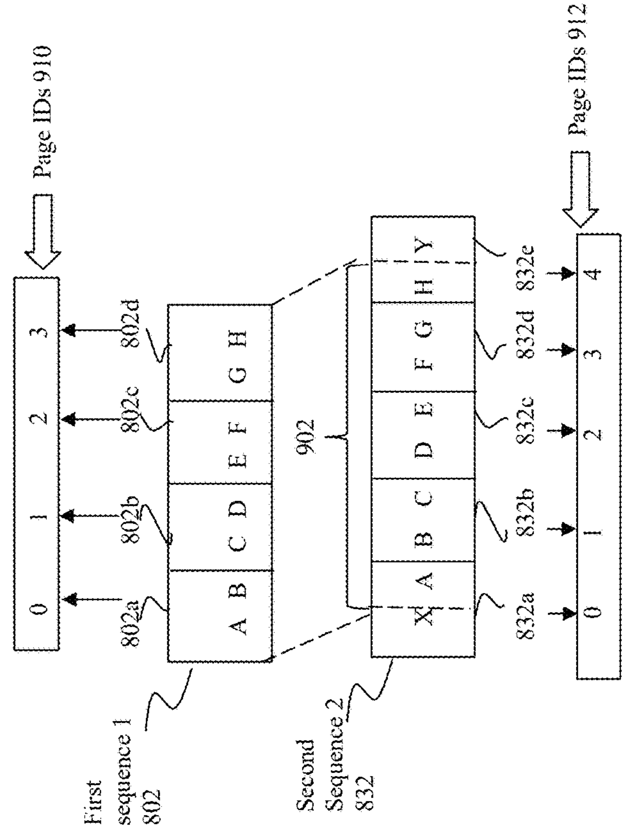

Referring to FIG. 10, shown is an example illustrating sector alignment between the first sequence 802 and the second sequence 832 in at least one embodiment in accordance with the techniques of the present disclosure. The example 900 includes dashed lines denoting the matching or duplicated pages of content between the sequences 802 and 832. The element 902 denotes the portion of the second sequence 832 which is a sector aligned duplicate of the first sequence 802 beginning at the half page offset of 4K in the page 832*a*.

In at least one embodiment, the techniques of the present disclosure can be utilized to detect non-page aligned or sector aligned matches between pages of the sequence 802 pages of the second ingested sequence 832. The existing dedupe data store 512 of for aligned pages can be used for page aligned deduplication as discussed herein. Additionally, the dedupe index of aligned pages can also be used for sector aligned deduplication, or more generally, non-page aligned deduplication.

In at least one embodiment, the techniques of the present disclosure can be performed with respect to a first sequence, such as the first sequence 802 having corresponding UD pages stored in the physical layer, and a second sequence 832, sometimes also referred to as the ingested sequence. The techniques of the present disclosure can perform sector aligned deduplication of the ingested sequence 832 to determine whether any pages of the ingested sequence 832 are sector aligned matches for pages of the first sequence 802.

In at least one embodiment, sector aligned deduplication can include performing a search phase to determine a set of targets of the first sequence, where each such target can identify a potential sector aligned page match between i) a sector aligned page of a second sequence (for which sector aligned deduplication is performed) and ii) an existing stored aligned page of the first sequence. Following the search phase, an expansion phase can be performed to expand a target of the target set based on further sector aligned matches between pages of the ingested sequence and the existing first sequence. In one aspect the set of targets can denote a set of anchors, hints or starting points of where the expansion phase can commence performing data comparisons for purposes of determining sector aligned duplicates, where the targets can be identified based on matching hash values in the search phase. However for such targets no data validation or actual data comparison between a sector aligned ingested page and a stored page-aligned UD page has been performed in the search phase. Based on the targets of the search phase, the expansion phase can include performing data or content comparisons between ingested pages and corresponding generated sector aligned pages which are generated from pairs of stored page-aligned UD pages of the dedupe data store. Each such pair can denote two stored page-aligned UD pages corresponding to two logically adjacent or logically consecutive sequential pages of a previously written sequence of pages.

For a target of the target set identified by the search phase, the expansion phase can include: i) performing expansion processing to search for sector aligned matches with respect to pages which are to the left of the target; and ii) performing expansion processing to search for sector aligned matches with respect to pages which are to the right of the target.

In at least one embodiment, the ingested sequence of pages can include at least two pages. Processing of the search phase can include virtually generating unaligned pages through a sliding window based on a sector offset. For an ingested sequence of N pages, processing can generate N−1 unaligned pages from every two adjacent pages according to a given sector offset (except for the last page). For each virtually generated unaligned page, a hash is calculated and used to perform a lookup or query against the dedupe index 512 of regular 8K page-aligned pages to determine a set of targets. Unaligned or sector aligned pages of the ingested sequence can have corresponding hash values that match a corresponding entry of the dedup index for an existing aligned page of the dedupe data store. A target can be a stored page (e.g., aligned at the 8K page boundary) of the first sequence, such as 802, having a hash value that matches a corresponding hash value of an unaligned or sector aligned page of the ingested sequence, such as the sequence 832.

In at least one embodiment with an 8K page size, the search for matching targets can be performed for any given sector offset out of 15 possible unaligned offsets for the 8K page size to exhaust all chances of finding sector aligned deduplication.

In at least one embodiment, the searching of the search phase can be performed in rounds, each time with a different sector offset. In each round, only the remaining ingested pages without a corresponding match (either page aligned or sector aligned) can be processed. In at least one embodiment searching for a match in connection with an ingested page can stop when its first corresponding match is found, where the match can correspond to i) a sector aligned match in connection with the ingested page as determined during the search phase of non-page aligned deduplication, or ii) a page aligned match such as where page-aligned deduplication determines that the ingested page is a page aligned duplicate of an existing stored data page.

In at least one embodiment, processing of the search phase can be performed to optimize the number of searches by maintaining an adaptive sector offsets array ordered by the matching likelihood based on a history of prior searches. For example, if the most frequent sector offset (at which matching hash values are found for a generated unaligned page and an aligned page of the dedupe data store) during the last X minutes was the 4K offset, then searching can begin with the 4K sector offset on subsequent searches using other existing sequences to determine targets. In at least one embodiment, the adaptive sector offsets array can be maintained on a per data set or data object basis since the dedupe characteristics of data can vary with each application and therefore each application's data set. For example, in at least one embodiment, the data object can be a volume or LUN where the techniques of the present disclosure can maintain an adaptive sector offset array per volume or per LUN. Generally, the adaptive sector offset array can denote a ranked or ordered set of sector offsets based on the frequency at which a match is found between a sector aligned page of the ingested sequence, such as sequence 832, and an aligned page of an existing data sequence, such as 802, having aligned pages of UD stored in the physical layer. The offsets can be ranked based on the frequency with which each offset resulted in a match during the search phase between i) an unaligned page of the ingest page sequence at that offset, and ii) an aligned page of an existing sequence. The offsets can be ranked from highest to lowest based on frequency, where the highest ranked offset is denoted by the highest frequency and the lowest ranked offset is denoted by the lowest frequency.

In at least one embodiment using an LSS and a UD log, there can be 5 UD log entries that respectively write the 5 pages 832*a-e* of the second sequence 832. The 5 UD log entries corresponding to the second sequence 832 can be flushed. Flushing can include performing deduplication. Deduplication can include performing page aligned deduplication as well as non-page aligned or sector aligned deduplication. In this example, page aligned deduplication will find no matches between any of the pages 832*a-e* and existing stored pages of the dedupe data store having corresponding entries in the dedup index 820. The foregoing is consistent with the fact that no 8K aligned page of the ingested second sequence 832 matches any 8K aligned page of the existing sequence 802.

In the following paragraphs and with reference to FIG. 10, pages 802*a-d* of the first sequence 802 can sometimes respectively be referred to as pages 0-3 of the first sequence 802 to denote the respective page identifier (ID) corresponding to the respective logical sequential consecutive page ordering or position in the sequence 802. The pages IDs 0-3 denoting the relative sequential ordering of pages 802*a-d* in sequence 802 is denoted by the page IDs 910.

In the following paragraphs and with reference to FIG. 10, pages 832*a-e* of the second sequence 832 can sometimes respectively be reference to as pages 0-4 of the second sequence 832 to denote the respective page identifier (ID) corresponding to the respective logical sequential consecutive page ordering or position in the sequence 832. The pages IDs 0-4 denoting the relative sequential ordering of pages 832*a-e* in sequence 832 is denoted by the pages IDs 912.

In at least one embodiment, deduplication can include performing sector aligned deduplication, or more generally, non-page aligned deduplication. In this example with an 8K page size and a sector size of 512 bytes, each 8K page has 16 sectors with 15 sector offsets that are not page aligned. For example, the 15 non-page aligned sector offsets can include 512 bytes, 1024 bytes or 1K, . . . , and so on, at every sector offset up to and including 8K-512 bytes. In this example, there can be 15 rounds, one round per sector offset. For each offset, an unaligned page can be constructed from each pair of two adjacent pages of the ingested second sequence 832. In this example with N=5 pages in the ingested second sequence 832, there can be N−1=4 unaligned or sector aligned pages generated.

Consider sector offset 512 bytes. A first unaligned 8K page UP1 can be constructed from pages 832*a* and 832*b* beginning at offset 512 bytes of page 832*a*. The hash HVUP1 of UP1 can be determined using the hash function H, denoted as H (UP1)=HVUP1. The dedupe index 820 can be queried to determine whether there is an existing entry having a hash value matching HVUP1. In this example, assume there is no entry in the dedupe index 820 having a hash value matching HVUP1. The foregoing can be repeated for the sector offset of 512 bytes thereby generating 3 additional unaligned pages. In particular the 3 additional unaligned pages are: i) a second unaligned page constructed from pages 832*b-c* beginning at offset 512 bytes of page 832*b*, ii) a third unaligned page constructed from pages 832*c-d* beginning at offset 512 bytes of page 832*c*, and iii) a fourth unaligned page constructed from pages 832*d-e* beginning at offset 512 bytes of page 832*d*. For each unaligned generated page, its corresponding hash value can be determined and the dedupe index 820 can be similarly queried or looked up to determine whether there is an existing entry having a corresponding hash value matching the calculated hash value of the unaligned constructed page. The foregoing can be repeated for each offset corresponding to another round. In at least one embodiment, the rounds for corresponding offsets can be performed in order of increasing sectors. As a variation in at least one embodiment, the rounds corresponding to sector offsets can be performed in an order based on a ranking, from highest to lowest, of sector offsets of the adaptive sector offsets array discussed elsewhere herein.

Assume in this example that there are no matches determined between hash values of unaligned constructed pages and dedupe index entries prior to the round for the offset 4K. Now assume processing of the round for offset 4K is commenced. With reference to FIGS. 9 and 10, assume that each of the letters of each page of 802 and 832 denotes content stored in a 4K portion of the page.

A first unaligned (e.g., sector aligned) 8K page can be constructed from pages 832*a* and 832*b* beginning at offset 4K of page 832*a*. In this example, the first unaligned 8K page can be AB. The hash Vab of the first unaligned 8K page AB can be determined using the hash function. The dedupe index 820 can be queried to determine whether there is an existing entry having a hash value matching the calculated hash Vab for the first unaligned 8K page AB. In this case, a matching hash value is found in entry 822. The foregoing can be repeated for sector offset of 4K thereby generating 3 additional unaligned pages. In particular the 3 additional unaligned pages are: i) a second unaligned page CD constructed from pages 832*b-c* beginning at offset 4K of page 832*b*, ii) a third unaligned page EF constructed from pages 832*c-d* beginning at offset 4K of page 832*c*, and iii) a fourth unaligned page GH constructed from pages 832*d-e* beginning at offset 4K of page 832*d*. For each unaligned generated page, its corresponding hash value can be determined and the dedupe index 820 can be similarly queried or looked up to determine whether there is an existing entry having a corresponding hash value matching the calculated hash value of the unaligned constructed page.

In connection with the foregoing 4K offset round, a corresponding target can be added to the set of targets for each constructed unaligned page having a calculated hash value that matches a corresponding hash value of an existing entry in the dedupe index. In a similar manner more generally, a target can be added to the set of targets of the search phase for each constructed unaligned page having a calculated hash value that matches a corresponding hash value of an existing entry in the dedupe index. Each target can correspond to an existing stored page (e.g., 8K aligned page) having a corresponding hash value that matches the calculated hash value of a constructed unaligned page given the 4K offset.

In the foregoing example, assume that all 4 unaligned constructed pages of the round for the 4K offset having a hash value matching a hash value of an existing dedupe index entry of 820. As a result, 4 targets can be added to the set of targets (sometimes also referred to as the target set). The 4 targets can denote the 4 unaligned constructed pages each having a calculated hash value that matches a hash value of a corresponding dedupe index entry for an existing stored page that is 8K page aligned. Put another way in at least one embodiment, the 4 targets can denote the 4 unaligned constructed pages each having a calculated hash value resulting in a dedupe index hit denoting the corresponding dedupe entry with a hash value matching the calculated hash value of the unaligned constructed page. Thus the 4 targets can also identify or denote 4 existing stored 8K aligned pages each having a corresponding hash value which matches a calculated hash value of a respective one of the unaligned or sector aligned (e.g., 4K aligned) constructed pages.

In at least one embodiment, a target (e.g., existing stored 8K page-aligned page) of the search phase can correspond to an unaligned constructed page, where the unaligned constructed page can be represented using an ingested page ID (identifier) and sector offset, where the sector offset within the ingested page denoted by the ingested page ID can be the starting offset for the unaligned constructed page having a corresponding calculated hash value which matches the hash value of the target or existing 8K aligned page. For example, one target page of the target set of the search phase can correspond to the third unaligned constructed page EF constructed from pages 832*c-d* beginning at offset 4K of page 832*c*. Pages 832*c-d* have corresponding page IDs of 2 and 3 in the ingested second sequence 832. In at least one embodiment, the third unaligned constructed page EF can be represented using a starting offset expressed as ingested page 2 (832*c*), offset 4K. In a similar manner, each unaligned constructed page at a particular sector offset having a hash value which matches a corresponding existing hash value of a dedupe index entry for a target page can be represented using an ingested page ID and offset.

In at least one embodiment, the search phase can be characterized as an iterative algorithm that proceeds with X1 rounds, where X1 denotes the number of non-page aligned sectors. Each of the X1 rounds can include constructing N−1 sector aligned pages formed from two adjacent ingested pages which are page aligned. The search phase can include comparing calculated hash values of sector aligned pages to first hash values of aligned pages populating the dedupe index.

In at least one embodiment, if a dedupe index hit or matching hash value is determined for a constructed unaligned (e.g., sector aligned) page having a starting offset in a particular ingested page IDx, processing can determine that the search phase has determined a sector aligned match for ingested page IDx and subsequent rounds can omit constructing an unaligned or sector aligned page with a starting offset in the ingested page IDx. Put another way in at least one embodiment, once an ingested page IDx is marked as having a sector aligned match based on matching hash values (between the ingested page IDx and an existing stored data page), subsequent rounds of the search phase of sector aligned deduplication can omit performing sector aligned deduplication for a constructed unaligned or sector aligned page with a starting offset in the marked ingested page IDx. Thus in at least one embodiment, for an ingested page IDx, if a sector aligned match is determined for any given offset, then no further offsets are evaluated or considered for that ingested page IDx in connection with the search phase of sector aligned deduplication.

Continuing with the above example with 4 targets determined for the ingested pages 0, 1, 2 and 3 with the round where the offset=4K, no further rounds for subsequent offsets need to be performed since all ingested pages 0-3 of the ingested second sequence 832 have a sector aligned match with respect to hash values determined in the round for offset 4K. Now consider a variation using the adaptive sector offsets array which can generally specify a particular order in which rounds or offsets should be evaluated in the search phase. The adaptive sector offsets array may specify an offset ordering with 4K offset as the first or initial offset to be evaluated. In such an embodiment, all ingested pages 0-3 of the ingested second sequence 832 can be marked as having a sector aligned match based on corresponding hash values. As a result no further offsets and no additional rounds of the search phase are performed. In this manner in at least one embodiment, the adaptive sector offsets array can be used to optimize the search phase by specifying an optimized ordering in which sector offsets are to be evaluated for sector aligned matches based on hash values in sector aligned deduplication. In at least one embodiment, each volume can have its own adaptive sector offsets array which is customized for the particular associated volume. In this manner in at least one embodiment, when an ingested sequence 832 writes to a logical address space of a particular volume VOL1, VOL1's corresponding adaptive sector offsets array can be utilized to specify an order in which sector offsets are evaluated in rounds of the search phase of sector aligned deduplication. Each volume's adaptive sector offsets array can be based, at least in part, on a history of prior sector aligned deduplication performed with respect to ingested sequences of writes to the particular volume. For example, over time, it can be observed that most UD pages written to VOL1 have sector aligned matches which occur at offset 4K. Thus in at least one embodiment per volume, a history regarding the frequency or count of sector aligned matches for each offset can be tracked, where the offsets can be ranked from highest to lowest frequency in the adaptive sector offsets array so that offsets are evaluated for sector aligned matches from highest to lowest frequency. In this manner, the adaptive sector offsets arrays for corresponding volumes, or more generally, corresponding storage objects or data sets can dynamically adapt or adjust to the particular I/O workload or pattern of the storage client(s) writing to such volumes. For example, a first application APP1 can write to a first volume VOLZ1 using a first native page size SZ1 such as 1K; and a second application APP2 can write to a different second volume VOLZ2 using a second native page size SZ2 such as 4K (e.g., where generally SZ1 does not equal SZ2). The storage system can have a native page size of 8K, and 1K and 4K can be different sector offsets evaluated in the search phase. A first adaptive sector offsets array ARR1 can be specify the offset ordering for VOLZ1 where over time offset SZ1=1K can be observed as having the most sector aligned matches of all offsets when performing sector aligned deduplication when writing to VOLZ1. Thus the search phase when performing sector aligned deduplication for ingested sequences writing to VOLZ1 can evaluate offset 1K before all other offsets in efforts to optimize and reduce the number of rounds performed. A second adaptive sector offsets array ARR2 can specify the offset ordering for VOLZ2 where over time offset SZ2=4K can be observed as having the most sector aligned matches of all offsets when performing sector aligned deduplication when writing to VOLZ2. Thus the search phase when performing sector aligned deduplication for ingested sequences writing to VOLZ2 can evaluate offset 4K before all other offsets in efforts to optimize and reduce the number of rounds performed.

In at least one embodiment, page aligned deduplication can be performed prior to performing non-page aligned or sector aligned deduplication. In at least one embodiment, page aligned deduplication can include processing as described above where processing can query the dedupe index to determine whether an ingested page IDx has a calculated hash value matching an existing hash value of an entry of the dedupe index, where the entry and its matching hash value correspond to a stored UD page which is page aligned. If so, then processing can perform further validation where the content of the ingested page IDx is compared (e.g., byte by byte) to the content of the stored UD page with the matching hash value of the dedupe index entry. The stored UD page can be read using location information associated with the existing hash value of the entry of the dedupe index. In at least one embodiment, the location information can include a virtual pointer or address of a VLB entry, where the VLB entry further includes a physical address of the stored UD page. If the validation determines that contents of the stored UD page and ingested page IDx are identical or match in terms of content, then ingested page IDx can be determined as a duplicate of the stored UD page, and otherwise the ingested page IDx is determined not to be a duplicate of the stored UD page. In at least one embodiment, if page aligned deduplication determines that an ingested page IDx is a duplicate of an existing stored UD page, the ingested page IDx can be marked such that sector aligned or non-page aligned deduplication is not performed for the ingested page IDx. Put another way, if page aligned deduplication determines that an ingested page IDx is a duplicate of an existing stored UD page, sector aligned deduplication can be omitted for the ingested page IDx whereby no constructed unaligned or sector aligned pages are evaluated beginning any offset in the ingested page IDx.

In at least one embodiment, an output of the search phase is a target set or set of targets and associated information. Each target and its associated information can be further evaluated and used in the expansion phase discussed below. Each target can identify a stored aligned page having an existing hash value of the dedupe index that matches a corresponding calculated hash value of an unaligned or sector aligned ingested page at a given offset. However consistent with the discussion above for the search phase, the target page has not been verified or validated in that processing has not compared the actual data or contents of the sector aligned ingested page to the stored aligned target page with a matching hash value.

In at least one embodiment, for each target page of the target set output by the search phase, where the target page is an existing page-aligned UD page stored in the system, the search phase can also identify related information including a sector aligned page of the ingested second sequence having a calculated hash value matching a hash value of the target page.

It should be noted that in this example, each target page of the target set output by the search phase is corresponds to a page written in the same prior sequence 802. More generally, each target page of the target set can correspond to a written page of the prior sequence 802, or another prior sequence of sequential consecutive logical addresses of an address space.

Figure 11:
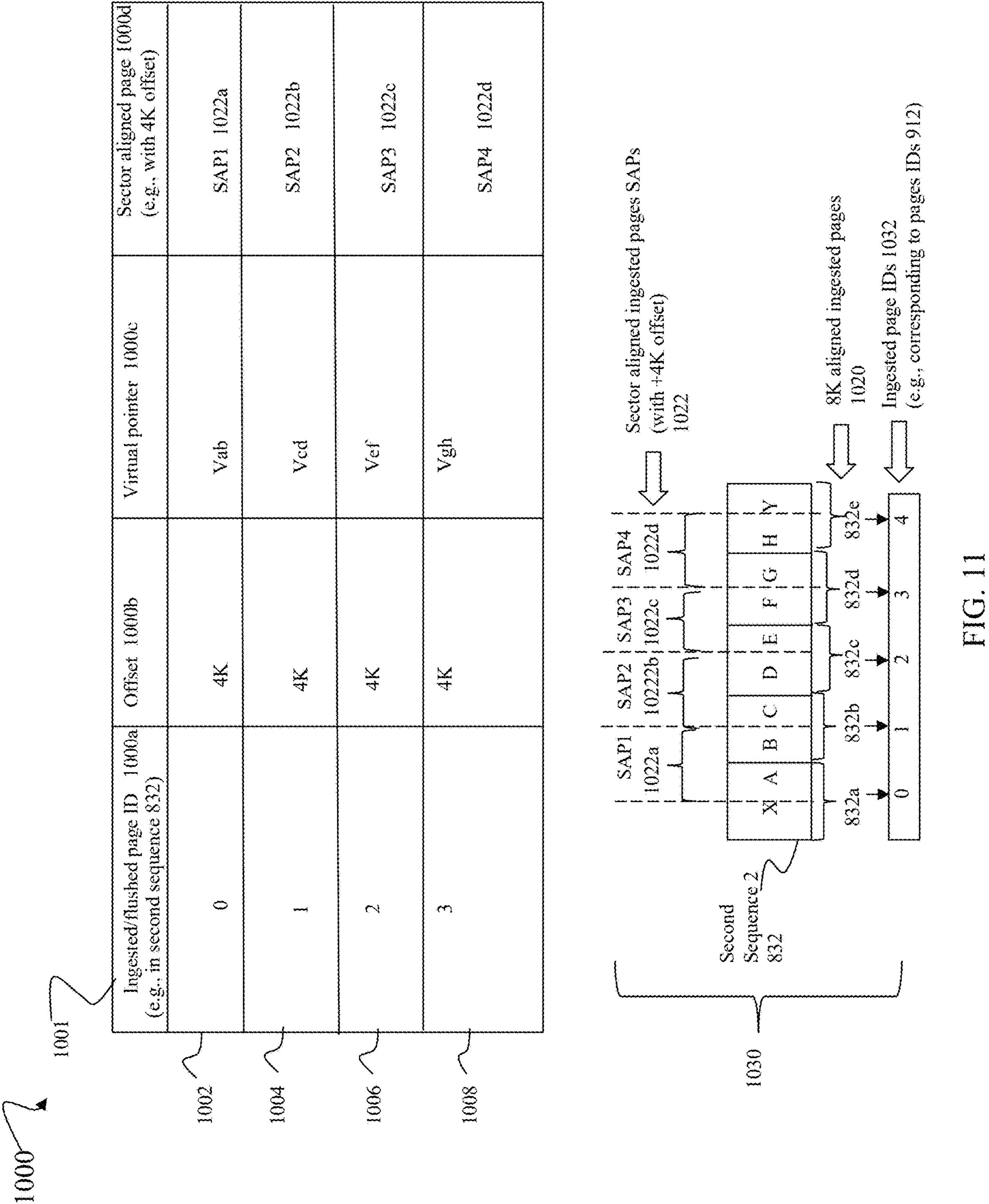

Referring to FIG. 11, shown is an example 1000 of i) the set of targets and related target information, and ii) an illustration of corresponding sector aligned pages in at least one embodiment in accordance with the techniques of the present disclosure. The table 1001 identifies the set of targets and related information which can be an output of the search phase described above. In at least one embodiment, each row of the table 1001 can describe a single target of the target set and the target's related information. In at least one embodiment, information of columns 1000*a-c* can be included the output of the search phase.

In at least one embodiment, each row of the table 1001 corresponding to a single target can include: i) an ingested page ID 1000*a*; ii) an offset 1000*b*; and iii) a virtual pointer or address (1000*c*) of the VLB entry used to indirectly access a page-aligned UD page which is a target page. The VLB entry can include the physical address or location of the page-aligned UD page (e.g., target page) as stored on non-volatile storage of the physical layer. In this example, each ingested page ID 1000*a* can denote an ingested page ID of an 8K aligned page of the second sequence 832, and the offset 1000*b* can denote an offset within an ingested page (e.g., 8K aligned page) of the second sequence 832. Each virtual pointer 1000*c* can denote a virtual pointer of a target page which is a stored 8K aligned page, such as a page of sequence 1 802, which is a possible match for an unaligned page or sector aligned page of the ingested sequence 832.

The ingested page ID (1000*a*) and offset (1000*b*) can respectively identify a particular ingested page and sector offset within the ingested page corresponding to the starting offset of a sector aligned ingested page SAPi having a corresponding hash value, HVSAPi (e.g., H (SAPi)

=HVSAPi), which matches an existing hash value of a target page (e.g., an existing page-aligned UD page as stored on non-volatile storage of the physical layer). Information of column 1000*d* may not be explicitly included in the target related information but can rather serve as identifiers of the particular SAPi instances described by the columns 1000*a-b*. The virtual pointer 1000*c* can be used to access the target page which is an existing page-aligned UD page as stored on non-volatile storage.

Row 1002 can correspond to a first target as previously identified in the 4K offset (1000*b*) round of sector aligned deduplication. A sector aligned page SAP1 (1000*d*) is identified which has a starting offset of 4K (1000*b*) in the ingested page 0 (1000*a*). In this case, the sector aligned page SAP1 is AB 1022*a* spanning across ingested pages 832*a-b* of the sequence 832. The target page identified can correspond to Vab (1000*c*). The target page AB 814*a* can be the stored UD page having the corresponding virtual pointer Vab (1000*c*), where the target page AB 814*a* is identified as a potential match to the sector aligned page AB (SAP1 1022*a*) by the search phase since the hash of the sector aligned page AB SAP1 1022*a* is mapped by the dedupe index 820 to Vab, where H (AB)=0 maps to dedupe index 820*a* which is associated with entry 822 identifying Vab as the location information used to access the stored UD page 814*a* which is a potential match for the sector aligned page SAP1 AB.

Row 1004 can correspond to a second target as previously identified in the 4K offset (1000*b*) round of sector aligned deduplication. A sector aligned page SAP2 (1000*d*) is identified which has a starting offset of 4K (1000*b*) in the ingested page 1 (1000*a*). In this case, the sector aligned page SAP2 is CD 1022*b* spanning across ingested pages 832*b-c* of the sequence 832. The target page identified can correspond to Vcd (1000*c*). The target page CD 814*b* can be the stored UD page having the corresponding virtual pointer Vcd (1000*c*), where the target page CD 814*b* is identified as a potential match to the sector aligned page CD (SAP2 1022*b*) by the search phase since the hash of the sector aligned page CD SAP2 1022*b* is mapped by the dedupe index 820 to Vcd, where H (CD)=1 maps to dedupe index 820*b* which is associated with entry 824 identifying Vcd as the location information used to access the stored UD page 814*b* as a potential match for the sector aligned page SAP2 CD.

Row 1006 can correspond to a third target as previously identified in the 4K offset (1000*b*) round of sector aligned deduplication. A sector aligned page SAP3 (1000*d*) is identified which has a starting offset of 4K (1000*b*) in the ingested page 2 (1000*a*). In this case, the sector aligned page SAP3 is EF 1022*c* spanning across ingested pages 832*c-d* of the sequence 832. The target page identified can correspond to Vef (1000*c*). The target page EF 814*c* can be the stored UD page having the corresponding virtual pointer Vef (1000*c*), where the target page EF 814*c* is identified as a potential match to the sector aligned page EF (SAP3 1022*c*) by the search phase since the hash of the sector aligned page EF SAP3 1022*c* is mapped by the dedupe index 820 to Vef, where H (EF)=3 maps to dedupe index 820*c* which is associated with entry 826 identifying Vef as the location information used to access the stored UD page 814*c* as a potential match for the sector aligned page SAP3 EF.

Row 1008 can correspond to a fourth target as previously identified in the 4K offset (1000*b*) round of sector aligned deduplication. A sector aligned page SAP4 (1000*d*) is identified which has a starting offset of 4K (1000*b*) in the ingested page 3 (1000*a*). In this case, the sector aligned page SAP4 is GH 1022*d* spanning across ingested pages 832*d-e* of the sequence 832. The target page identified can correspond to Vgh (1000*c*). The target page GH 814*d* can be the stored UD page having the corresponding virtual pointer Vgh (1000*c*), where the target page GH 814*d* is identified as a potential match to the sector aligned page GH (SAP4 1022*d*) by the search phase since the hash of the sector aligned page GH SAP4 1022*d* is mapped by the dedupe index 820 to Vgh, where H (GH)=5 maps to dedupe index 820*d* which is associated with entry 828 identifying Vgh as the location information used to access the stored UD page 814*d* as a potential match for the sector aligned page SAP4 GH.

In this example, a hash of a page can be mapped, such as by the dedupe index 820, to a virtual pointer or address of a VLB entry used to access a page-aligned UD page.

The element 1030 is an example further illustrating the sector aligned pages SAPs1-4 1022*a-d* in at least one embodiment in accordance with the techniques. In particular, the example 1030 further annotates the second sequence 832 with i) ingest page IDs (1000*a*), and ii) dashed lines denoting the sector aligned pages SAPs1-4 1022*a-d* listed in column 1000*d* as described by corresponding information of columns 1000*a-b*. The SAPs1-4 1022*a-d* correspond to virtually constructed sector aligned pages described in the example above with the search phase for the round using an offset of 4K. The element 1020 denotes the original 8K aligned ingested pages (832*a-e*) of UD of the second sequence 832 discussed above (e.g., in connection with FIGS. 9-10) and respective corresponding ingested page IDs 0-4 (1032).

What will now be described is the expansion phase in at least one embodiment in accordance with the techniques of the present disclosure. Continuing with the example above such as using the target set of FIG. 11, described in the following paragraphs is the expansion phase in at least one embodiment in accordance with the techniques of the present disclosure.

In at least one embodiment, the VLB sequentiality layout of the sequences 802 and 832 can be utilized. In this example, the non-page aligned or sector aligned deduplication can be performed as described above with the search phase with respect to the second sequence 832, such as part of flushing corresponding UD log entries corresponding to writing pages 832*a-e* of the second sequence 832. The sequence 802 can have a corresponding sequence of stored 8K aligned pages 814*a-d* linked together as denoted by the linked list of virtual pointers 807*a-c* (e.g., where each of the pointers can link together two logically consecutive sequential VLB entries of the linked list, where each of the VLB entries can be used to access a page of the sequence 802).

In at least one embodiment, the VLB sequentiality can correspond to the sequential logical ordering of written pages of a sequence based on the logical address ordering of such pages with respect to the logical address space. For example, the VLB sequentiality of stored UD pages aligned on the storage system's internal page boundary (e.g., 8K aligned pages) corresponding to the first sequence 802 is illustrated in FIG. 9 by the VLB entries 806*a-d* and connective arrows 807*a*-807*c* (e.g., the linked list where i) VLB entry 806*a* is linked (807*a*) to VLB entry 806*b*, VLB entry 806*b* is linked (807*b*) to VLB entry 806*c*, and VLB entry 806*c* is linked (807*c*) to VLB entry 806*d*; and ii) VLB entries 806*a-d* correspond respectively to ingested UD pages 802*a-d* and sequential logical addresses 804*a-d*).

In at least one embodiment, when flushing UD log entries which write a sequence of logically sequential pages (i.e., ordered by logical address) such as the first sequence 802, their corresponding VLB entries within one MD VLB page can be linked by a linked list such as illustrated by arrows 807*a-c* of FIG. 9. This method can be used in at least one embodiment to maintain the logical space sequentiality information of the sequence 802 in the virtual or VLB layer for efficient sector-aligned dedupe expansion of the expansion phase. In the expansion phase in at least one embodiment, given a sequence (e.g., 832) of pages to flush, from a single dedupe-index match identifying a target page of a first sequence (e.g., 802), processing can expand the entire sequence of pages to locate duplicates. In at least one embodiment based on the matches or targets found by the search phase, the expansion phase can further expand on the existing target data to the left and right of a target using corresponding linked VLB entries (e.g., of the first sequence 802) against the flushed sequence of pages (e.g., such as the second sequence 832) and do a continuous comparison for the entire sequence of pages flushed (e.g., 832) to find sector-aligned duplicates (e.g., with respect to stored UD pages of sequence 802).

With reference to the stored 8K aligned target pages identified by the virtual pointers 1000*c* of the table 1001, in one aspect the target pages identified by the search phase can be characterized as anchors, hints or starting points used to commence performing actual data comparisons in connection with the expansion phase, where such data comparisons can span to the left and right of the target in the existing sequence of stored UD pages 814*a-d* (e.g., corresponding to the sequence 802) and to the left and right of a corresponding ingested or flushed page. With expansion phase processing, the on-disk stored UD pages can be traversed based on logical information (e.g., linked list 1104) of a prior sequence 802 to determine matches with ingested or flushed UD pages. The foregoing can generate an unaligned page at a given offset from two consecutive sequential pages of the prior sequence 802 based on its associated logical information and linkage (e.g., 1104).

Consistent with other discussion herein, the linked list or linkage 1104 denotes the VLB sequentiality of corresponding logical addresses of sequence 802. In at least one embodiment, the VLB sequentiality corresponding to a sequence of stored aligned pages can be implemented as described, for example, in U.S. patent application Ser. No. 19/037,781, (the '781 application), filed Jan. 27, 2025, entitled SYSTEM AND METHOD FOR MAPPING UNALIGNED VIRTUAL LAYER PAGES FOR SECTOR ALIGNED DEDUPLICATION, Wahl et al., With reference back to FIG. 9 in at least one embodiment, the arrows 807*a-c* denoting stored 8K aligned UD pages of the sequence 802 are illustrated as two headed arrows to denote a doubly linked list so that the sequence 802 of pages can be traversed from left to right and also from right to left as may be needed in connection with expansion to the left and also the right of an identified target in the expansion phase. Generally in at least one embodiment, the 4 target pages referenced by the virtual pointer 1000*c* and corresponding related information denoted by columns 1000*a-b* in respective rows of the table 1001 can be processed in any suitable order. For purposes of illustration of the expansion phase in the following paragraphs, reference will be made to expansion processing of the row 1006 of table 1001.

Figure 12:
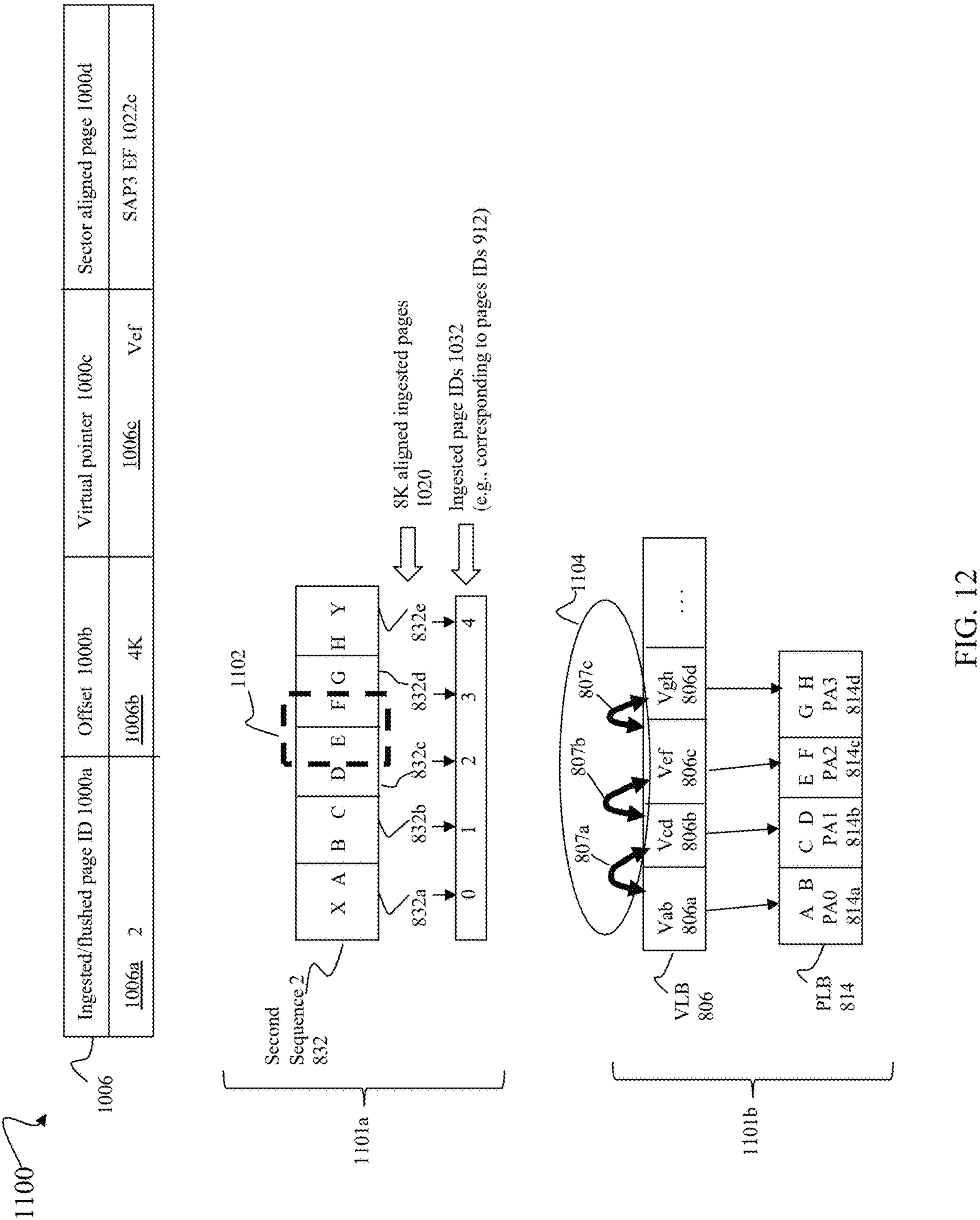

Referring to FIGS. 12 and 13, shown is an example 1100, 1400 illustrating the expansion phase in at least one embodiment in accordance with the techniques of the present disclosure.

In at least one embodiment, expansion processing can be performed to determine whether aligned flushed or ingested pages of the sequence 832 are dedupable with respect to stored pages 814*a-d* of the sequence 802. Such expansion processing can determine whether an aligned flushed page of the sequence 832 has a corresponding sector aligned match to a generated sector aligned page having content spanning across a pair of adjacent or consecutive stored aligned pages 814*a-d* having an ordering denoted by the sequence 802. In this manner, expansion processing can determine whether a flushed or ingested page (e.g., 8K aligned) of the sequence 832 is dupable across two sequential, consecutive or adjacent stored pages corresponding to the sequential order of 1104 (which denotes the sequential page ordering of the previously written pages of the sequence 802), given a particular sector offset.

In FIG. 12, the element 1006 denotes the same row 1006 of the table 1001 reproduced in FIG. 12 for ease of illustration. In the row 1006, the target page can be the stored 8K aligned page EF 814*c* which can be accessed using the virtual pointer Vef 1006*c*.

The element 1101*a* illustrates the location 1102 of a potential sector aligned or non-page aligned match to the target page EF 814*c*. As included in the related information for the target page EF 814*c*, the sector aligned page 1102 in the second sequence 832 has a starting location at the offset 4K (1006*b*) in the ingested page 2 832*c* (1006*a*). In one aspect, the prior search phase can be characterized as determining that ingested page 2 832*c* at the corresponding 4K offset (1006*b*) has a hit or potential match between the sector aligned page 1102 and the target page EF 814*c* as stored on non-volatile storage.

The element 1101*b* illustrates the linked list 1104 of VLB entries or virtual pointers corresponding to the sequential order of stored pages 814*a-d* corresponding to the sequential order of pages in the previously written sequence 802.

In the expansion phase in at least one embodiment, expand left processing can be performed to locate corresponding sector aligned matches between 8K aligned pages of the flushed or ingested sequence 832 and stored pages 814*a-d* of the sequence 802 (having the sequentiality denoted by the linked list 1104), where such matches of the expand left processing can be generally be between i) a generated sector aligned page which to the left of the target page 814*c* with respect to the ordering of the linked list 1104; and ii) an aligned ingested or flushed page of the sequence 832*c* which is at or to the left of the ingested or flushed page 2 832*c* of the sequence 832.

In the expansion phase in at least one embodiment, expand right processing can be performed to locate corresponding sector aligned matches between 8K aligned pages of the flushed or ingested sequence 832 and stored pages 814*a-d* of the sequence 802 (having the sequentiality denoted by the linked list 1104), where such matches of the expand right processing can be generally be between i) a generated sector aligned page which is to the right of the target page 814*c* with respect to the ordering of the linked list 1104; and ii) an aligned ingested or flushed page of the sequence 832*c* which is to the right of the ingested or flushed page 2 832*c* of the sequence 832.

In this example, a target page can generally refer to an 8K aligned UD page stored on disk or on non-volatile storage of an LSS on BE PDs. For example, the stored UD pages 814*a-d* are target pages. The target pages corresponding to the virtual pointers 1000*c* of the table 1001, such as entry 1006, denote particular ones of the target pages or stored UD pages which are identified by the search phase. Now the expansion phase will use the identified target pages of the search phase as hints, anchors or starting points for subsequently searching for sector aligned duplicated pages which are ingested or flushed pages each corresponding to a generated sector aligned page formed from two target or stored UD pages with respect to a particular sector offset.

In the following paragraphs, the sequence 802 having corresponding stored UD pages 814*a-d* in sequential order can be denoted as SEQ1(i), where SEQ1 refers to the sequence or ordering of pages denoted by 1104 corresponding to the sequence 802, and where "i" denotes the ith page or page ID of SEQ1. The sequence 832 can be denoted as SEQ2, where a particular page of SEQ2 can be denoted as SEQ2(i), where "i" indicates that the particular path is the ith page or has page ID=i in SEQ2.

The expansion phase will be described with respect to processing performed for a single identified target of the target set corresponding to the row 1006 of the table 1001.

Referring to the example 1400 of FIG. 13A, the table 1410 summarizes expand left processing described below for the target page EF 814*c* as identified by Vef 1006*c* by the search phase.

In a step S1 of expand left processing, the current flushed page can be set to the flushed page found with a match (e.g., hash value match) during the search phase. In this example with reference to the row 1006, the ingested or flushed page 2 (1006*a*), denoted SEQ2(2), is the flushed page DE 832*c* of the sequence 832 having the foregoing match as determined during the search phase. Following the step S1, a step S2 can be performed.

In the step S2, the current target page can be set to the aligned target page EF 814*c* corresponding to the virtual pointer Vef 1006*c*, where the aligned target page EF 814*c* can be denoted as SEQ1(2)=EF. In the step S2, processing can be performed to read the current target page SEQ1(2) =EF, and its logically previous aligned target page SEQ1(1) =CD (e.g., by VLB sequentiality linked list 1104). Following the step S2 is a step S3.

In the step S3, processing can generate and an unaligned page formed from both target pages SEQ1(1)-CD and SEQ1 (2)=EF given the sector offset, which is 4K in this example. In this case, the generated unaligned or sector aligned page is DE.

It should generally be noted that in this particular example, the offset used during expansion processing to create or generate the unaligned page is 4K, and the offset discovered during the search phase is also 4K (e.g., 1006*b* of entry 1006) for a page size of 8K. More generally, during expansion processing (both expand left processing and expand right processing), it should be noted that the offset used to create the unaligned page from the two target pages as in the step S3 is not the same offset as the offset discovered during the search phase. The offset used during the expansion phase (sometimes referred to as the expansion offset or expansion phase offset) is "the size of the storage system internal page size" (e.g. 8K in this example) minus "the offset used during the search phase" (sometimes referred to herein as the search offset or search phase offset). In the case of the search phase offset being 4K with an 8K page size as with this example in the step S3, then the expansion phase offset is also 4K. However, i) the expansion phase offset and the search phase offset will vary with storage system internal page size, and ii) the expansion phase offset can be different from the search phase offset where the expansion phase offset=storage system internal page size-expansion phase offset. To further illustrate, a search offset of 2K results in the expansion phase using an offset of 6K for an 8K storage system internal page size. The expansion offset or offset used to create or generate unaligned pages in expand left processing and expand right processing can be expressed as:

$$\text{expansion phase offset} = \text{storage system internal page size} - \text{expansion phase offset} \quad \text{EQUATION 1}$$

Following the step S3 is a step S4.

In the step S4, the generated sector aligned page with offset 4K, DE, can be compared (e.g., byte by byte) to the current flushed page SEQ2(2)=DE. If the foregoing comparison determines that the generated sector aligned page with offset 4K is not identical to the current flushed page SEQ2(2)=DE, expand left processing for the current identified search target or row 1006 stops. Otherwise, if the foregoing comparison determines that the generated sector aligned page with offset 4K is identical to the current flushed page SEQ2(2)=DE, processing determines that a sector aligned duplicated page has been located whereby the current flushed page is a sector aligned duplicate of the generated sector aligned page given the 4K offset. In this example, the foregoing comparison determines that SEQ2(2)=DE is identical to the generated sector aligned page DE.

The row 1412 of the table 1410 summarizes the above iteration of expand left processing performed for the current target page SEQ1(2)=EF. Generally the table 1410 includes a row for each iteration of expand left processing performed with respect to a single row 1006 of the table 1001 of targets identified by the search phase. For each iteration, a corresponding row of 1410 identifies: a current ingested/flushed page 1410*a* (for which a sector aligned match is trying to be located); an aligned target page 1410*b* (corresponding to the current target page variable set for the corresponding iteration); a previous aligned target page 1410*c* (corresponding to the page that is logically prior to or immediately precedes the current target page for the corresponding iteration); and a generated unaligned page based on the 4K offset 1410*d* (where the unaligned page is generated from content of target pages 1410*b-c* given the 4K offset).

In the row 1412 summarizing the above first iteration of expand left processing, i) the current ingested/flushed page (1410*a*) is SEQ2(2)=DE 832*c*; ii) the aligned target page (1410*b*) is SEQ1(2)=EF 814*c*; iii) the previous aligned target page (1410*c*) is SEQ1(1)=CD 814*b*; and iv) the generated unaligned page (1410*d*) is DE. Based on the step S4 determining a match between the current flushed page (1410*a*) SEQ2(2)=DE 832*c* and the generated unaligned page DE (1410*d*), the current flushed page DE 832*c* is determined to be a sector aligned duplicate of the generated unaligned or sector aligned page DE given offset 4K. In this case, the current flushed page DE 832*c* can be deduplicated using content of target pages 814*b-c* given the 4K offset.

Expand left processing now continues for the current identified search target or row 1006 with a next or second iteration by i) advancing to the current flushed page from SEQ2(2)=DE to the left or to the logically sequentially preceding page SEQ2(1)=BC; and ii) advancing the current target page from SEQ1(2)=EF 814*c* to the left or the logically sequentially preceding page SEQ1(1)=CD 814*b*. In the second iteration of expand left processing, the above-noted steps can be repeated but with respect to the new or updated values of the current flushed page and current target page.

The row 1414 summarizes the second iteration of expand left processing where i) the current ingested/flushed page (1410*a*) is SEQ2(1)=BC 832*b*; ii) the aligned target page (1410*b*) is SEQ1(1)=CD 814*b*; iii) the previous aligned target page (1410*c*) is SEQ1(0)=AB 814*c*; and iv) the generated unaligned page (1410*d*) is BC. In this second iteration of the step S4, the generated sector aligned page BC (1410*d*) is compared to the current ingested/flushed page (1410*a*) SEQ2(1)=BC 832*b*, where the foregoing pages are determined to be identical. In this case, processing determines that another sector aligned duplicated page has been located whereby the current flushed page SEQ2(1)=BC 832*c* is a sector aligned duplicate of the generated sector aligned page BC given the 4K offset. The current flushed page BC 832*b* can be deduplicated using content of target pages 814*ba-b* given the 4K offset.

Expand left processing for an identified search phase target or row of the table 1001 can terminate if, in any iteration, a mismatch is determined between the current flushed page and the generated unaligned page given the offset such as the 4K offset. Expand left processing can also terminate for the particular identified search phase target or row of the table 1001 when target pages and/or flushed pages have been exhausted. In general, expand left processing would continue in a next third iteration using updated values for the current ingested/flushed page 1410*a*, the aligned target page 1410*b*, and the previous aligned target page 1410*c*. In this third iteration, i) the current ingested/flushed page 1410*a* is advanced to the left to the next logically sequentially preceding page SEQ2(0)=XA 832*a*; ii) the current target page is advanced to the left from SEQ1(1) CD 814*b* to SEQ1(1) AB 814*a*; and iii) the previous aligned target page is the target page immediately logically preceding the updated current target page SEQ1(1) AB 814*a*. However, in this case there is no such page so expand left processing stops.

Following expand left processing for the target page EF 814*c* as identified by Vef 1006*c* by the search phase, expand right processing can be performed for the target page EF 814*c* as identified by Vef 1006*c* by the search phase as discussed below.

Referring to the example 1400 of FIG. 13A, the table 1420 summarizes expand right processing described below for the target page EF 814*c* as identified by Vef 1006*c* by the search phase.

In a step S11 of expand right processing, the current flushed page can be set to the flushed page sequentially consecutively following or after the flushed page found with a match (e.g., hash value match) during the search phase. In this example with reference to the row 1006, the ingested or flushed page 2 (1006*a*), denoted SEQ2(2), is the flushed page DE 832*c* of the sequence 832 having the foregoing match as determined during the search phase. Thus expand right processing can commence with the current flushed page set to SEQ2(3) FG 832*d* which follows SEQ2(2) DE 832*c* with respect to the consecutive logical ordering of pages in the sequence 832. Following the step S11, a step S12 can be performed.

In the step S12, the current target page can be set to the aligned target page EF 814*c* corresponding to the virtual pointer Vef 1006*c*, where the aligned target page EF 814*c* can be denoted as SEQ1(2)=EF. In the step S12, processing can be performed to read the current target page SEQ1(2) =EF, and its logically next aligned target page SEQ1(3)=GH (e.g., by VLB sequentiality linked list 1104). Following the step S12 is a step S13.

In the step S13, processing can generate and an unaligned page formed from both target pages SEQ1(2)=EF and SEQ1 (3)-GH given the sector offset, which is 4K in this example. In this case, the generated unaligned or sector aligned page is FG. As noted above in connection with the step S3 in this particular example, the expansion phase offset is 4K and the search offset is also 4K. More generally, the expansion phase offset (as used in connection with generating the unaligned pages for expand left processing and expand right processing can be determined as in EQUATION 1. Following the step S13 is a step S14.

In the step S14, the generated sector aligned page with offset 4K, FG, can be compared (e.g., byte by byte) to the current flushed page SEQ2(3)=FG. If the foregoing comparison determines that the generated sector aligned page with offset 4K is not identical to the current flushed page SEQ2(3)=FG, expand right processing for the current identified search target or row 1006 stops. Otherwise, if the foregoing comparison determines that the generated sector aligned page with offset 4K is identical to the current flushed page SEQ2(3)=FG, processing determines that a sector aligned duplicated page has been located whereby the current flushed page is a sector aligned duplicate of the generated sector aligned page given the 4K offset. In this example, the foregoing comparison determines that SEQ2(3)=FG is identical to the generated sector aligned page FG.

The row 1422 of the table 1420 summarizes the above iteration of expand right processing performed for the current target page SEQ1(2)=EF. Generally the table 1420 includes a row for each iteration of expand right processing performed with respect to a single row 1006 of the table 1001 of targets identified by the search phase. For each iteration, a corresponding row of 1420 identifies: a current ingested/flushed page 1420*a* (for which a sector aligned match is trying to be located); an aligned target page 1420*b* (corresponding to the current target page variable set for the corresponding iteration); a next aligned target page 1420*c* (corresponding to the page that is logically after or immediately follows the current target page for the corresponding iteration); and a generated unaligned page based on the 4K offset 1420*d* (where the unaligned page is generated from content of target pages 1420*b-c* given the 4K offset).

In the row 1422 summarizing the above first iteration of expand right processing, i) the current ingested/flushed page (1420*a*) is SEQ2(3)=FG 832*d*; ii) the aligned target page (1420*b*) is SEQ1(2)=EF 814*c*; iii) the next aligned target page (1420*c*) is SEQ1(3)=GH 814*b*; and iv) the generated unaligned page (1420*d*) is FG. Based on the step S14 determining a match between the current flushed page (1420*a*) SEQ2(3)=FG 832*d* and the generated unaligned page FG (1420*d*), the current flushed page FG 832*d* is determined to be a sector aligned duplicate of the generated unaligned or sector aligned page FG given offset 4K. In this case, the current flushed page FG 832*d* can be deduplicated using content of target pages 814*c-d* given the 4K offset.

Expand right processing now continues for the current identified search phase target or row 1006 with a next or second iteration by i) advancing to the current flushed page from SEQ2(3)=FG to the right or to the logically sequentially next page SEQ2(4)=HY 832*d*; and ii) advancing the current target page from SEQ1(2)=EF 814*c* to the right or the logically sequentially next page SEQ1(4). However, in this example, there is no such next page SEQ1(4) so expand right processing stops for the current row 1006 and identified search phase target. Otherwise, more generally, the above-noted steps can be repeated but with respect to the new or updated values of the current flushed page and current target page. Generally, expand right processing for the current identified search phase target or row 1006 can terminate when flushed pages and/or target pages are exhausted, where there are no remaining flushed and/or target pages remaining to complete a next iteration.

Described above is processing that can be performed with respect to a single row 1006 for a single identified search phase target. The above-noted processing of expand left and expand right processing can generally be repeated and performed with respect to each row of the table 1001 for a corresponding identified search phase target.

In at least one embodiment, once an ingested or flushed page has been deduplicated such as in the expansion phase of the sector aligned deduplication, the flushed page can be removed from further iterations of the expansion phase. Put another way, processing can remove a flushed or ingested page from further consideration for deduplication once the flushed page is deduplicated as a sector aligned deduplicated page. For example, assume the row 1006 and the target page EF 814*c* is the first of all 4 rows processed in connection with the expansion phase as just described where flushed page DE 832*c* having page ID=2 and flushed page BC 832*b* having page ID=1 are each deduplicated as a sector aligned deduplicate page with respect to 2 existing 8K pages. In this case, the expansion phase can remove or omit processing of row 1004 which attempts to deduplicate flushed page BC 832*b* having the page ID=1 (e.g., denoted by column 1000*a*). In this example, further processing of the expansion phase for rows 1002, 1004 and 1008 may not identify any other sector aligned duplicates.

In at least one embodiment, an output of the expansion phase can specify and describe the sector aligned duplicates identified in the expansion phase. The table 1430 summarizes the output of the expansion phase in connection with the above example based on the sequences 802 and 832 while flushing the sequence 832. The table 1430 includes the following columns: ingested/flushed page 1430*a*, stored aligned pages 1430*b*, and offset 1430*c*. In at least one embodiment, the offset 1430*c* can correspond to the expansion phase offset determined, for example, in accordance with EQUATION 1 discussed elsewhere herein. Each row of the table 1430 can describe a sector aligned duplicate identified by the expansion phase for the sequence 832 of flushed or ingested pages. Each row of the table can identify, for a particular ingested or flushed page (1430*a*), the two stored aligned pages (1430*b*) which are logically sequential or consecutive pages in the prior sequence 802 having corresponding sequentiality or ordering based on the linked list 1104, and where the particular ingested or flushed page (1430*a*) is a duplicate of content spanning across the two stored aligned pages (1430*b*) given a specified offset (1430*c*).

The row 1432 indicates that ingested or flushed page SEQ2(1)=BC 832*b* (1430*a*) can be deduplicated using content from stored pages AB 814*a* and CD 814*b* which are accessed respectively using the virtual pointers Vab and Vcd (1430*b*) with respect to the 4K offset (1430*c*).

The row 1434 indicates that ingested or flushed page SEQ2(2)=DE 832*c* (1430*a*) can be deduplicated using content from stored pages CD 814*b* and EF 814*c* which are accessed respectively using the virtual pointers Vcd and Vef (1430*b*) with respect to the 4K offset (1430*c*).

The row 1436 indicates that ingested or flushed page SEQ2(3)=FG 832*d* (1430*a*) can be deduplicated using content from stored pages EF 814*c* and GH 814*d* which are accessed respectively using the virtual pointers Vef and Vgh (1430*b*) with respect to the 4K offset (1430*c*).

Figure 13B:
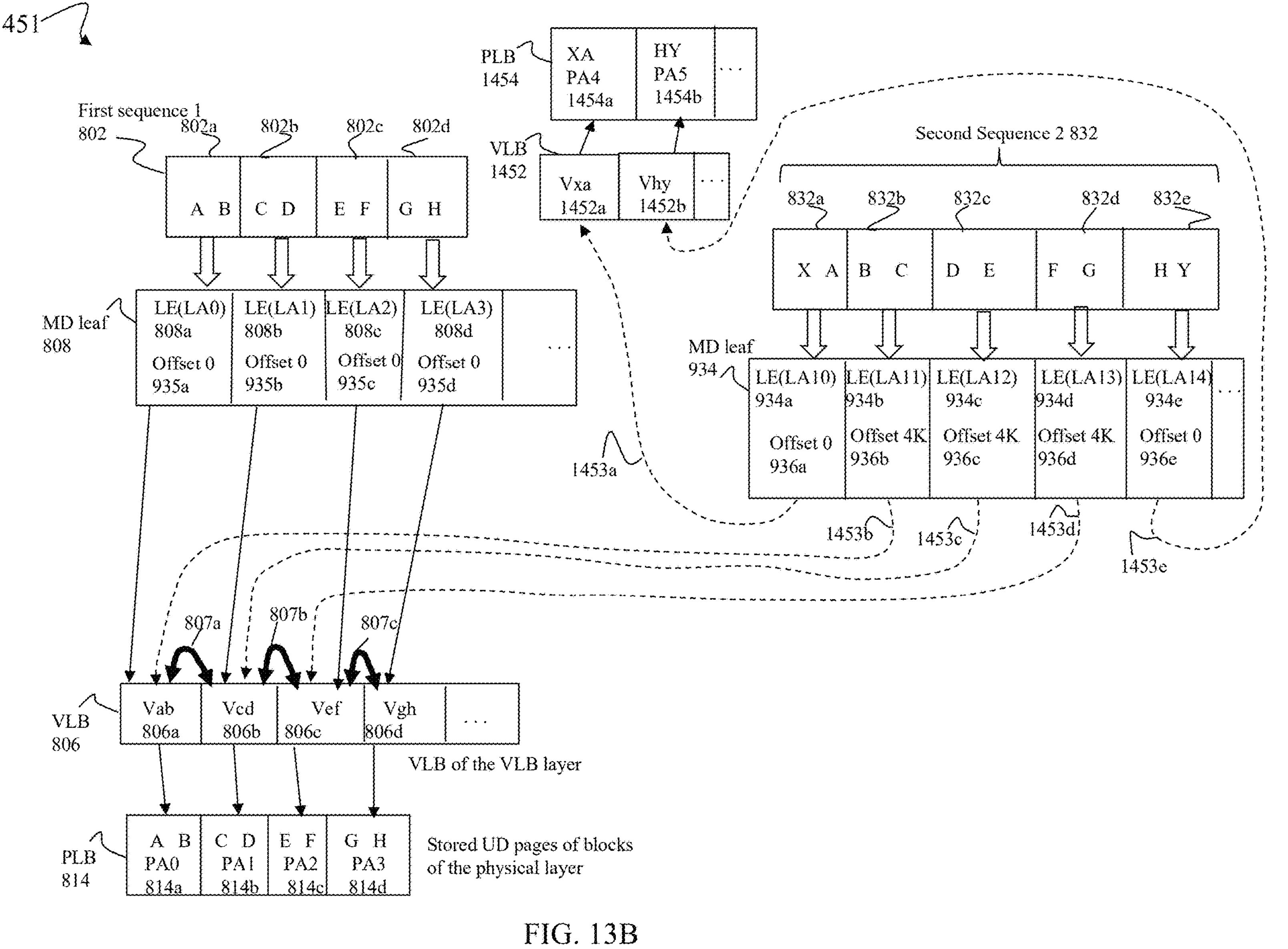

Referring to FIG. 13B, shown is an example 1451 illustrating various structures that can be created and/or updated in at least one embodiment in accordance with the techniques of the present disclosure. The structures of 1451 can denote a current state of such structures after performing deduplication of the sequence 832, where such deduplication include sector-aligned or non-page aligned deduplication as described above.

The example 1451 includes structures 832, 802, 808, 806 814, and connections therebetween as described above in connection with other figures. Additionally, the MD leaf entries 808*a-d* can respectively include offsets 935*a-d*, each of which are zero (0) denoting an aligned page. Generally, a MD leaf entry corresponding to an unaligned page, such as a sector aligned duplicate detected, can have a corresponding offset which is greater than zero. The foregoing is discussed in more detail below with respect to the sector aligned duplicates 1430 and the sequence 832.

Additionally, the example 1451 now further includes structures 934, 1452 and 1454 used in connection with the second sequence 832 after sector-aligned deduplication detects the 3 sector aligned duplicates 1432, 1434 and 1436 of 1430 of FIG. 13A.

The MD leaf 934 can include MD leaf entries LE 934*a-e* corresponding respectively to logical addresses LA10-14, where LA10-14 correspond respectively to ingested or flushed pages 832*a-e* of sequence 832. The VLB 1452 can include VLB entries 1452*a-b*, where: VLB entry 1452*a* has address or virtual pointer Vxa, and VLB entry 1452*b* has address or virtual pointer Vhy. VLB entry 1452*a* can point to or reference the stored UD page XA 1454*a* stored at physical address or location PA4 of the PLB 1454. VLB entry 1452*b* can point to or reference the stored UD page HY 1454*b* stored at physical address or location PA5 of the PLB 1454. MD leaf entries 934*a* and 934*e* can respectively have offsets 936*a* and 936*e*, each of which are zero thereby denoting that such VLB entries correspond aligned pages. MD leaf entries 934*b-d* can respectively have offsets 936*b-d*, each of which are 4K thereby denoting that such VLB entries correspond to non-aligned or sector aligned pages.

MD leaf entry LE(LA10) 934*a* can reference or point to (1453*a*) VLB entry 1452*a*. MD leaf entry LE(LA11) 934*b* can reference or point to (1453*b*) VLB entry 806*a*. MD leaf entry LE(LA12) 934*c* can reference or point to (1453*c*) VLB entry 806*b*. MD leaf entry LE(LA13) 934*d* can reference or point to (1453*d*) VLB entry 806*c*. MD leaf entry LE(LA14) 934*e* can reference or point to (1453*d*) VLB entry 1452*b*.

In at least one embodiment and consistent with other discussion herein (e.g., FIG. 6) with reference counts, such as 1301*a*, a single VLB entry can reference or point to a physical data block (e.g., to allow the physical block to be moved elsewhere and only need to update the single VLB entry pointing to it). In the case of aligned dedupe, as shown in FIG. 6, there are two Leaf entries 1352*a*, 1356*a* that point to the same VLB entry 1357*a*. The same can hold true for VLB entries corresponding to unaligned deduplicated pages. For example, with reference to FIG. 13B, MD leaf entries 934*b* and 808*a* both point to or reference VLB entry Vab 806*a*. For an unaligned deduplicated page, its corresponding MD leaf entry such as 934*b* has an associated offset 936*b* of 4K, or more generally greater than zero. Consistent with the discussion of reference counts such as in connection with FIG. 6, each of the VLB entries 806*a-d* can have a reference count of 2 to account for the 2 references to each of the foregoing VLB entries. In the example 1451, VLB entries 1452*a-b* can each have a reference count of 1.

In at least one embodiment, the expansion phase can be optimized by reading a batch of existing stored pages of the previously written sequence 802 from non-volatile storage of BE PDs at once. For example in at least one embodiment, two or more of the stored pages 814*a-d* corresponding to the sequence 802 can be read from non-volatile storage of BE PDs at once in a single read request or I/O operation in efforts to reduce the latency experienced. The foregoing can be performed rather than, for example, reading each of the pages 814*a-d* in 4 separate read requests or operations.

The added overhead processing for finding sector-aligned duplicate pages may be a concern for flush processing time. In at least one embodiment, processing can mitigate the foregoing, for example, by performing sector aligned deduplication, or more generally, non-page aligned or unaligned deduplication processing described herein in the background and as a low-priority process. In at least one embodiment, processing can continually scan for unprocessed VLBs associated with stored user data, where such unprocessed VLBs can then be further processed for sector aligned deduplication as a background process. In at least one embodiment, the foregoing can be performed rather than performing the sector aligned deduplication as part of flush processing. As an alternative in at least one embodiment, a decision can be made dynamically about whether to perform sector aligned deduplication, or more generally deduplication, as part of flushing or as a background operation or task which can be based, at least in part, on the current workload of the storage system. If the current workload of the storage system is above a threshold level, deduplication can be deferred and performed at a later point in time when the system has a lower workload level. In at least one embodiment, if deduplication is deferred and not performed as part of flushing but rather later as a background task, the written UD pages such as of sequence 832 can be processed as described herein without performing deduplication. For example, flushing can include creating corresponding mapping information of MD pages and storing the written UD pages of sequence 832 on non-volatile storage of BE PDs. At a later point in time sector aligned deduplication processing can be performed and the corresponding mapping information for the sequence 832 can be updated to reflect any detected sector aligned duplicates. Additionally, storage of any duplicates eliminated can now be freed or reclaimed such as, for example, by garbage collection processing for an LSS where UD pages are stored on non-volatile storage of BE PDs.

Referring to FIGS. 14A-D, shown are flowcharts, 1500*a-d* of processing steps that can be performed in at least one embodiment in accordance with the techniques of the present disclosure.

The FIGS. 14A-D summarize processing described above in connection with performing the expansion phase for a single target page TGT1 and corresponding information as identified in the search phase. Put another way, the processing of FIGS. 14A and 14B can be performed with respect to each row of the table 1001*c* corresponding to a single target of the target set identified by the search phase.

At the step 1502, the target set can include target pages and related information identified by the search phase for sequence 832 denoted as SEQ2. SEQ1 can denote the sequence of previously stored aligned pages corresponding to the sequence 802. SEQ1 can be identified using the linked list of VLB entries. The target pages or stored page-aligned UD pages can be included in SEQ1 having page IDs corresponding to those of the sequence 802. From the step 1502, control proceeds to the step 1504. The step 1504 can begin expand left processing.

At the step 1504, the variable current target page can be assigned an aligned target page TGT1 of the target set. TGT1 (1000*c*) can be identified as SEQ1(K) where the TGT1 is the Kth aligned stored page of SEQ1. For example with respect to row 1006, TGT1 can be the target or stored UD page EF 814*c* corresponding to the page SEQ1(2) identified as potential sector aligned match for flushed page 2 832*c* given the current offset 4K (1006*b*).

The variable current offset can be assigned the sector offset corresponding to the current target page. Consistent with other discussion herein, the current offset of the expansion phase as used in FIGS. 14A-B processing can be determined, for example, as expressed using EQUATION 1 with respect to the particular search phase offset (1000*b*) obtained from the related information for the current target page as determined by the search phase. Put another way, the current offset of the step 1504 can be expansion phase offset which is determined based on i) the storage system internal page size, and ii) the search phase offset (1000*b*) obtained from the related information for the current target page as determined by the search phase. The current flushed or ingested page can be assigned the page SEQ2(L). The current flushed or ingested page (1000*a*) can be the ingested page L of SEQ2 included in the related information for TGT1 as determined by the search phase. The ingested page L of SEQ2, denoted SEQ2(L) can be an ingested aligned page of SEQ2 determined by the search phase to be a potential sector aligned match with the TGT1 given the corresponding current offset. From the step 1504, control proceeds to the step 1506.

At the step 1506, processing can read the current target page SEQ1(K) and its logically immediately previous aligned page SEQ1(K−1). Processing can include: generating an unaligned page formed from the pages SEQ1(K) and SEQ1(K−1) given the current offset, and comparing the current flushed page to the generated unaligned page. From the step 1506, control proceeds to the step 1508.

At the step 1508, a determination is made as to whether the comparison of the step 1506 determined that the current flushed page is identical to the generated unaligned page. If the foregoing two pages are determined in the step 1506 as not identical, control proceeds to the step 1510. At the step 1510, expand left processing for TGT1 can stop, and expand right processing can be performed for TGT1. From the step 1510, control proceeds to the step 1554 to perform expand right processing can be performed for TGT1.

If the step 1506 determines that the above-noted two pages are identical, control proceeds to the step 1512. At the step 1512, it is determined that a sector aligned duplicate page has been found. The current flushed page can be represented as a sector aligned duplicate of the stored pages SEQ1(K) and SEQ1(K−1) given the current offset. From the step 1512, control proceeds to the step 1514.

At the step 1514, the variable L can be decremented by 1, and the variable K can be decremented by 1. The foregoing of step 1514 can denote a shift to expand left and continue with corresponding page comparisons between ingested or flushed pages and constructed sector aligned pages formed from 2 stored page-aligned UD pages which are consecutive or adjacent with respect to a logical sequence associated with the stored UD pages. From the step 1514, control proceeds to the step 1516.

At the step 1516, the current flushed page is assigned SEQ2(L), and the current target page is assigned SEQ1(K). From the step 1516 control proceeds to the step 1518.

At the step 1518, a determination is made as to whether expand left processing is complete for TGT1, such as, for example, when there are no remaining target and/or flushed pages to process in connection with expand left processing at the leftmost positions of SEQ1 and SEQ2. If the step 1518 evaluates to yes, control proceeds to the step 1520 to stop expand left processing for TGT1 and to proceed with expand right processing for TGT1. From the step 1520, control proceeds to the step 1554.

If the step 1518 evaluates to no, control proceeds to the step 1522. At the step 1522, processing continues with expand left processing for TGT1 based on the updated values for the current flushed page and current target page. From the step 1522, control proceeds to the step 1506 for the next iteration of expand left processing.

Figure 14A:
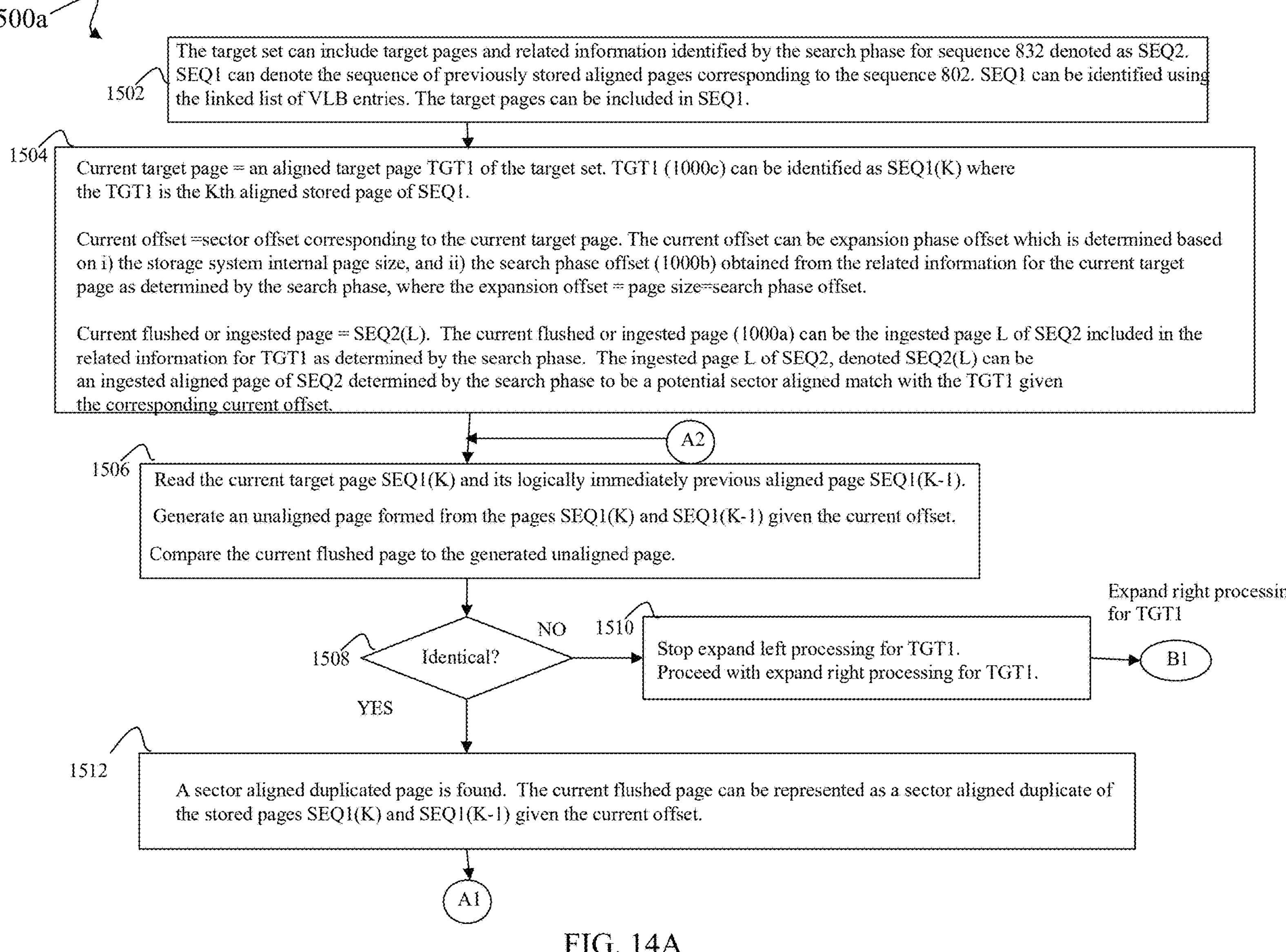
FIGS. 14A-14D are flowcharts of processing steps that can be performed in at least one embodiment in accordance with the techniques of the present disclosure.
Figure 14B:
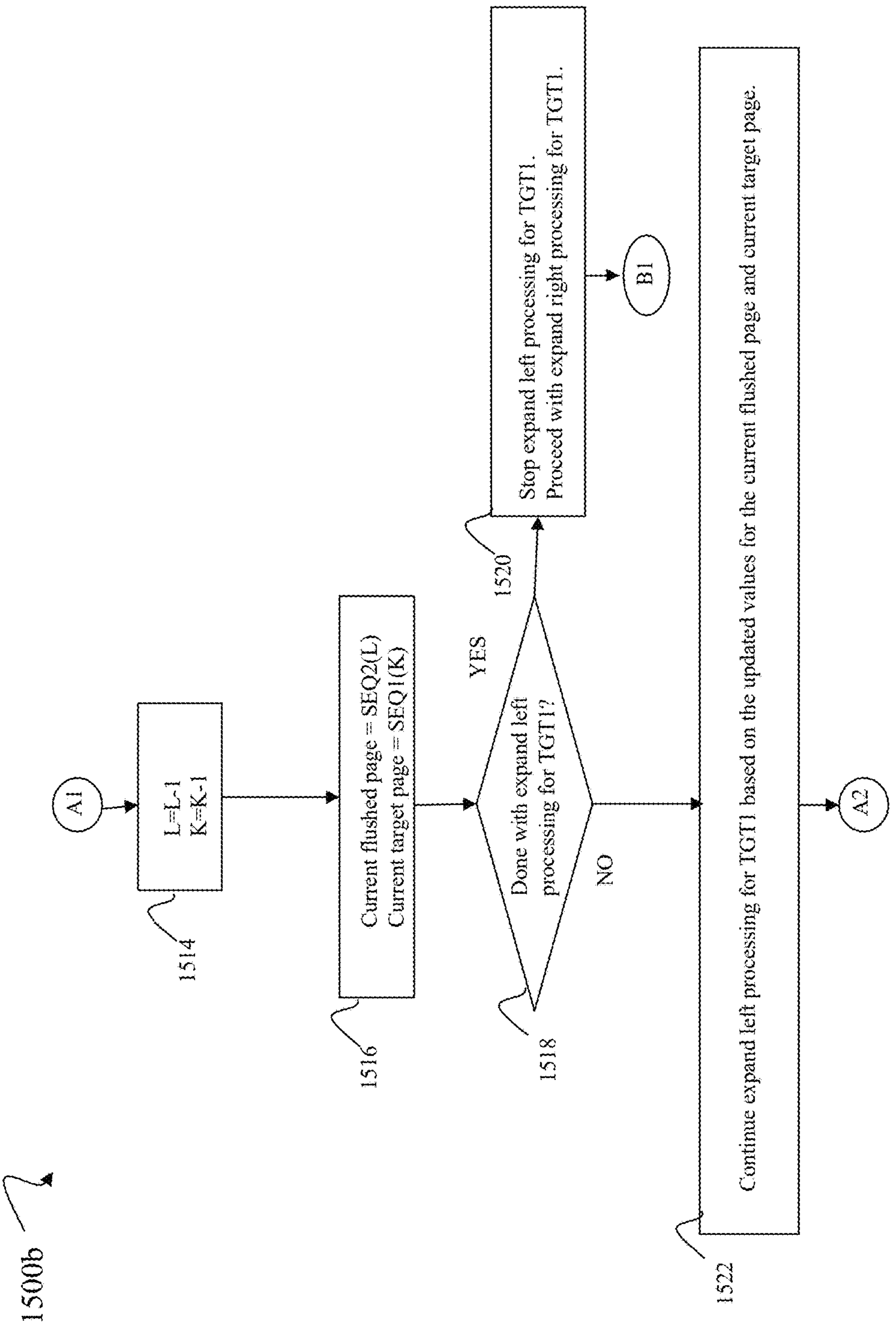
Figure 14C:
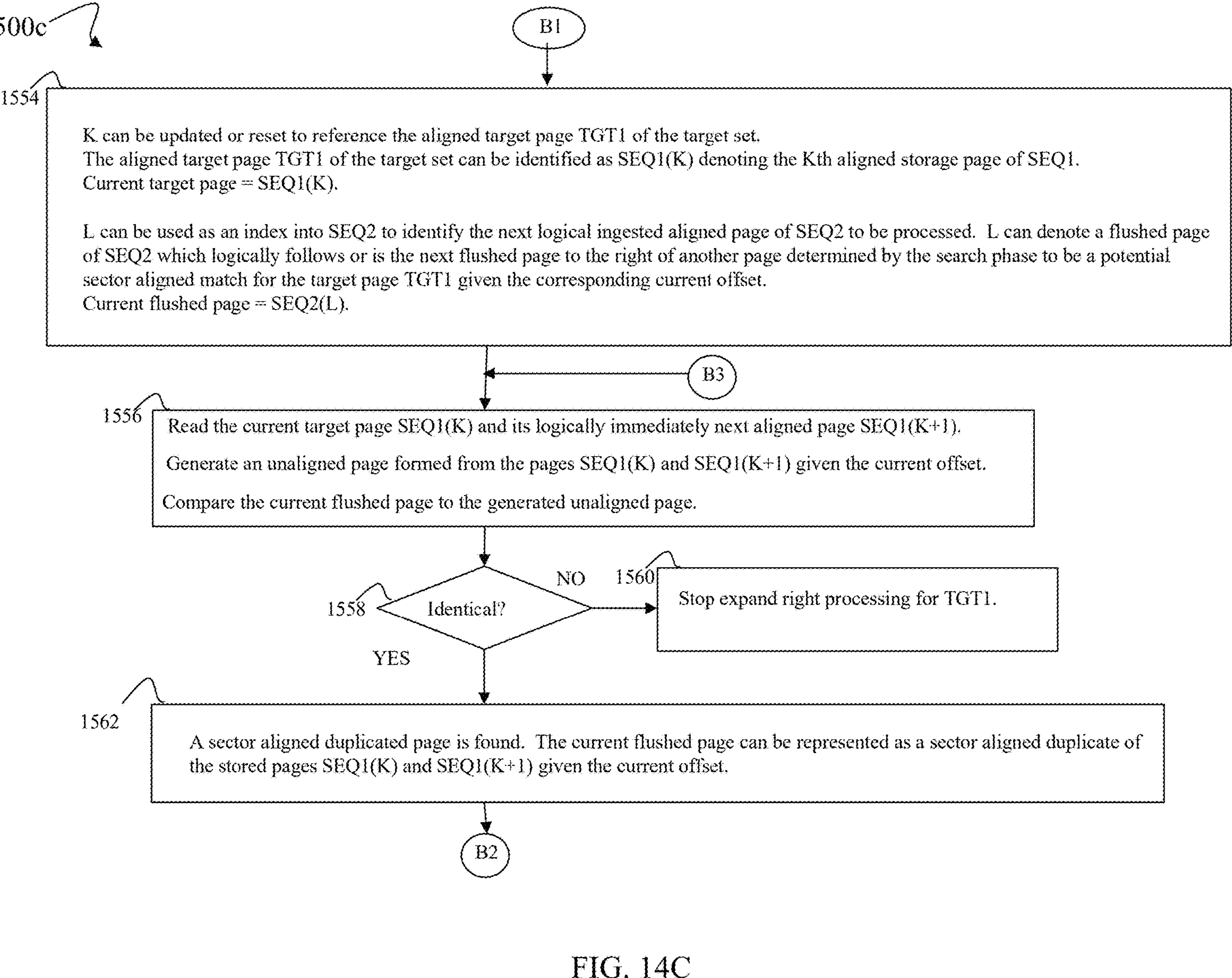
Figure 14D:
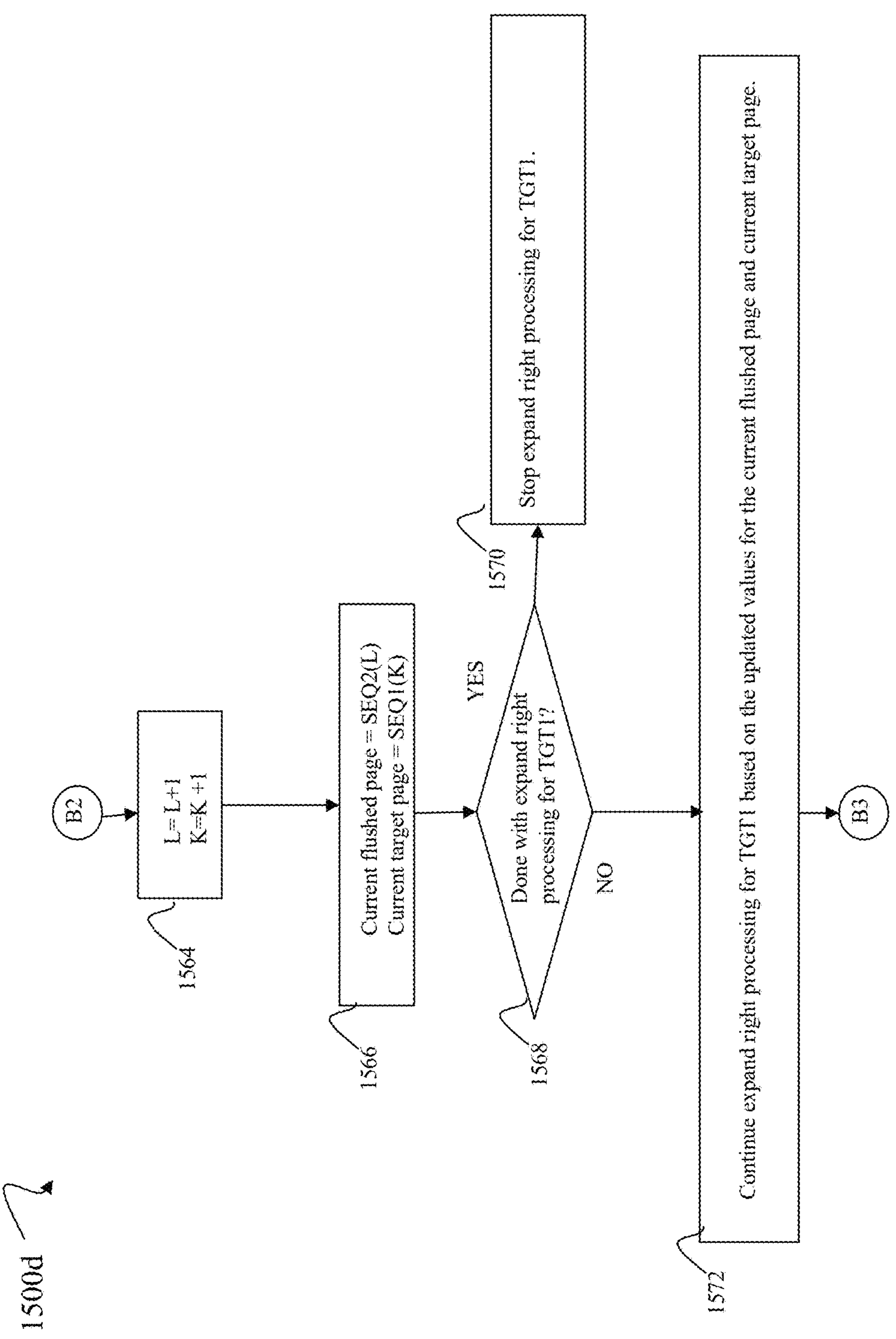

The step 1554 of FIG. 14C begins expand right processing. At the step 1554, K can be updated or reset to reference the aligned target page TGT1 of the target set. The aligned target page TGT1 of the target set can be identified as SEQ1(K) denoting the Kth aligned storage page of SEQ1. The variable current target page can be assigned SEQ1(K).

L can be used as an index into SEQ2 to identify the next logical ingested aligned page of SEQ2 to be processed. L can denote a flushed page of SEQ2 which logically follows or is the next flushed page to the right of another page determined by the search phase to be a potential sector aligned match for the target page TGT1 given the corresponding current offset. For example with reference back to FIG. 13A, L can be updated in the step 1554 to 3 identifying ingested/flushed page 832*d* which is the next logical flushed page of the sequence 832 following ingested/flushed page 2 832*c*, where the ingested page 2 832*c* was previously identified by the search phase (e.g., column 1006*a* of line 1006) as being a potential sector aligned match with the target TGT1=target or stored page EF 806*c*. In the step 1554, the variable current flushed page can be assigned SEQ2(L).

Thus the step 1554 can be characterized as resetting or reassigning L and K to commence expand right processing with corresponding page comparisons between ingested or flushed pages and constructed sector aligned pages formed from 2 stored page-aligned UD pages which are consecutive or adjacent with respect to a logical sequence associated with the stored UD pages. From the step 1554, control proceeds to the step 1556.

At the step 1556, processing can i) read the current target page SEQ1(K) and its logically immediately next aligned page SEQ1(K+1); ii) generate an unaligned page formed from the pages SEQ1(K) and SEQ1(K+1) given the current offset; and iii) compare the current flushed page to the generated unaligned page. From the step 1556, control proceeds to the step 1558.

At the step 1558, it is determined whether the above-noted two pages in step 1556 iii) are determined as identical If the step 1558 evaluates to no, control proceeds to the step 1560 where expand right processing for TGT1 can stop. If the step 1558 evaluates to yes, control proceeds to the step 1560.

At the step 1560, it is determined that a sector aligned duplicate is found. The current flushed page can be represented as a sector aligned duplicate of the stored pages SEQ1(K) and SEQ1(K+1) given the current offset. From the step 1562, control proceeds to the step 1564.

At the step 1564, the variable L can be incremented by 1, and the variable K can be incremented by 1. The foregoing of step 1564 can denote a shift to expand right and continue with corresponding page comparisons between ingested or flushed pages and constructed sector aligned pages formed from 2 stored page-aligned UD pages which are consecutive or adjacent with respect to a logical sequence associated with the stored UD pages. From the step 1564, control proceeds to the step 1566.

At the step 1566, the variable current flushed page is assigned SEQ2(L), and the variable current target page is assigned SEQ1(K). From the step 1566, control proceeds to the step 1568.

At the step 1568, a determination is made as to whether expand right processing is complete for the search identified target TGT1. If the step 1568 evaluates to yes, control proceeds to the step 1570 to stop expand right processing for TGT1. If the step 1568 evaluates to no, control proceeds to the step 1572 to continue expand right processing for TGT1 based on the updated values for the current flushed page and current target page. From the step 1572 control proceeds to the step 1556 for the next iteration of expand right processing.

Thus the steps of FIGS. 14A-D can be performed for each row of the table 1001, where each row corresponds to a single target TGT1 of the target set identified by the search phase.

The techniques herein can be performed by any suitable hardware and/or software. For example, techniques herein can be performed by executing code which is stored on any one or more different forms of computer-readable media, where the code can be executed by one or more processors, for example, such as processors of a computer or other system, an ASIC (application specific integrated circuit), and the like. Computer-readable media can include different forms of volatile (e.g., RAM) and non-volatile (e.g., ROM, flash memory, magnetic or optical disks, or tape) storage which can be removable or non-removable.

While the techniques of the present disclosure have been presented in connection with embodiments shown and described in detail herein, their modifications and improvements thereon will become readily apparent to those skilled in the art. Accordingly, the spirit and scope of the techniques of the present disclosure should be limited only by the following claims.

What is claimed is:

1. A computer-implemented method comprising:

receiving a first sequence of ingested pages; and performing sector aligned data deduplication for the first sequence of ingested pages including:

performing a search phase and identifying a target set of one or more target pages, wherein a first target page of the target set is included in a second sequence of previously written pages, wherein each target page of the target set is: i) a stored page aligned on a page boundary of a physical address space, and ii) identified as a potential sector aligned match for a corresponding one of the ingested pages of the first sequence given a corresponding offset, wherein the corresponding offset denotes a page-alignment offset relative to the page boundary; and performing an expansion phase based, at least in part, on the target set of one or more target pages, wherein the first target page is identified by the search phase as a potential sector aligned match for a first ingested page of the first sequence given a first corresponding offset, the expansion phase including:

based on the first target page of the second sequence, determining matches between i) ingested pages of the first sequence, and ii) corresponding generated sector aligned pages each constructed from two logically consecutive pages of the second sequence given the first corresponding offset; and determining, based on the expansion phase and the first target page, a set of one or more sector aligned duplicates within the first sequence of ingested pages, wherein each sector aligned duplicate of the set identifies a respective ingested page of the first sequence having its content from two stored pages aligned on the page boundary, where the two stored pages are logically consecutive pages of the second sequence.

2. The computer-implemented method of claim 1, wherein the second sequence writes second pages each of which is a stored page aligned on a page boundary of the physical space.

3. The computer-implemented method of claim 1, wherein, for the first target page of the second sequence, the expansion phase includes:

performing expand left processing to determine matches between i) a first set of ingested pages of the first sequence, and ii) first corresponding generated sector aligned pages each constructed from two logically consecutive pages of the second sequence given the first corresponding offset, wherein the first set of ingested pages of the first sequence includes: i) the first ingested page, and ii) other ingested pages of the first sequence which are logically sequentially prior to the first ingested page in the first sequence.

4. The computer-implemented method of claim 3, wherein the pages of the second sequence, used to construct the first corresponding generated sector aligned pages, include: i) the first target page, and ii) first one or more other pages of the second sequence, wherein the first one or more other pages are logically sequentially prior to the first target page in the second sequence.

5. The computer-implemented method of claim 4, wherein, for the first target page of the second sequence, the expansion phase includes:

performing expand right processing to determine matches between i) a second set of ingested pages of the first sequence, and ii) second corresponding generated sector aligned pages each constructed from two logically consecutive pages of the second sequence given the first corresponding offset, wherein the second set of ingested pages of the first sequence includes other ingested pages of the first sequence which are logically sequentially after the first ingested page in the first sequence.

6. The computer-implemented method of claim 5, wherein the pages of the second sequence, used to construct the second corresponding generated sector aligned pages, include: i) the first target page, and ii) second one or more other pages of the second sequence, wherein the second one or more other pages are logically sequentially after the first target page in the second sequence.

7. The computer-implemented method of claim 1, wherein the ingested pages of the first sequence are respectively written to consecutive first logical addresses, and wherein the previously written pages of the second sequence are respectively written to consecutive second logical addresses.

8. The computer-implemented method of claim 7, wherein the first logical addresses are included in a first logical address space associated with a first storage object, and wherein the second logical addresses are included in a second logical address space associated with a second storage object.

9. The computer-implemented method of claim 8, wherein the first storage object is a first volume, the second storage object is a second volume, and wherein the first volume and the second volume are two different volumes.

10. The computer-implemented method of claim 8, wherein the first storage object is a first volume, the second storage object is a second volume, and wherein the first volume and the second volume denote a same storage volume.

11. The computer-implemented method of claim 8, wherein the search phase includes performing a plurality of rounds each corresponding to one of a plurality of sector offsets denoting a page-alignment offset relative to the page boundary.

12. The computer-implemented method of claim 11, wherein each of the plurality of rounds of the search phase corresponding to one of the plurality of sector offsets includes:

generating first sector aligned pages, based on the one sector offset corresponding to said each round, from pairs of logically adjacent ingested pages of the first sequence;

for each of the first sector aligned pages generated, determining a calculated hash value;

determining whether a data deduplication index has a first hash value matching the calculated hash value, wherein if the data deduplication index has the first hash value matching the calculated hash value, then the data deduplication index has a first existing entry which is i) associated with the first hash value, and ii) includes first location information of a first stored page having the first hash value; and if it is determined that the data deduplication index has a first hash value matching the calculated hash value, adding the first stored page as a target page of the target set.

13. The computer-implemented method of claim 8, wherein a first adaptive sector offsets array specifies a first ordering in which the plurality of sector offsets are evaluated in the search phase, wherein the first adaptive sector offsets array is associated with the first storage object, and wherein the first ordering of the sector offsets is based, at least in part, on observed frequencies at which matching hash values are found between i) a hash value of a generated sector aligned page for a particular sector offset, and ii) a hash value of the data deduplication index corresponding to a stored page aligned on the page boundary of the physical address space.

14. The method of claim 1, wherein said search phase further includes:

determining that a first hash value for said each target page matches a calculated hash value for said corresponding one ingested page; and responsive to determining that the first hash value matches the calculated hash value, determining that said each target page is a potential sector aligned match for said corresponding one ingested page of the first sequence given the corresponding offset.

15. The computer-implemented method of claim 1, wherein the second sequence of previously written pages is maintained as a linked list of virtual layer entries, wherein each of the virtual layer entries is used to access one of the previously written pages, wherein each of the previously written pages of the second sequence is a stored page aligned on the page boundary of the physical address space.

16. The computer-implemented method of claim 15, wherein each of the virtual layer entries corresponds to a logical address in a logical address space of a storage object, wherein the second sequence is formed from second consecutive logical addresses of the logical address space of the storage object.

17. The computer-implemented method of claim 1, further comprising:

performing page aligned data deduplication for the first sequence prior to performing the sector aligned data deduplication for the first sequence.

18. The computer-implemented method of claim 17, further comprising:

receiving one or more write requests to write the first sequence of ingested pages;

storing one or more log entries in a log to record the one or more write requests to write the first sequence of ingested pages; and flushing the one or more entries from the log, wherein said flushing includes performing data deduplication for the first sequence, wherein said data deduplication includes performing said page aligned data deduplication for the first sequence and performing said sector aligned deduplication for the first sequence.

19. One or more non-transitory computer readable media comprising code stored thereon that, when executed, performs a method comprising:

receiving a first sequence of ingested pages; and performing sector aligned data deduplication for the first sequence of ingested pages including:

performing a search phase and identifying a target set of one or more target pages, wherein a first target page of the target set is included in a second sequence of previously written pages, wherein each target page of the target set is: i) a stored page aligned on a page boundary of a physical address space, and ii) identified as a potential sector aligned match for a corresponding one of the ingested pages of the first sequence given a corresponding offset, wherein the corresponding offset denotes a page-alignment offset relative to the page boundary; and performing an expansion phase based, at least in part, on the target set of one or more target pages, wherein the first target page is identified by the search phase as a potential sector aligned match for a first ingested page of the first sequence given a first corresponding offset, the expansion phase including:

based on the first target page of the second sequence, determining matches between i) ingested pages of the first sequence, and ii) corresponding generated sector aligned pages each constructed from two logically consecutive pages of the second sequence given the first corresponding offset; and determining, based on the expansion phase and the first target page, a set of one or more sector aligned duplicates within the first sequence of ingested pages, wherein each sector aligned duplicate of the set identifies a respective ingested page of the first sequence having its content from two stored pages aligned on the page boundary, where the two stored pages are logically consecutive pages of the second sequence.

20. A system comprising:

one or more processors; and a memory comprising code stored thereon that, when executed, performs a method comprising:

receiving a first sequence of ingested pages; and performing sector aligned data deduplication for the first sequence of ingested pages including:

performing a search phase and identifying a target set of one or more target pages, wherein a first target page of the target set is included in a second sequence of previously written pages, wherein each target page of the target set is: i) a stored page aligned on a page boundary of a physical address space, and ii) identified as a potential sector aligned match for a corresponding one of the ingested pages of the first sequence given a corresponding offset, wherein the corresponding offset denotes a page-alignment offset relative to the page boundary; and performing an expansion phase based, at least in part, on the target set of one or more target pages, wherein the first target page is identified by the search phase as a potential sector aligned match for a first ingested page of the first sequence given a first corresponding offset, the expansion phase including:

based on the first target page of the second sequence, determining matches between i) ingested pages of the first sequence, and ii) corresponding generated sector aligned pages each constructed from two logically consecutive pages of the second sequence given the first corresponding offset; and determining, based on the expansion phase and the first target page, a set of one or more sector aligned duplicates within the first sequence of ingested pages, wherein each sector aligned duplicate of the set identifies a respective ingested page of the first sequence having its content from two stored pages aligned on the page boundary, where the two stored pages are logically consecutive pages of the second sequence.

* * * * *